United States Patent [19]

Chu et al.

[11] Patent Number: 4,785,393

[45] Date of Patent: Nov. 15, 1988

[54] 32-BIT EXTENDED FUNCTION ARITHMETIC-LOGIC UNIT ON A SINGLE CHIP

[75] Inventors: Paul P. Chu, Sunnyvale; Deepak R. Mithani; Sanjay Iyer, both of San Jose, all of Calif.

[73] Assignee: Advanced Micro Devices, Inc., Sunnyvale, Calif.

[21] Appl. No.: 628,921

[22] Filed: Jul. 9, 1984

[51] Int. Cl.[4] ............................................. G06F 7/38
[52] U.S. Cl. .................................... 364/200; 364/716; 364/756
[58] Field of Search .............. 364/716, 736, 748, 738, 364/200 MS File, 900 MS File

[56] References Cited

U.S. PATENT DOCUMENTS

| 4,360,891 | 11/1982 | Branigin et al. | 364/900 |
| 4,378,589 | 3/1983 | Finnegan et al. | 364/200 |
| 4,412,283 | 10/1983 | Mor et al. | 364/200 |
| 4,467,444 | 8/1984 | Harmon, Jr. et al. | 364/900 |
| 4,592,005 | 5/1986 | Kregness | 364/736 |

Primary Examiner—Gareth D. Shaw
Assistant Examiner—Jonathan C. Fairbanks
Attorney, Agent, or Firm—Kenneth B. Salomon

[57] ABSTRACT

A one-chip, integrated-circuit, 32-bit bipolar arithmetic-logic unit (ALU) capable of performing complex operations on selected one, two, three, or four 8-bit bytes or selected contiguous bits of the operands in a single clock cycle. The ALU has three 32-bit inputs consisting of two data word operands and a mask; operand with shifters provided at one of the operand input, the mask input and at the ALU output so that three operands can be simultaneously received, shifted, masked, combined, and the result shifted in a single instruction cycle. Bit positions which are not selected to take part in an ALU operation pass unaffected to the outputs from one of the data word inputs. A swap multiplexer is present at the data word inputs to afford interchanging of these inputs before processing by the ALU. A moving arithmetic cell is employed within the ALU which can be appended to the selected high-order byte during a multiplication operation and the ALU is composed of sixteen two-bit arithmetic cells which generate four conditional sums to which a last minute correction is made based on the carry in to the cell from the adjoining cell. A one-bit upshift or a two-bit downshift of the result can be made during the same clock cycle to implement the division and multiplication algorithms used by the ALU. A terminal pin is provided to permit selection of a borrow or a carry made to be utilized during subtractions.

16 Claims, 16 Drawing Sheets

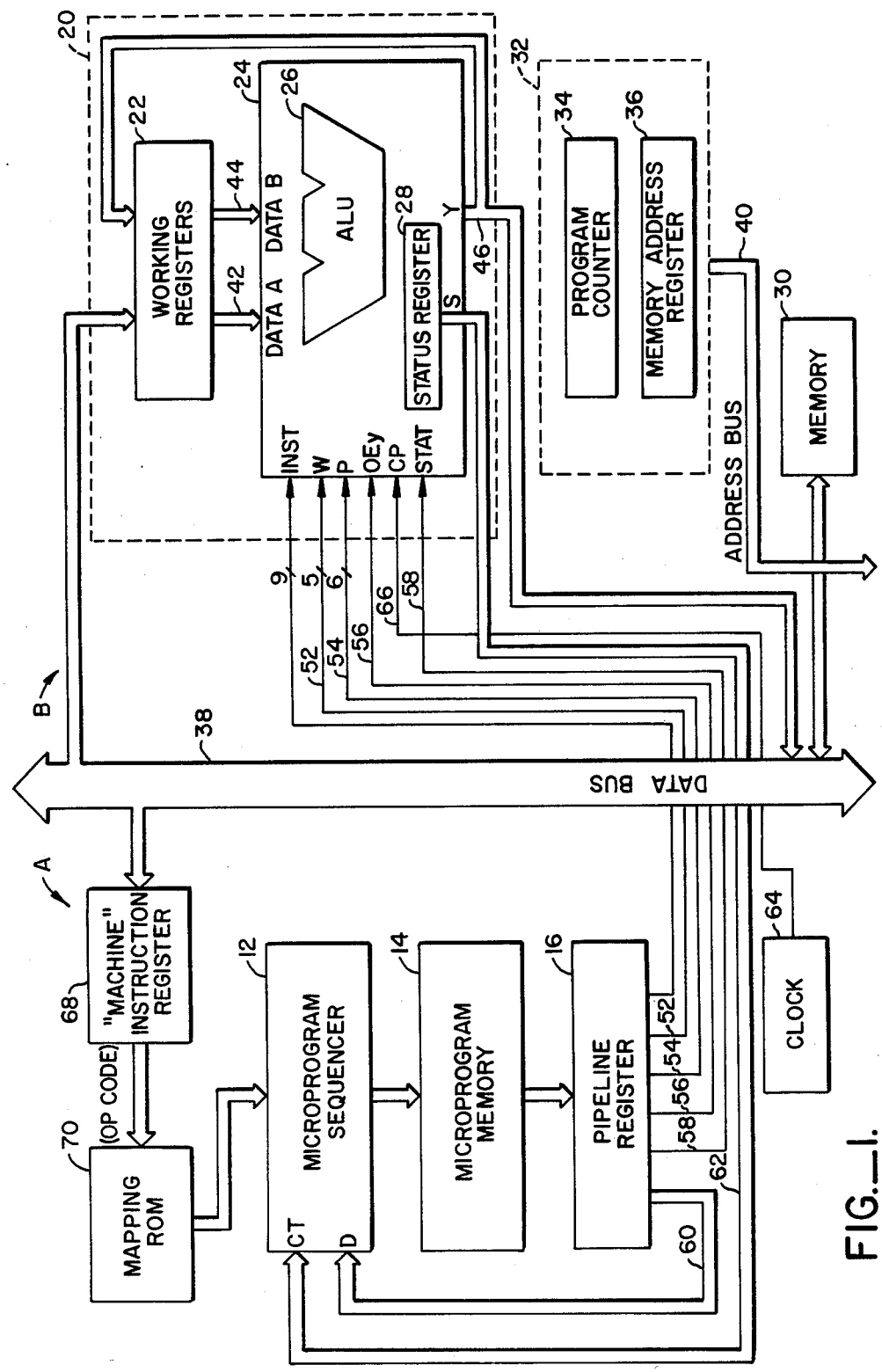
FIG._1.

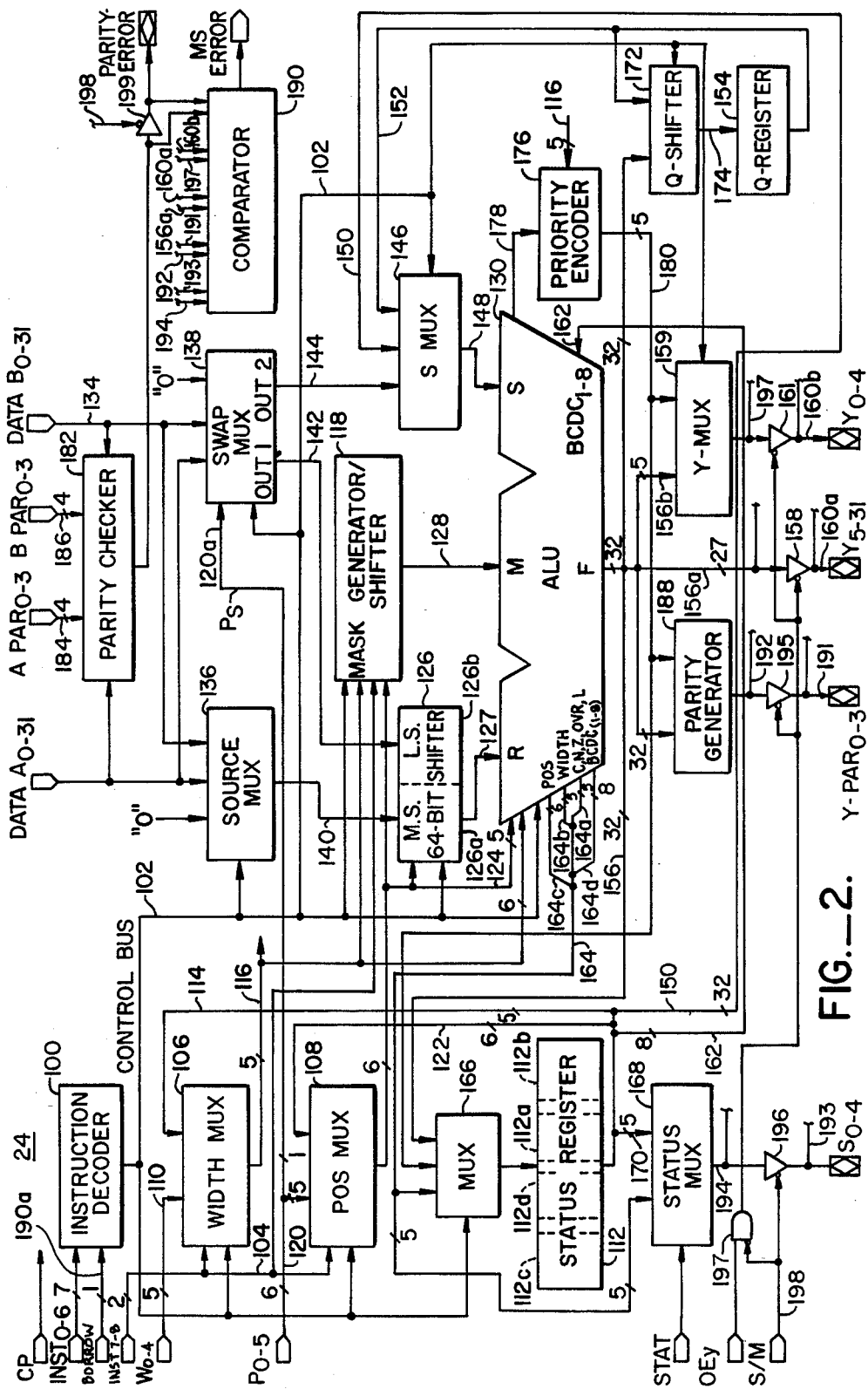
FIG._2.

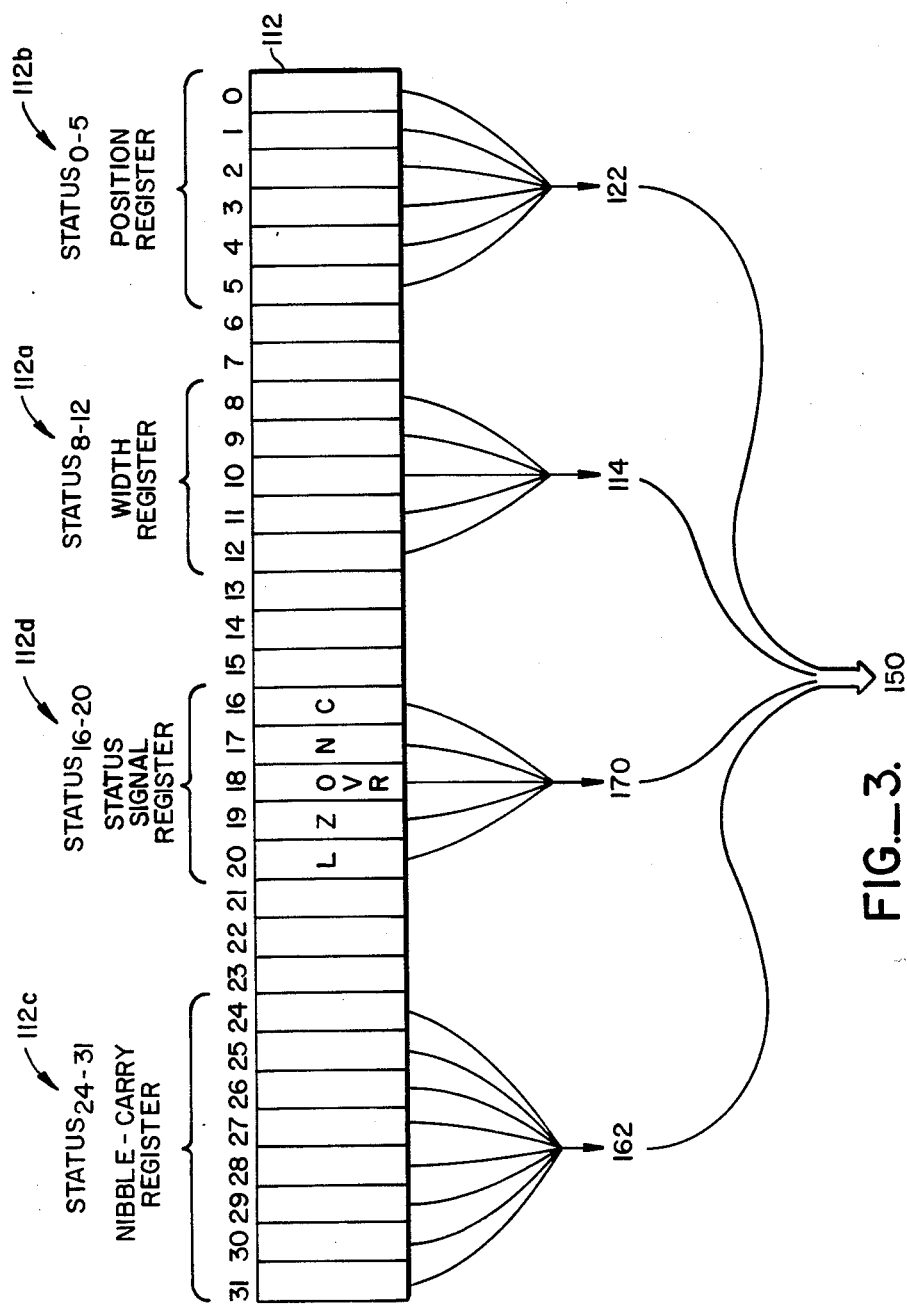
FIG._3.

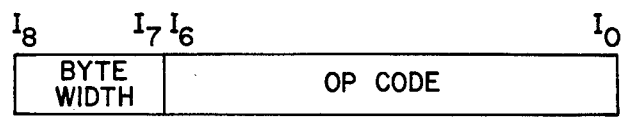
FIG._4A.
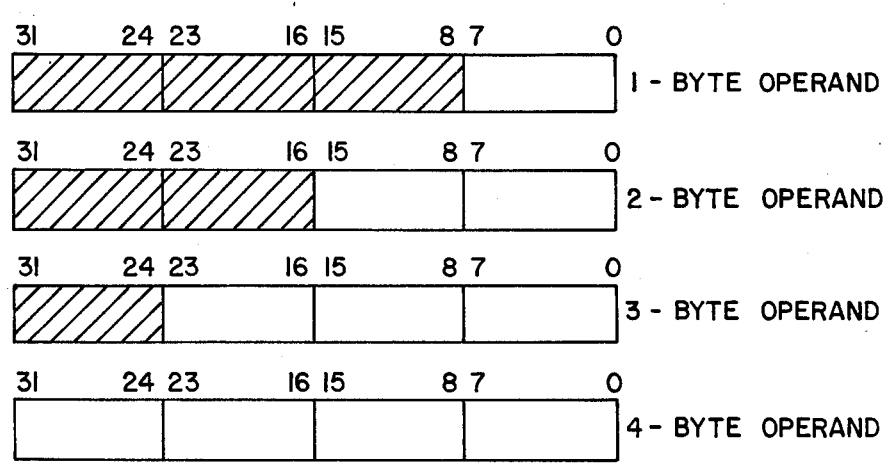
FIG._4B.
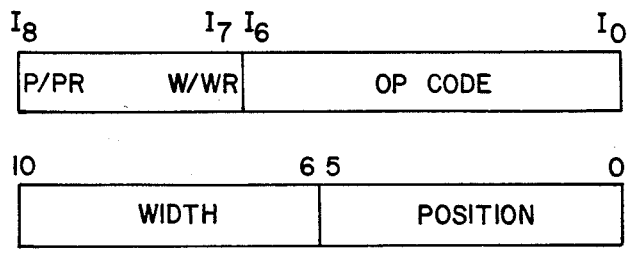
FIG._5A.
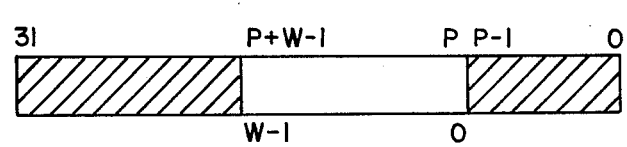
FIG._5B.

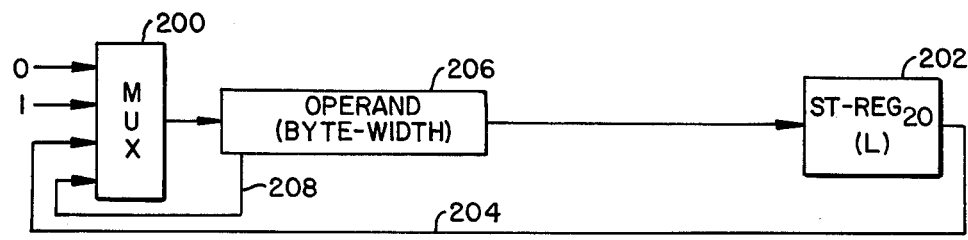
FIG._6A.
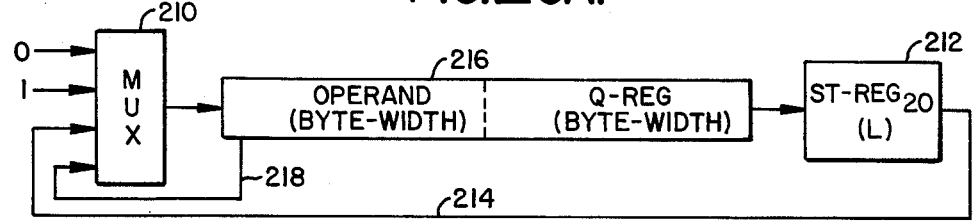
FIG._6B.
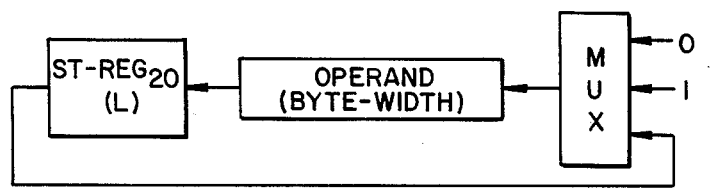
FIG._7A.
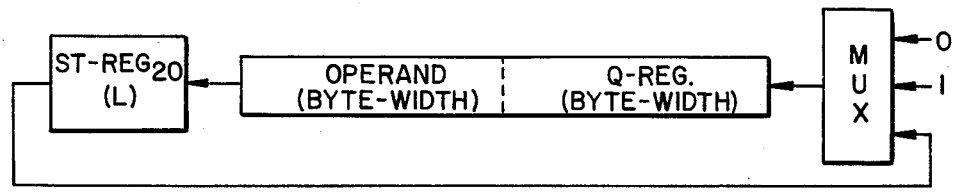
FIG._7B.

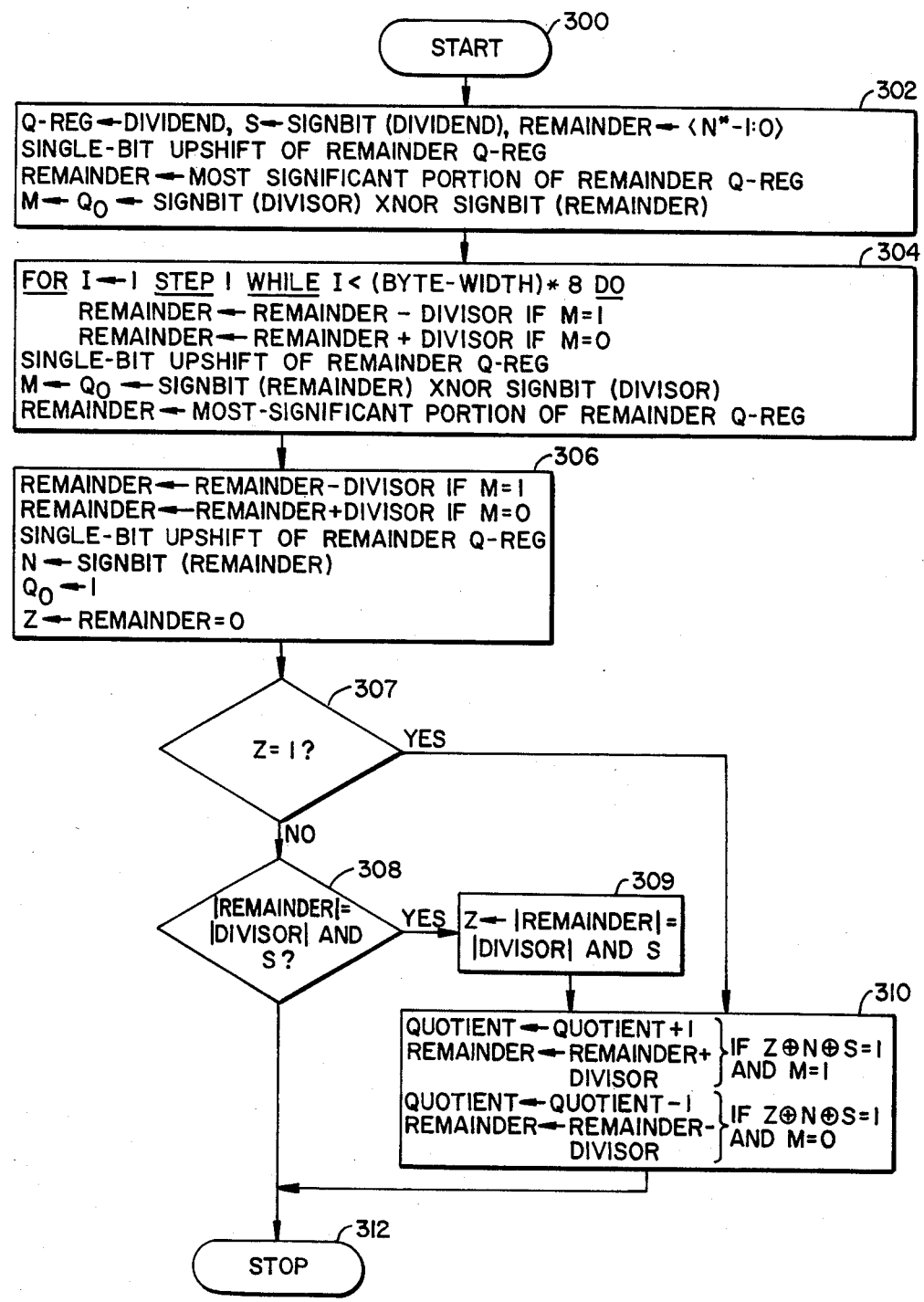
FIG._8A.

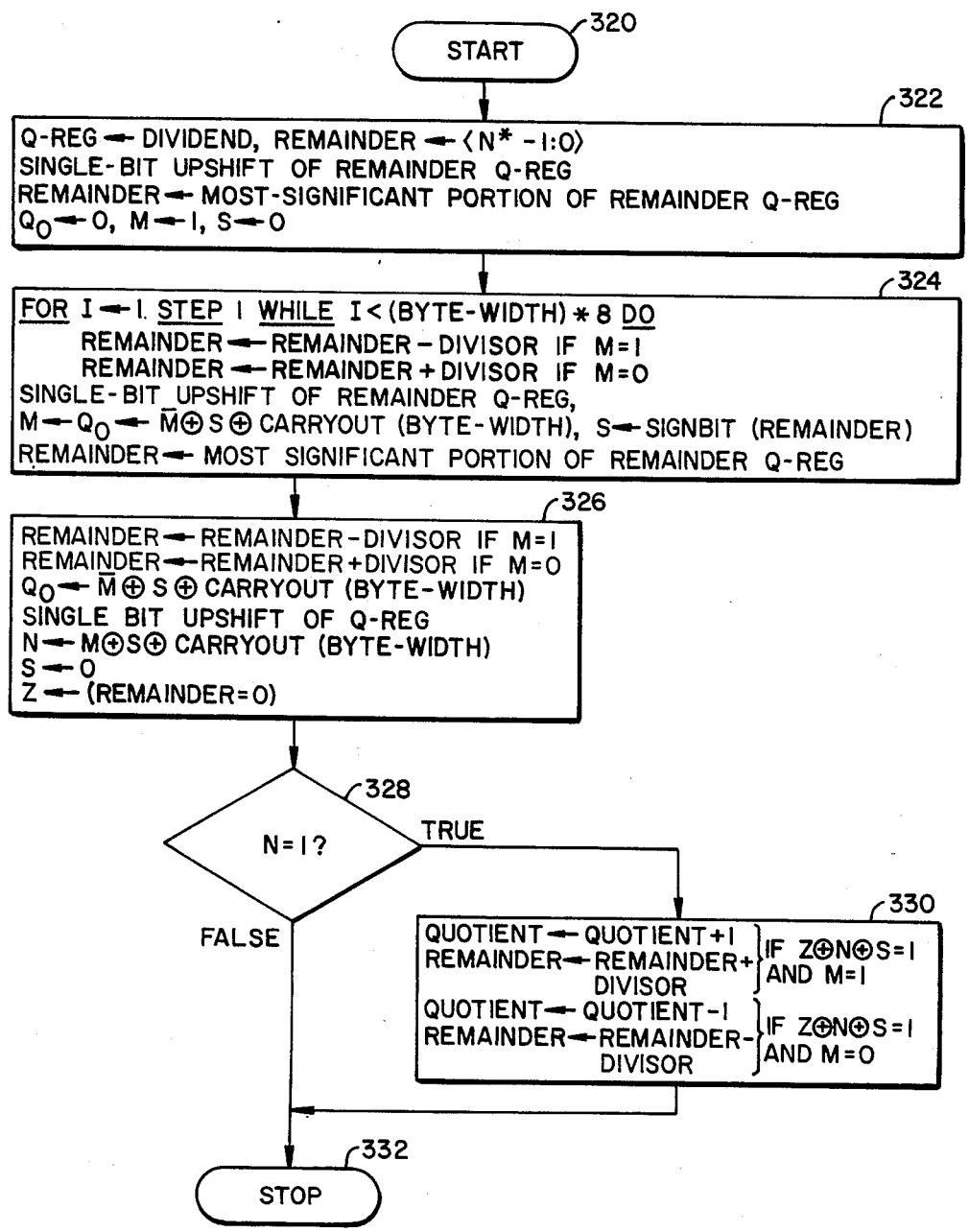
FIG._8B.

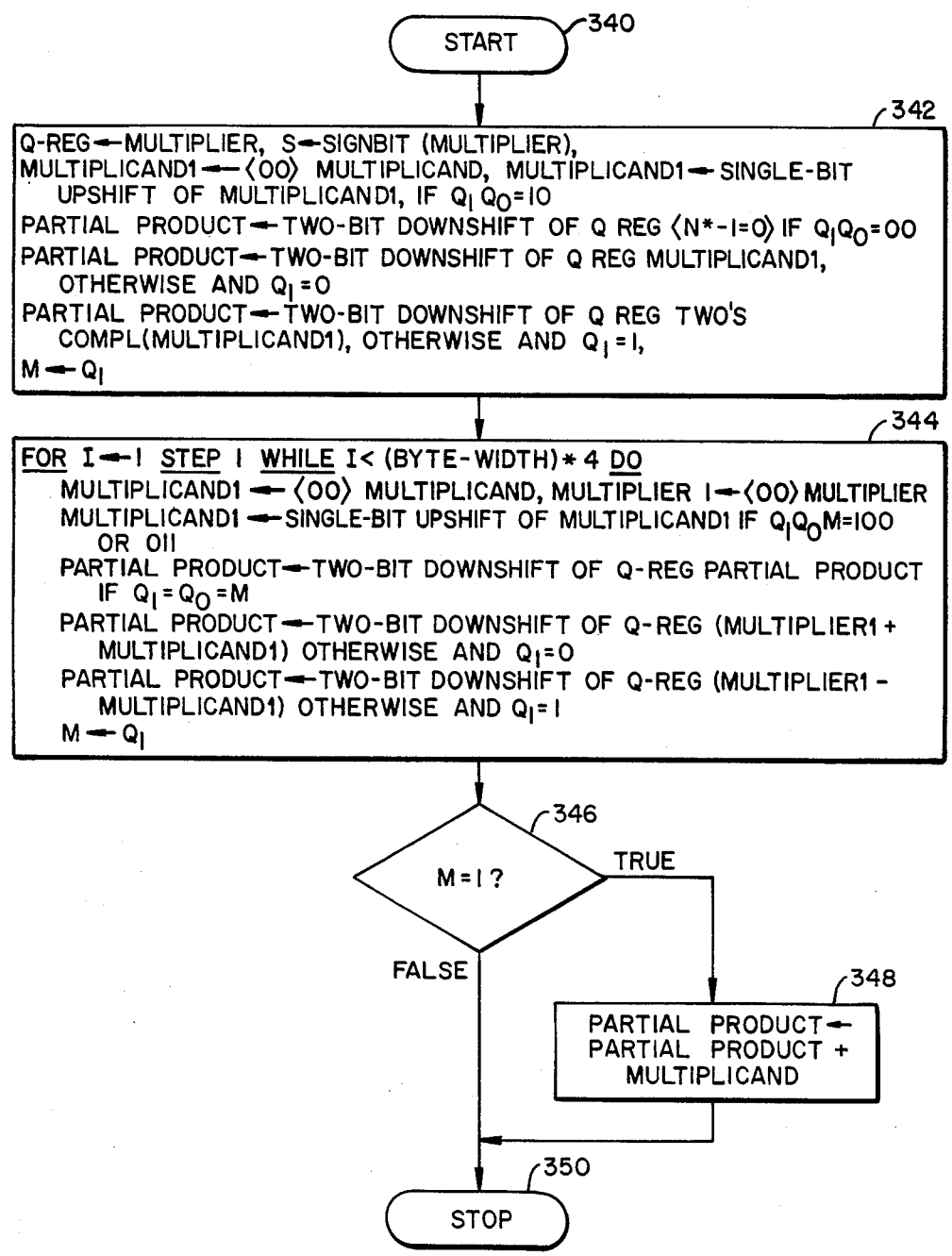
FIG._8C.

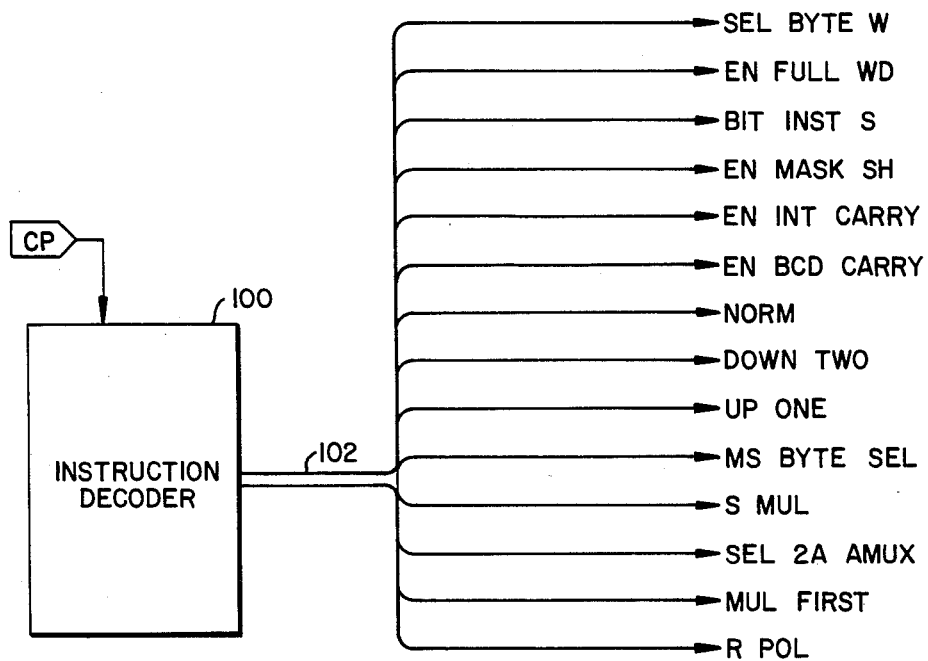
FIG._9.

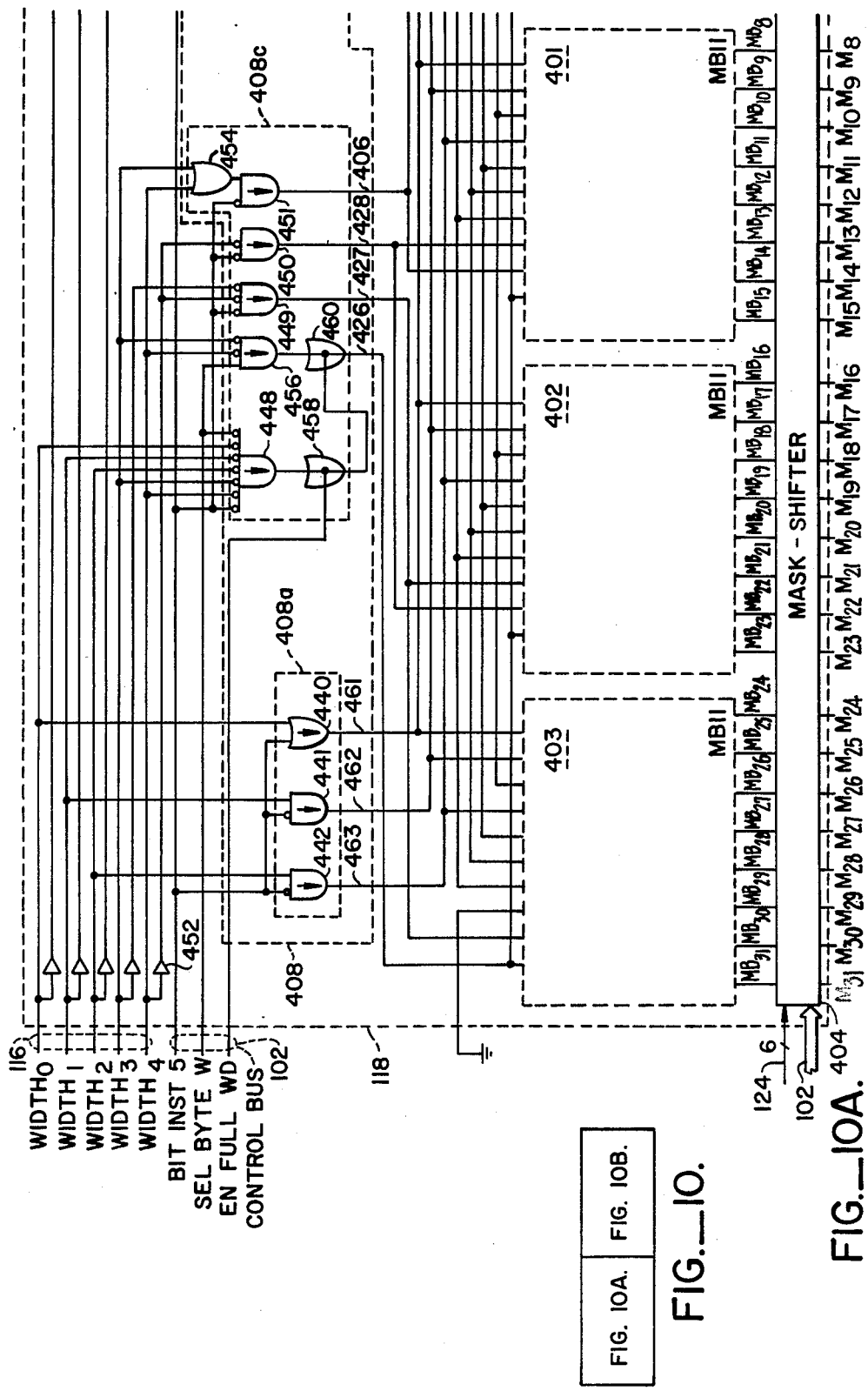

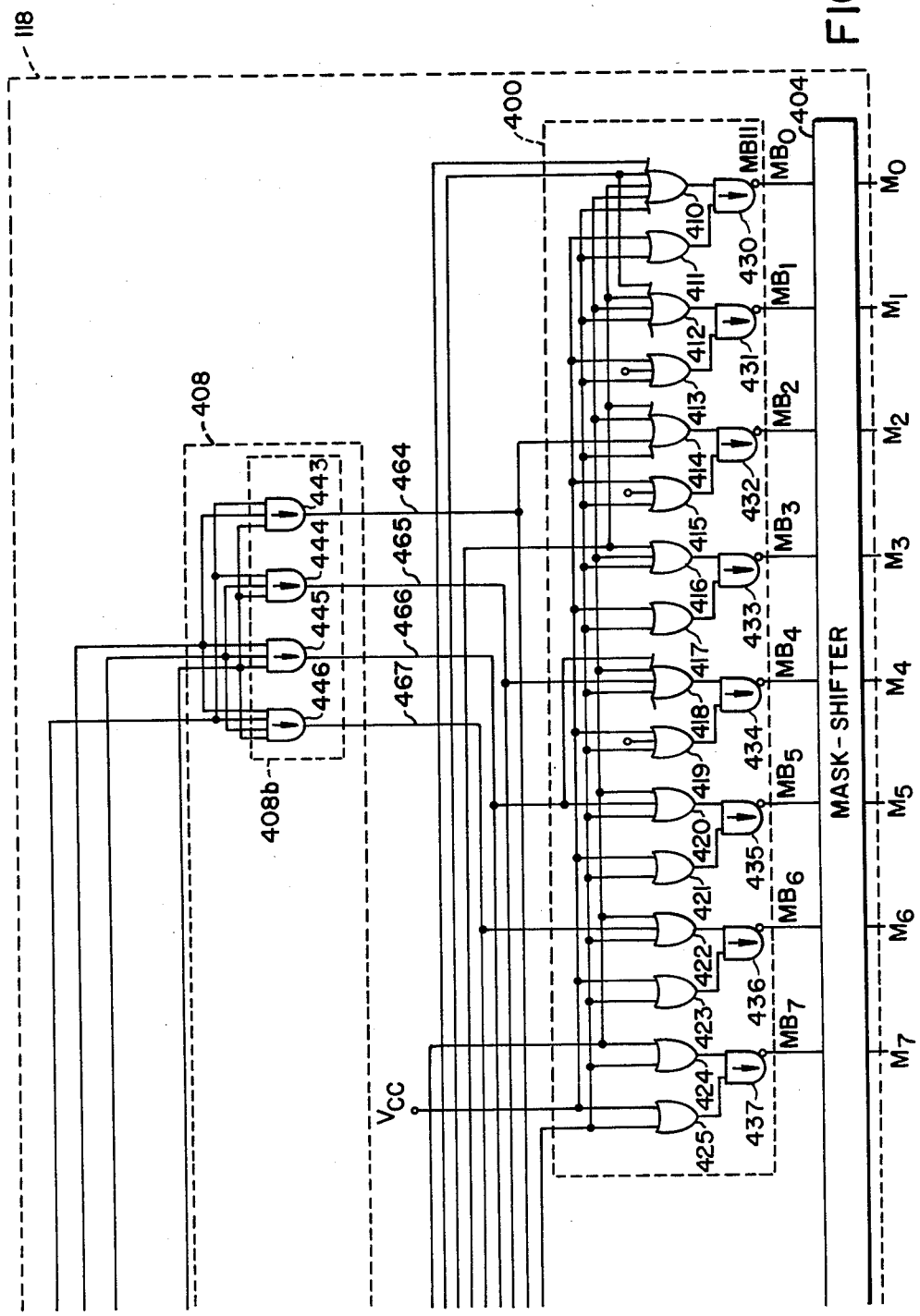
FIG._IOB.

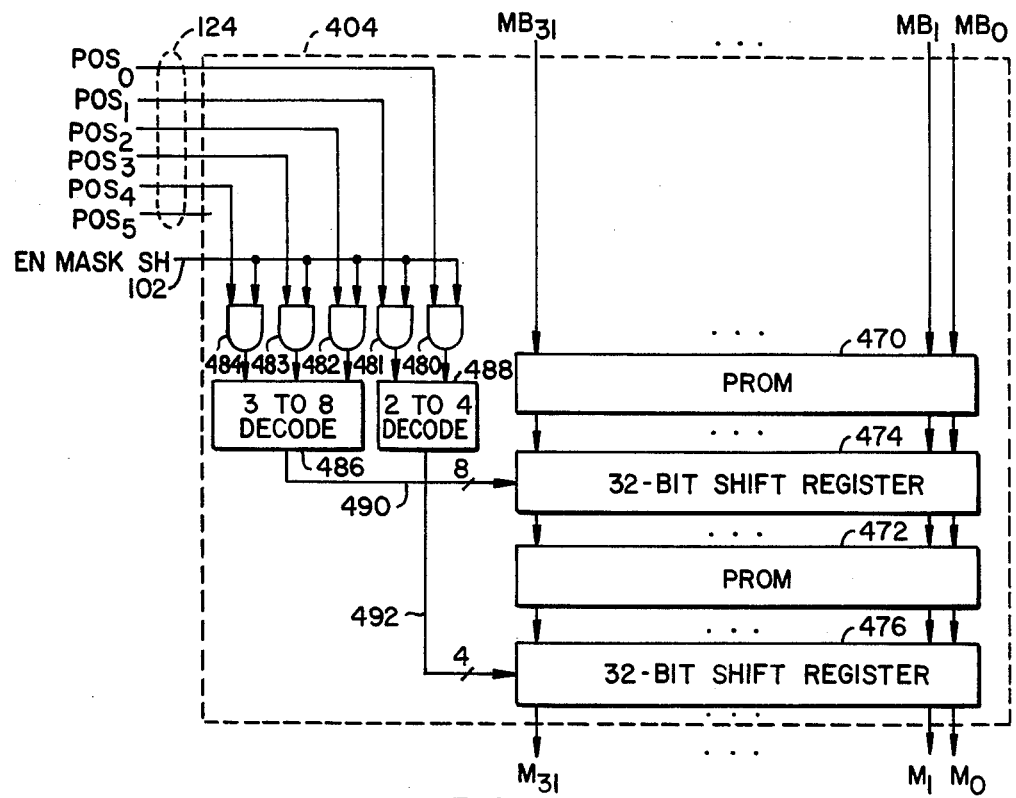
FIG._11.
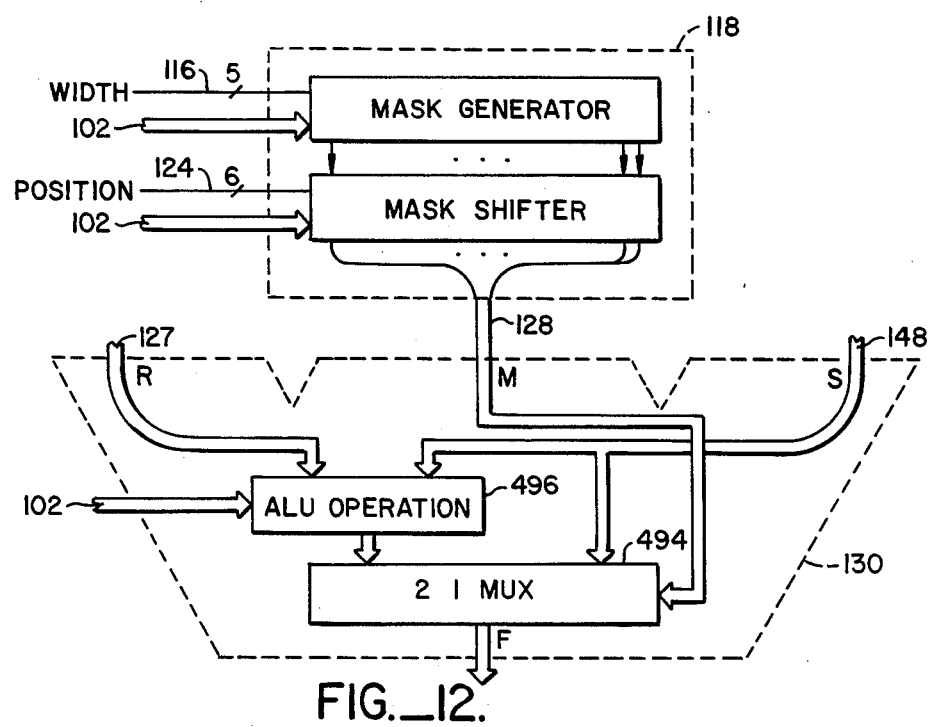
FIG._12.

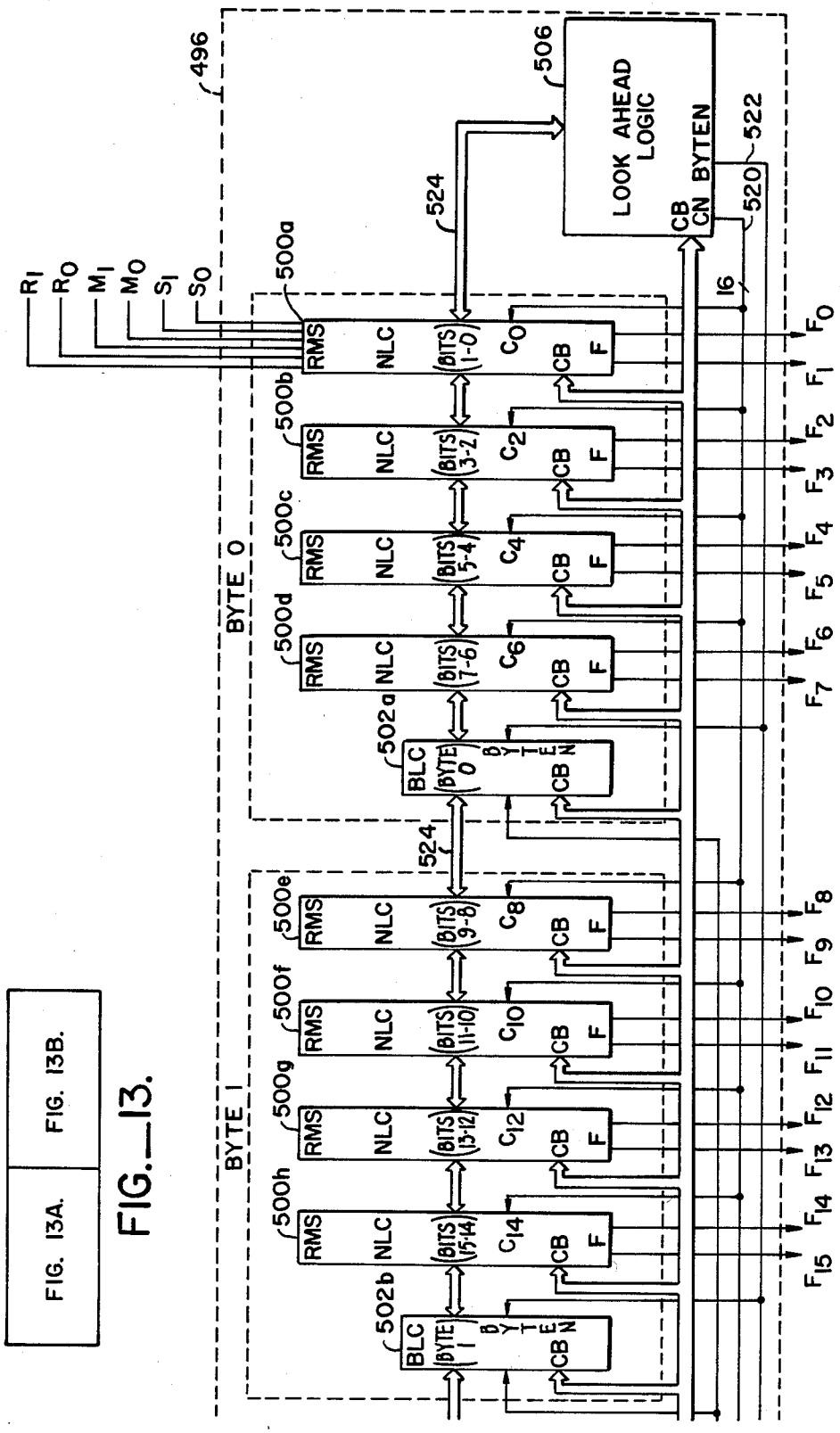

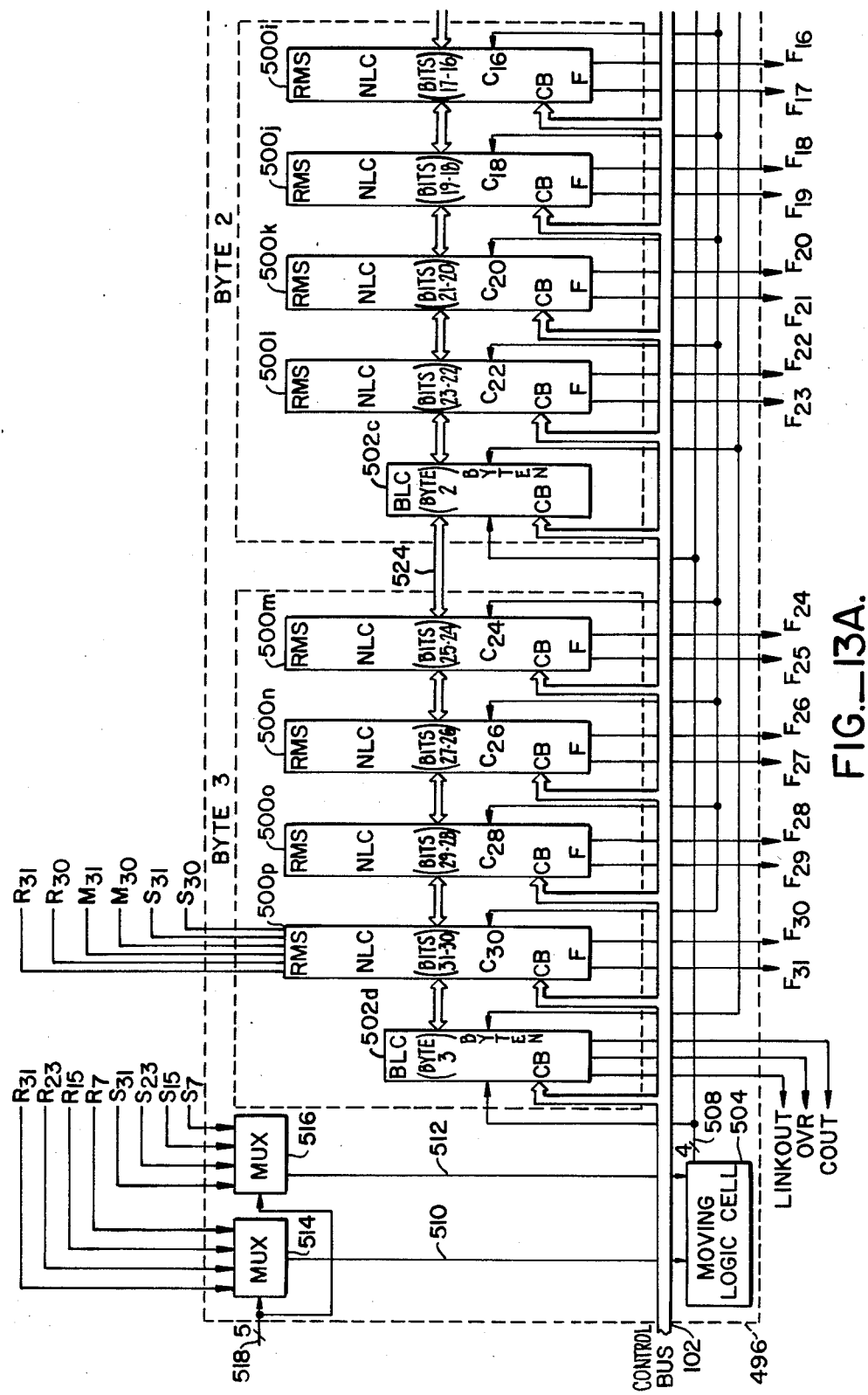
FIG._13A.

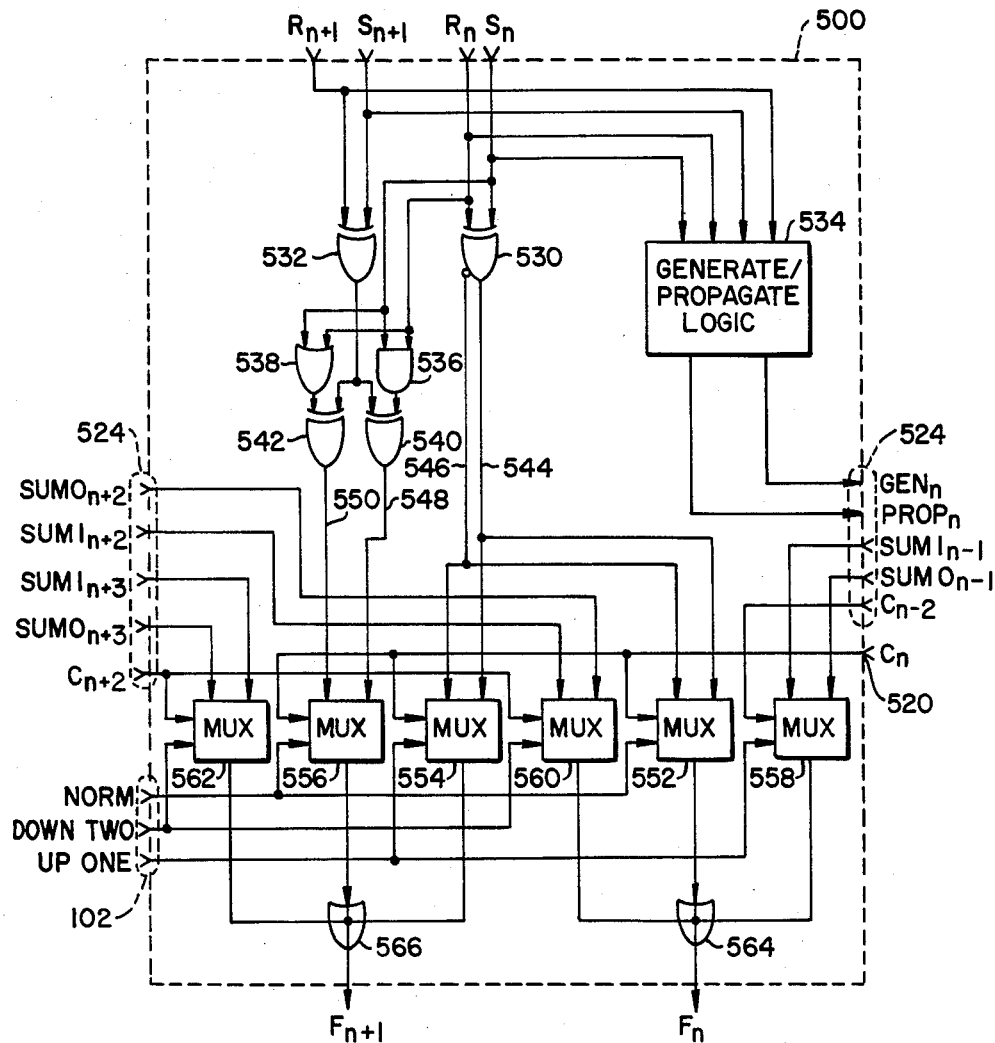
FIG._14.

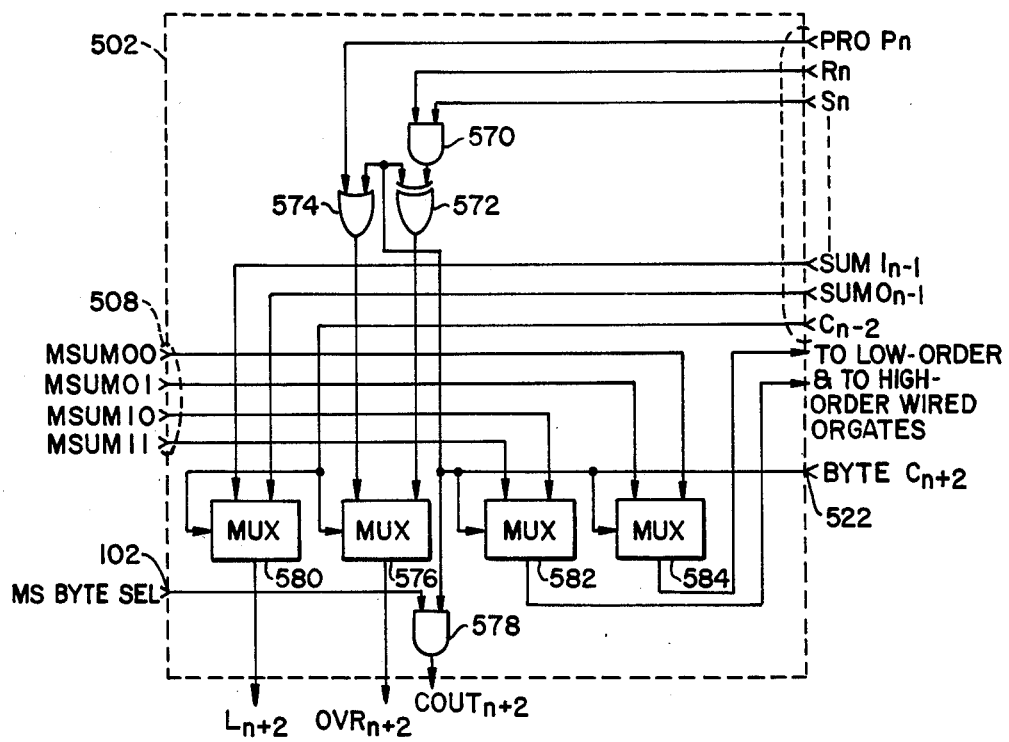
FIG._15A.
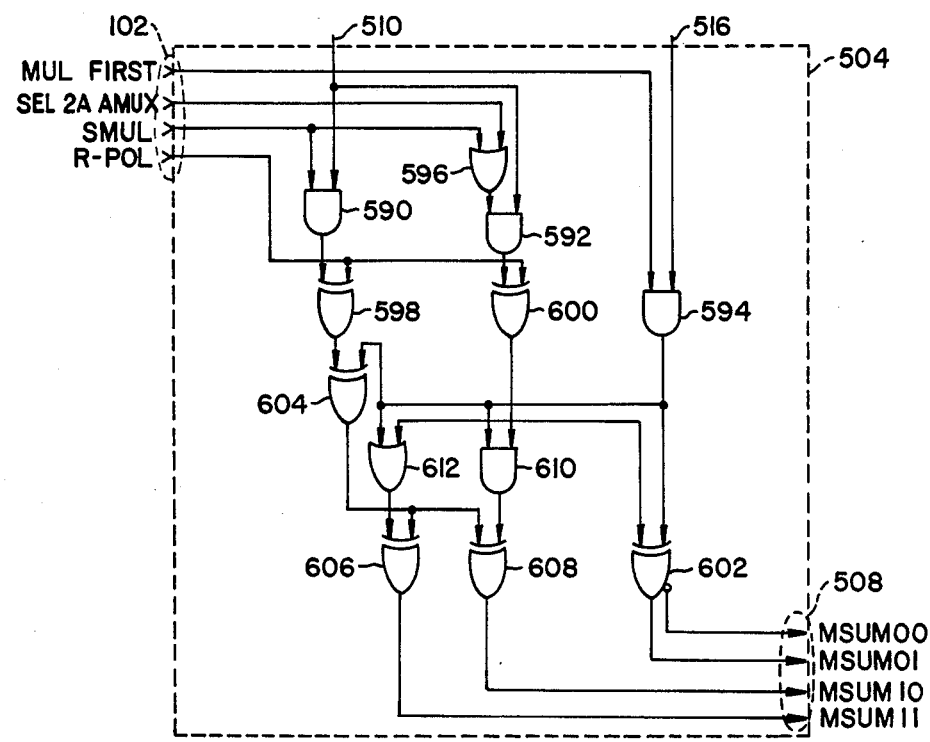
FIG._15B.

32-BIT EXTENDED FUNCTION ARITHMETIC-LOGIC UNIT ON A SINGLE CHIP

BACKGROUND OF THE INVENTION

Typically, processors are constructed from a variety of very large scale integrated circuit (VLSI) chips used as building blocks in an architecture which can be divided into two subprocessors: an instruction processor that supervises the order and decoding of instructions to be executed, and a data processor which performs the operations called for by the instructions on the data. The instruction processor normally includes a microprogram memory which contains microinstructions. Each microinstruction includes a plurality of bits to control the elements within the data processor. In addition, a device or devices, termed a sequencer or microprogram controller, is used to issue addresses that are applied to the microprogram memory to access the microinstruction sequence to be executed. When processing conditional branching instructions, the sequencer, or microprogram controller, tests selected status bits of the data processor, such as overflow, zero, carry or negative.

Previous data processors have been categorized as either an 8, 16 or 32-bit device. They were capable of performing arithmetic or logic operations on 8, on 16, or on 32 bits, respectively. Some of these data processors have limited capability to perform operations on selected portions of a full-sized word. For example, a 16-bit data processor may be able to perform operations on the least-significant byte (8 bits) of a full-sized 16-bit word. In one such approach, a 16-bit processor is formed from a parallel combination of four four-bit processors. This is typically referred to as the "bit-sliced" technique.

This method, however, entails extensive parallel interconnection of the terminal pins of the data processor chips which can lead to malfunctioning and adds to the fabrication cost of the microprocessor. Furthermore, certain on-chip functions are needlessly duplicated, such as the microinstruction decode function present on each processor chip. Additionally, space, which is typically at a premium on the printed circuit boards used to mount the microprocessor chips, is consumed by a proliferation of data processor chips.

While previous 8- and 16-bit data processors have been available using bipolar semiconductor fabrication techniques, 32-bit data processors have been of the slower metal oxide silicon (MOS) type. Also contributing to speed degradation, previous processors used a single multiplexed input/output bus, which typically imposed a 50% duty cycle on input and output operation.

In modern data processing systems, data is continuously transferred between the host processor and its peripherals, storage, or terminals, such data often including coded control words that must be assembled or disassembled by the peripheral. Thus, packing and unpacking these coded data words, which may be binary-coded decimal (BCD) or American Standard Code of Information Exchange (ASCII) may be necessary. Typically, such packing and unpacking utilizes a rotation (i.e., a realignment of the bits of the coded word) and merge (logically ANDing the realigned coded word with a mask to pass only the desired bits and inhibit or strip away the unwanted bits) functions. Rotate and compare functions (similar to rotate and merge) are also widely used to compare a number of bits of a control or status data word with a predetermined unknown. These functions require complex programming and an inordinate amount of processing time.

Previous data processors have provided only limited support for these data manipulation features. Typically, masking, if available at all, was permitted on one operand only; and the mask was applied only to the entire word, or at best to some byte-aligned portion thereof. If only selected portions of the operands were to be arithmetically combined complex programming was required, degrading speed and needlessly adding instructions and temporary storage.

Further, errors may be introduced during the reading, writing or actual transmission of the data. Consequently, error control has become an integral part of the design of many of the peripheral units and their host computers. One of the more preferred methods today for error detection involves the addition of one or more bits, called "redundancy" bits, to the information carrying bits of a character or stream of characters. For example, one method commonly used for error detection is the simple parity check.

The speed of operation of the data processor, and therefore the microprocessor itself, depends in large part on the architecture of its internal circuitry. Throughput (the time it takes for an instruction to be executed) depends, in part, upon the number of gates data must pass through during its processing. Also, operating speed can be increased by combining several operations into one instruction. For example, certain high-speed processors available today provide a shift function to be performed with other arithmetic operations by placing a shifter on the output of the processor. Thus, an arithmetic operation and a shift (such as may be required in executing a multiplication-step instruction) can be performed in one instruction cycle, rather than two or more, and the operating speed of the microprocessor is thereby increased. However, the shift circuit, being on the output of the processor is always in the data path and, when not used, thereby increases the time it takes for the data to pass through the manipulation cycle; that is, overall throughput time is increased.

Another facet of the internal circuitry which degrades throughput is in the arithmetic carry circuit. Bottlenecks occur in previous processors because of the bit-by-bit carry propagation schemes used. Furthermore, these processors require large number of interconnections and use a very wide gate at the last stage of the carry circuitry. Also, previous processors require explicit normalization of the result of any floating-point multiplication or division. To do this, a series of normalization instructions would be executed; the number dependent on the particular operands being multiplied or divided.

Current data processors fall into one of the two incompatible types: those that employ carry during subtractions and those that employ borrow. No processor which works with either scheme is available, therefore requiring manufacture of each of the two types if one wants a processor compatbble with any existing microprocessor.

Another source of incompatibility of current data processors with extant hardware stems from the two types of on-chip parity checkers currently in use: even parity is utilized if compatibility with transistor-transistor logic (TTL) is desired, odd parity for emitter-coupled logic (ECL).

SUMMARY OF THE INVENTION

The present invention provides a 32-bit data processor particularly useful in bipolar microprocessors. The processor includes two 32-bit dedicated input busses providing it with the capability of receiving and simultaneously combining the two 32-bit data operands thereon in one, two, three or four-byte aligned portions so that complex instructions can be performed in a single instruction cycle. The result appears on a 32-bit dedicated output bus. The processor includes an arithmeticlogic unit (ALU) having the two 32-bit data operands as inputs, with a 64-bit shifter circuit connected to one of the operand inputs, and a mask generator/shifter as a third operand. So structured, the ALU provides the processor with the capability of executing conventional instruction types—such as pass, complement, twos complement, add, subtract, AND, NAND, OR, NOR, XOR, and XNOR on any selected one, two, three or four-bytes of the operand pair, the unselected portion passing unchanged. In addition, the ability to simultaneously receive and combine three operands, coupled with the shifting capability at one operand input, and the masking of both operand inputs allows the ALU to execute three operand instructions all with masking for any function, as well as rotate and merge, for example, in a single instruction cycle. The overall 32-bit processor architecture is designed so that it can be fabricated as a single integrated circuit.

In the preferred embodiment, the data processor of the present invention is adapted to operate in a microprocessor that includes a microprogram memory unit containing 9-bit instruction words that are accessed by addresses supplied thereto by a microprogrammed sequencer unit. The data processor is designed to be used with a dual-access random access memory (RAM) which acts as a register file.

The 32-bit bipolar processor of the present invention realizes a two-fold speed increase: first, by being able to perform arithmetic or logical operations on 32-bit words it is capable of processing four times, or twice, as much data per instruction cycle as would an equally fast bipolar 8- or 16-bit processor. Secondly, by being of bipolar construction, the instruction cycle time would be comparable with the fastest 8- or 16-bit processors. For further improvement of throughput the three-bus architecture of the data processor facilitates parallel connection of other such processors.

The ALU receives data operands in the orm of 32-bit data words on the two data operand inputs via data lines thatcommunicate data words from the outside, nominally called the source input and the destination input, that are multiplexed to selectively communicate the data words thereon to the corresponding data operand inputs of the ALU in accordance with the particular instruction commanding the processor's operation.

Interconnecting one of the operand inputs of the ALU with the multiplexer is 64-bit upshifter circuitry, a combinational logic array capable of shifting the 64 bits of the concatenated 32-bit data words 0-31 places. The most-significant 32 bits is the result. Downshifting can be effected by applying the operand to the least-significant 32 data inputs of the shifter and then upshifting by the twos-complement value of the shift count. The shifter is also used in a barrel-shifter mode to perform up/down shifts, or rotations on either of the 32-bit data words individually. The information used to perform the shifts comes from one of two sources: either as applied to terminal pins by outside sources or from an information byte from an internal status register. The shifted word is applied to one operand input of ALU, the two operands merged, according to the particular instruction commanding the processor's operation in one instruction cycle.

The processor device operates in response to a clock signal supplied to an input terminal and 9-bit instructions that are received and decoded by a decoder circuit which, in turn, issues a plurality of gating signals on a control bus to select and guide operands through the ALU to obtain the result specified by the received instruction. In addition, the processor device is structured to perform arithmetic operations in an 8-bit (byte), a 16-bit (two-byte), a 24-bit (three-byte), or a 32-bit (four-byte) mode so that the selection and gating functions performed by the control signals that issue from the decode circuit select and gate the appropriate number of operand bits to and through the ALU. The bits of the unselected byte(s) of either source or destination operand are passed unaffected to the output, depending on the instruction.

For business applications, the data processor provides variable-length binary coded decimal (BCD) arithmetic. The ALU provided in the processor of the present invention is also capable of performing logical operations on any selected set of 0–31 contiguous bits starting at any bit position within the data words. As with the arithmetic operations, the bits of the unselected portions of either the source or destination operand are passed unaffected.

The processor employs a 32-bit status register to indicate the status of various internal parameters such as overflow, zero, carry, or negative. The processor includes dedicated circuitry implementing a two-bit-at-a-time "moving cell," modified Booth multiply algorithm which operates on both signed and unsigned arithmetic operands. The ALU includes fast full look-ahead carry by utilizing a two-bit logic cell which provides four conditional summations in which last minute correction of the carry is made. This provides for the execution of arithmetic operations with about half the carry generation logic of full look-ahead logic and is one gate level faster than such logic. When shifting is to be performed, however, the look-ahead logic is disabled and operands to be shifted are applied to the 64-bit upshifter and then to an ALU operand input. Other operand inputs of the ALU receive a mask operand or an operand to be merged with the shifted operand, depending upon the particular instruction, thereby executing complex instructions with a single pass through the ALU and in one instruction cycle. Results of any operation are selectively stored in any one (or more) of the storage facilities described above.

A full one-, two-, three- and four-byte priority encoding scheme is implemented by the processor of the present invention. The prioritize operation facilitates normalization of floating-point arithmetic results or the detection of graphics primitives.

This invention is pointed out with particularity in the appended claims. An understanding of the above and further features and advantages of this invention may be obtained by referring to the following description taken in conjunction with the drawings.

BRIEF DESCRIPTION OF THE DRAWINGS

FIG. 1 illustrates a microprocessor system utilizing the 32-bit data processor device of the present invention; and FIG. 2 is a functional block diagram of the processor device of the present invention.

FIG. 3 illustrates the bit assignment of the status register of the present invention.

FIG. 4A shows the format of a byte-boundary-aligned-operand instruction executed by the data processor of the present invention.

FIG. 4B shows the formats of byte-boundary-aligned-operands processed by the device of the present invention.

FIG. 5A shows the format of a variable-length bit-field operand instruction executed by the data processor of the present invention and its accompanying width and position information.

FIG. 5B shows the format of a variable-length bit-field operand processed by the device of the present invention.

FIG. 6A illustrates the execution of a single-precision single-bit down-shift instruction by the processor of the present invention.

FIG. 6B illustrates the execution of a double-precision single-bit down-shift instruction by the processor of the present invention.

FIG. 7A illustrates the execution of a single-precision single-bit up-shift instruction by the processor of the present invention.

FIG. 7B illustrates the execution of a double-precision single-bit up-shift instruction by the processor of the present invention.

FIG. 8A is a flowchart of a signed single-precision division algorithm implemented by the processor of the present invention.

FIG. 8B is a flowchart of an unsigned single-precision division algorithm implemented by the processor of the present invention.

FIG. 8C is a flowchart of an unsigned single-precision multiplication algorithm implemented by the processor of the present invention.

FIG. 9 illustrates the control signals generated by the instruction decoder and carried by the control bus of the processor of the present invention.

FIGS. 10A and 10B are logic diagrams of the mask generator portion of the mask generator/shifter of the processor of the present invention.

FIG. 11 is a logic diagram of the mask shifter portion of the mask generator/shifter of the processor of the present invention.

FIG. 12 illustrates the masking of operands by the data processor device of the present invention.

FIGS. 13A and 13B are block diagrams of the ALU operation block of the data processor of the present invention.

FIG. 14 is a logic diagram of a representative normal logic cell of the ALU operation block of the present invention.

FIG. 15A is a logic diagram of a representative byte-boundary cell of the ALU operation block of the present invention.

FIG. 15B is a logic diagram of the moving cell of the ALU operation block of the present invention.

DESCRIPTION OF THE PREFERRED EMBODIMENT

General

The 32-bit data processor of the present invention is intended for use in microprogrammed systems. The processor is structured to be fabricated in integrated circuit form as a single-package component to be used with other components to form a microprocessor. In addition to its complete arithmetic and logic set, as will be seen below, the processor instruction set and architecture provide a wide range of particularly useful data processing functions. They range from single-operand instructions, for example, bit set, bit reset, bit test, up through three-operand instructions such as variable width logical operations, variable-width byte-aligned arithmetic operations, rotate-and-merge, and multiply-and division-step operations. The architecture of the processor provides the capability of performing each of these instructions in a single clock (instruction) cycle.

FIG. 1 illustrates a typical microprocessor system architecture incorporating a 32-bit data processor constructed in accordance with the teachings of the present invention. The system architecture can be divided into two distinct sections: an instruction acquisition and processing section A on the left and a data acquisition and manipulation section B on the right. Section A includes a sequencer 12 which generates addresses that are coupled to a microprogram memory 14 which contains the microprogram for controlling both the instruction processing section A and the data manipulation section B. The sequence of instruction words, which are read from the microprogram memory 14 in response to the addresses supplied by the microprogram sequencer 12, are applied to a pipeline register 16. The sequencer 12 shown in FIG. 1 may be implemented by an integrated circuit sold by the assignee herein and identified by part No. AM29331 (called a Microprogram Sequence Controller).

The data acquisition and manipulation section B includes the data processing circuits, generally designated as 20, which includes the working registers 22, and the 32-bit data processor device 24 of the present invention. Included within the processor are the arithmetic logic unit (ALU) 26 and the status register 28. The data processing circuits process data acquired from a memory 30 by performing whatever operations are required by the "machine" instruction pointed to by the data acquisition circuits, generally designated as 32, as addressed by a program counter 34 and accessed via a memory address register 36. Each "machine" instruction is implemented on the microprocessor by a sequence of microinstructions selected by the microprogram sequence controller 12.

While, for the purposes of discussion, certain of the blocks shown in FIG. 1 are shown explicitly interconnected by designated lines, it is to be understood that data communication between any of the blocks shown can be effected along a bidirectional data bus 38. Similarly, addresses can be communicated between any of the blocks shown, on an address bus 40.

The working registers 22 are preferably implemented as a dual-access 32-bit wide random access memory (RAM) and are connected to DATA_A and DATA_B inputs of data processor device 24 via 32-bit busses 42 and 44, respectively. Data is transferred between the data bus 38 and the processor 24 on a 32-bit bus 46 which is connected to a Y output of processor 24. The working registers 22 are also connected to the Y output of the processor via bus 46.

Interconnecting the pipeline register 16 and the data processor device circuits 24 is a 9-bit bus 50, a 5-bit width bus 52, a 6-bit position bus 54, and 2 control lines 56 and 58 which respectively supply control signals to an output enable (OE$_Y$) and a status register output select (STAT) terminal of the processor 24. The pipeline register 16 is also connected to the inputs (D) of the sequencer 12 via a bus 60. A status bus 62 conducts the status register test bits on the S terminals of processor 24 to CT inputs of sequencer 12.

The microprocessor system of FIG. 1 also includes a system clock 64 which generates the various clock and timing signals used by the other elements of the system including a clock signal that is supplied to the clock pulse (CP) terminal of the processor device via the signal line 66.

The input-output data bus 38 is provided as the interconnecting link between the microprocessor system of FIG. 1 and the outside world. Data is transferred between the data bus and the processor 24 on the 32-bit Y bus 46 which is connected to the Y terminals of the processor. As will be seen, the Y terminals of the processor device 24 are three-state outputs that facilitate output bus organization, such as illustrated here, controlled by the signal applied to the output enable (OE$_Y$) terminal of the processor 12 via control line 56.

Briefly, what may be termed a "machine" instruction is loaded into an instruction register 68. The contents of the instruction register is applied to a mapping read only memory (ROM) 70 to, in turn, generate the address of the first microinstruction in microprogram memory 14 which must be executed to perform the required function (specified by the instruction held by the instruction register 68). A branch to this address occurs through the microprogram sequence controller 12. The "machine" instruction may call for several microinstructions to be executed such as, for example, fetching data from memory 30, performing an arithmetic or logical operation by the data processing circuits 24, testing for overflow or other status indications within register 28, and so forth.

The coordination of these operations between the instruction acquisition and processing section A and the data acquisition and manipulation section B proceeds as follows: multibit microinstruction words are sequentially read from the microprogram memory 14 in response to address signals provided by the microprogram sequencer 12. Each multibit microinstruction word (including a 9-bit instruction word for the processor device 10) is stored in the pipeline register 16. A certain number of the bits now contained in the pipeline register 16 are returned (in parallel) to the D inputs of the sequencer 12 as next microinstruction information. Certain other of the bits appear as control signals on the busses 52 and 54 to provide width and starting position information to the data processor for use during logical operations; and 9 of the bits held in the pipeline register 16 are supplied on bus 50 to the instruction input terminals INST of the processor device 24 as an instruction word.

These signals cause data to be transferred from memory 30 to the working register 22 and then processed by the data processor device 24 and the result transferred to memory 30. During the processing of the data, the processor 24 may set certain bits in status register 28.

The processor device provides this information to the test CT inputs of microprogram sequence controller 12 on status bus 62 to conditionally modify the next-microinstruction address.

It will be realized by those skilled in the art that the microcomputer system of FIG. 1 is only a simple illustration of the use of the processor 24. In actual practice, additional circuit components will be added to increase performance and data handling capability.

The 32-Bit Data Processor Unit

The internal architecture of the data processor 24 is shown in FIG. 2. The 9-bit portion of the microinstruction contained in pipeline register 16 (FIG. 1) are placed on the bus 50 (FIG. 1) and are received at the nine instruction input terminals INST$_0$–INST$_8$ of the processor 24. A 7-bit processor instruction word, comprising the signals applied to terminals INST$_0$–INST$_6$ is conducted to an instruction decoder 100. The instruction decoder 100 consists of a programmable logic array (PLA) to decode the 7-bit processor instruction words and generate therefrom internal control signals that are conducted to the other elements of the data processor 24 to perform the gating nd control necessary for execution of the processor instruction word. These control signals are conducted on a processor control bus 102. The generation and nature of many of the control signals will become intuitively obvious to those skilled in this art after discussion of the controlled element or circuit and the individual instruction words. However, some of the generated control signals are explained in greater detail with reference to FIG. 9 and following figures below, to insure an understanding of the controlled element or circuit and, in turn, the present invention.

The 2-bit portion of the 9-bit instruction word that is received at processor terminals INST$_7$ and INST$_8$ specifies the byte width for the so-called byte-aligned-operand instructions, in accordance with Table I below. The byte-width signals applied to terminals INST$_7$ and INST$_8$ are conducted therefrom by control lines 104 to a width multiplexer (WIDTH MUX) 106 and to a position multiplexer (POS MUX) 108.

TABLE I

| Byte Width Selection | | |
|---|---|---|
| INST$_8$ | INST$_7$ | Width in Bytes |
| 0 | 0 | 4 |
| 0 | 1 | 1 |
| 1 | 0 | 2 |
| 1 | 1 | 3 |

WIDTH MUX 106 receives on signal lines 110 the 5-bit width information portion of the microinstruction contained in pipeline register 16 (FIG. 1) conducted to the 5 input terminals W$_0$–W$_4$ of the processor 24 via width bus 52 (FIG. 1). WIDTH MUX 106 is also connected via signal lines 114 to the five bits STATUS$_8$–STATUS$_{12}$ of the status register 112 (28 on FIG. 1), comprising a width register portion 112$a$ of the 32-bit status register 112. In response to width control signals W$_0$–W$_4$ received by the processor 24 and to the control signals (generated by instruction decoder 100 from the processor instruction word) on control bus 102 which is also connected to WIDTH MUX 106, the WIDTH MUX selects either a set of five byte-aligned instruction width signals stored in width register 112$a$ and applied on signal lines 114 or the set of five logical instruction width signals applied on signal lines 110. The selected five width signals are conducted on control lines 116 to a mask generator/shifter 118.

POS MUX 108 receives on signal lines 120 the 6-bit-position information portion of the microinstruction contained in pipeline register 16 (FIG. 1) conducted to the 6 input terminals $P_0$–$P_5$ of the processor 24 via position bus 54 (FIG. 1). POS MUX 108 is also connected via signal lines 122 to the six low-order bits STATUS$_0$–STATUS$_5$ of the status register 112, from a position register portion 112b comprising the eight low-order bits STATUS$_0$–STATUS$_7$ of the 32-bit status register. In response to position control signals $P_0$–$P_5$ received by the processor 24 and to the control signals (generated by PLA 100 from the processor instruction word) on control bus 102 which is also connected to POS MUX 108, the POS MUX selects either a set of six byte-aligned instruction position signals stored in position register 112b and applied on signal lines 122 or the set of six logical instruction width signals applied on signal lines 120. The selected six position signals are conducted on control lines 124 to the mask generator/shifter 118 and a 64-bit shifter 126.

The byte-width signal received at the INST$_7$ and INST$_8$ terminals also are conducted to the mask generator/shifter 118 via signal lines 104. The 32-bit output of the mask generator/shifter 118 is connected via a 32-bit bus 128 to a masked operand input (M) of a three-operand arithmetic-logic unit (ALU) 130 (26 on FIG. 1), included in the data processor 24. The mask generator/shifter 118 generates one of two types of 32-bit masks on bus 128, depending on the instruction signals applied to it via control bus 102, the byte-width signals present on lines 104, and the width and position control signals present on lines 116 and 124. The first mask type is 1 to 4 bytes in width and has a byte-boundary-aligned operand with the least-significant bit thereof aligned to the lowest order bit. The width of the generated M-operand is determined in accordance with Table I, above. The second mask type is a 1-to-32-bit width operand starting in any position. The width of the generated M-operand in this case is specified by the width control $W_0$–$W_4$ signals input to processor 24 and the operand starting position (of the least-significant bit position) as specified by the position control signals $P_0$–$P_5$ input to processor 24. In this latter case the operand may or may not be aligned to the lowest order bit.

The mask generated by mask generator/shifter 18 is a low-order set of ZEROs bounded by a fence of ONEs. This mask is then upshifted from 0 to 31 bits by the mask generator/shifter in response to instruction signals on control bus 102. Whenever any portion of the mask is shifted beyond the highest order 31st bit, it does not wrap around to the least-significant bit 0. Rather, ONEs are inserted into the least-significant bit positions, as necessary. Accordingly, the mask generator/shifter 118 generates masks and permits shifts on any contiguous field within a 32-bit word, and across a word boundary.

Data processor 24 can receive data at either of two inputs; a set of 32 data input A terminals DATA_A$_0$—DATA_A$_{31}$ and a set of 32 data input B terminals DATA_B$_0$—DATA_B$_{31}$. An A-bus 132 and a B-bus 134 conduct the 32-bit data signals received at the DATA_A and DATA_B terminals, respectively, to both a source select multiplexer (SOURCE MUX) 136 and a swap multiplexer (SWAP MUX) 138. In addition, both the SOURCE MUX 136 and the SWAP MUX 138 receive 32 data signals representing ZERO bits at their inputs, which are used by various processor instructions and by the 64-bit shifter 126, as a built-in constant. In response to the control signals generated by the instruction decoder 100 and supplied via control bus 102 to the SOURCE MUX 136, SOURCE MUX 136 selects either the A-bus 132, the B-bus 134, or the ZERO constant to be connected via signal lines 140 to the most-significant (MS) 32-bit portion 126a of the 64-bit shifter 126.

The two-input, two-output SWAP MUX 138 is supplied with the control signals 100 generated by instruction decoder 100 on control bus 102, and on a signal line 120a, the high-order bit of the 6-bit position portion of the microinstruction contained in pipeline register 16 (FIG. 1) conducted to the input terminal $P_5$ of the processor 24 and selects either the A-bus 132, the B-bus 134, or the ZERO constant to be output on an output OUT1 which is connected via signal lines 142 to the least-significant (LS) 32-bit portion 126b of the 64-bit shifter 126. In the case where either the A-bus 132 or B-bus 134 is selected, the unselected A-bus or B-bus is output on a second output OUT2 of SWAP MUX 138 which is connected via signal lines 144 to an input of a multiplexer (S MUX) 146 which selects the operand which is to be applied to an S-operand input of the ALU 130, via signal lines 148.

The 32-bit output of the 64-bit shifter 126 is applied via signal lines 127 to an R-operand input of the ALU 130 and is formed from a combination of the data words present on the A-bus 132 and the B-bus 134, in response to the positioning of these inputs thereon, to the selected position control signals received on control lines 124 from either the $P_0$–$P_5$ terminals of processor 24 or from the position portion 112b of status register 112, and to the control signals applied via control bus 102.

Specifically, the output of 64-bit shifter 126 is the most-significant 32 bits of a result formed by treating the selected 6 bits received on control lines 124 as a 6-bit twos complement number (n), conducting either a 0-to-31-bit upshift (n positive) or a 1-to-32-bit downshift (n negative), or some other function, in accordance with Table II, below.

TABLE II

| | 64-Bit Shifter Output | |
|---|---|---|
| MS Input | LS Input | Effective Function |
| A | 0 | n-bit left shift (A) |
| 0 | A | n-bit right shift (A) |
| B | 0 | n-bit left shift (B) |
| 0 | B | n-bit right shift (B) |
| A | A | n-bit rotate (A) |
| B | B | n-bit rotate (B) |
| A | B | Concatenate A, B |
| B | A | Concatenate B, A |

Positioning of the data words on the A-bus and the B-bus at the inputs to the 64-bit shifter 126 is accomplished by the particular 9-bit microinstruction received at the INST$_0$–INST$_8$ inputs of processor 24 and the resulting control signals generated by instruction decoder 100 as applied via control bus 102 to the SOURCE MUX 36 and the SWAP MUX 138.

The 64-bit shifter 126 performs its selected function on-the-fly before application to the R-operand input of the ALU 130 for processing during the same instruction cycle.

The S MUX 146 selects either the input supplied on lines 144 from output OUT2 of SWAP MUX 138, an input on a set of signal lines 150 conducting the 32-bit contents of the status register 112, STATUS–STATUS$_{31}$, or an input on a set of signal lines 152 conducting the 32-bit contents of a 32-bit multiplier-quotient (Q) register 154. The S MUX 146 applies the selected signals to the S-operand of ALU 130, in response to control signals applied via control bus 102.

The ALU 130 is capable of performing a variety of one, two, or three-operand operations on the 32-bit data supplied at its R-, M-, and S-operand inputs in response to the control signals applied via control bus 102, the width and position control signals conducted thereto via signal lines 116 and 124. The resulting 32-bit output F appears on signal lines 156. A 27-bit portion of line 156, comprising the most-significant 27 bits of the ALU output is conducted via signal lines 156a to a set (of twenty-seven) three-state output drivers 158. The drivers 158 place the 27-bit result onto a three-state, bidirectional output Y-bus 162 provided to receive, conduct and transmit the 27 most-significant output signals to the output terminals $Y_5$–$Y_{31}$ of processor 24. The three-state output drivers 158 are enabled by a HIGH signal conducted on a signal line from an $OE_y$ terminal of processor 24.

The five least-significant bits of the 32-bit ALU output are conducted to the $Y_{0-4}$ output terminals via a five-bit portion of output signal lines 156, signal lines 156b, to a Y multiplexer (Y-MUX) 159 which, in response to the signals applied to it on control bus 102, may apply the 5-bit output signal on lines 156b to a set (of five) three-state output drivers 161. The Y-MUX 159 is of a wired-OR construction and therefore no gate-delay penalty is associated with its operation. The drivers 161 then place the least-significant 5-bits of ALU output onto a portion of the three-state, bidirectional output Y-bus 162 provided to receive, conduct and transmit the 5 least-significant output signals to the output terminals $Y_0$–$Y_4$ of processor 24. The set of five three-state output drivers 161 are also connected to the $OE_y$ terminal.

The ALU 130 is provided with full carry look-ahead logic across all 32 bits in the arithmetic mode. The ALU includes sixteen two-bit ALU cells, of which there are two types: a normal cell and a byte-boundary cell. Since the ALU is capable of operating on either one-, two-, three-, or four-byte, byte-aligned operands, the byte-boundary cells extract appropriate boundary-oriented status information.

In an advance over prior art ALUs, the ALU of the present invention employs carry look-ahead logic which operates simultaneously with other ALU functions. In particular, the ALU 130 generates two results for every bit; one assuming the carry-in is a ONE, the other assuming the carry-in is a ZERO. The appropriate carry input at each ALU bit position is determined at the last moment thereby eliminating the array propagation delay associated with previous processors.

The 32-bit ALU 130 has the ability to execute all conventional one- and two-operand operations such as pass, complement, twos complement, add, subtract, AND, NAND, OR, NOR, EXCLUSIVE-OR, and EXCLUSIVE-NOR. For the two-operand operations, the 32-bit operands are nominally called the source input and is applied at the R-operand input of ALU 130 and the destination input, and is applied at the S-operand input of the ALU. The result of the operation can be stored in either the source or destination location, depending on the instruction executed.

Further, the ALU can also execute two- or three-operand masked instructions, in which the mask operand generated by mask generator/shifter 118 is applied at the M-operand input of ALU 130. In this mode the selected operation is performed only on those bit positions of the R- and S-operands corresponding to positions in which the M-operand is a ZERO. The positions of either the source or destination operand corresponding to a ONE in the M-operand pass unaffected, depending on the instruction.

The ALU 130 is capable of performing binary-coded decimal (BCD) arithmetic on packed BCD numbers and has separate carry logic for the BCD operations. This logic generates "nibble" carries for each BCD digit from propagate and generate signals formed from the two BCD operands. As mentioned, all processor instruction types are executed in a single clock cycle except for the BCD instructions, which require two clock cycles.

During a BCD operation addition and subtraction are performed in two clock cycles. During the first cycle, binary addition is performed and BCD nibble carries ($BCDC_{1-8}$) are generated and saved in a nibble-carry register portion 112c of the status register 112, so that processor 24 can be interrupted after the first clock cycle if necessary, to be used during the second clock cycle. During the second clock cycle the BCD result calculated during the first clock cycle is adjusted by applying the eight nibble carries ($BCDC_{1-8}$) stored in the nibble-carry register 112c and conducted to ALU 130 via signal lines 162.

The ALU 130 includes a seventeenth two-bit cell used during signed and unsigned binary multiplication instructions, which are implemented according to a feature of the current invention, by a modified Booth algorithm. As required by this algorithm, this cell is concatenated to the most-significant byte of the ALU 130 as required by the particular byte-width specified by the instruction. Since the modified Booth algorithm requires a two-bit downshift each cycle, the moving cell generates the two most-significant bits of the partial product for each cycle. The ALU 130 is therefore capable of shifting its contents down by two bits for implementing the multiplication algorithm and by shifting its contents up by one bit as required by a divide algorithm or a single-bit upshift instruction. S-MUX 146 can perform one-bit downshifts, as required by certain instructions.

The ALU 130 produces four status signals: carry (C), negative (N), zero (Z), and overflow (OVR), respectively indicating whether the current arithmetic operation produced a carry, a zero or a negative result or an overflow condition. The appropriate status signal C, N, Z or OVR applies only to the result contained within the width specified by the instruction currently being executed. In addition, a link status signal (L) is generated which applies only within the specified width.

The status signals C, N, Z, OVR and L are conducted from the ALU 130 via a 5-bit status signal line 164 to a multiplexer (MUX) 166 which also receives ALU output lines 156. The MUX 166, in response to appropriate signals received on the control bus 102, communicates these status signals to a status signal register portion 112d of the 32-bit status register 112. FIG. 3 illustrates the bit assignments of each of the four portions of the status register 112, each stage having its output signal lines indicated (i.e., 114, 122, 162, 170). These signal lines are part of a 32-bit bus 150 that conducts the status register 112 contents to other parts of the processor 24. Alternatively, the status register 112 can be loaded via MUX 166 from the ALU output F, via signal lines 156 which serves to load the status register 112.

The width portion 112a and position portion 112b of the status register 112 may be updated by data signals transmitted from the ALU 130 to the MUX 166. In response to the signals on control bus 102, MUX 166 causes these five- and six-bit words to be presented to the status register 112 for storage in the width and position portions thereof, respectively. The width can also be loaded from the priority encoder outputs.

The nibble-carry portion 112c of the status register 112 is updated after the first clock cycle of the two cycles required for the BCD arithmetic instructions. The eight BCD carries, $BCDC_{1-8}$ are generated by the ALU 130 and conducted therefrom on an 8-bit signal line 164d to the MUX 166 and in response to the signals on control bus 102, MUX 166 carries these eight bits to be presented to the status register 112 for storage in the nibble carry register 112c.

The status portion 112d of the status register 112 is updated in a manner to be described below.

All necessary information about operations performed by the ALU 130 is stored in the 32-bit status register 112 after every processor instruction cycle, thereby permitting the processor 24 to be interrupted after any processor cycle. The contents of the status register 112 can be saved in the external working registers 22 (FIG. 1) by control signals generated by the instruction decoder 100 from a processor instruction word and transmitted to S-MUX 146 via control bus 102. This causes the S-MUX 146 to select the 32 bits $STATUS_{0-31}$, conducted from the status register 112 on the set of signal lines 150 to S-MUX 146, to be placed on the S-operand of the ALU 130. ALU 130, in response to signals on control bus 102, places these 32 status bits onto its F outputs where they are conducted on signal lines 156 and output Y-bus 162 to the processor output terminals $Y_0-Y_{31}$ and then to the working registers 22 (FIG. 1) via 32-bit bus 46 (FIG. 1).

The status register 112 can be loaded from the DATA_A inputs or the DATA_B inputs terminals by execution of the appropriate processor instruction, which places the contents of the word on the appropriate processor terminals on the F output of the ALU 130 where it is conducted to the status register 112 via ALU output lines 156 and the MUX 166.

This store and load combination allows saving and restoring the contents of the status register 112 for interrupt processing.

The processor 24 is provided with a set of five status output terminals $S_0-S_4$. These output terminals can receive the status signals C, N, Z, OVR and L via the 5-bit status signal line 164 through a status multiplexer (STATUS MUX) 168. In response to an appropriate signal received on a status output select signal line 58 (FIG. 1) at an input terminal STAT of processor 24, STATUS MUX 168 communicates these five status signals to the five status output terminals $S_0-S_4$.

The status register portion 112d of register 112 can also, via the STATUS MUX 168 be selected as a source for output on the five status output terminals $S_0-S_4$, in response to the appropriate signal of the STAT input to processor 24. Signal lines 170 connect the 5-bit status register portion 112d to the STATUS MUX 168, and a HIGH signal applied to the STAT input terminal will cause STATUS MUX 168 to place the five bits of the register status onto the status output terminals $S_0-S_4$ through three-state buffer drivers 196. A LOW signal will cause STATUS MUX 168 to place the ALU status signals C, N, Z, OVR, L onto the $S_0-S_4$ terminals.

The $STATUS_{13}$, $STATUS_{14}$ and $STATUS_{15}$ positions of status register 112 contain the logical combination of the status signals C, N, Z and OVR stored in the status register 112 shown in Table III, below.

TABLE III

| STATUS Bit | Extracted Status Signals Extracted Signal |
|---|---|
| 13 | $\overline{C} + Z$ |
| 14 | $N \oplus OVR$ |
| 15 | $(N \oplus OVR) + Z$ |

These three status register bit positions can be read by execution of an extract-status processor instruction, which will be described below, which causes the ALU 130 to present the appropriate extracted status signal on the least-significant bit of the ALU 130 F output where it can be conducted to the $Y_0$ output terminal of the processor 24, via Y-MUX 159.

The Q-register 154 is connected to the ALU 130 output F via a Q-shifter 172 which receives the 32 ALU output lines 156. Signal lines 174 connect the output of the Q-shifter to the Q-register 154. The output of the Q-register 154 on lines 152 is connected to the input of the Q-shifter 172. Q-shifter 172 and Q-register 154 receive control signals via control bus 102 so that Q-shifter 172, in conjunction with Q-register 154, can implement certain multiplication and division instructions which entail shifting the Q-register 154 right two bits, and left one bit, at a time, respectively. Product bits are inserted into the most-significant two bits, as determined by the byte-width selected, during multiplication. Quotient bits are inserted in the least-significant bit, bit 0, during division. In a manner similar to the loading of the status register 112, the Q-register 154 can be loaded from either the DATA_A or DATA_B input terminals of processor 24.

The ALU 130 communicates the 32-bit operand received at its S-operand input to a priority encoder 176 via signal lines 178. The processing encoder receives on signal lines 116 the 5-bit byte-width information selected by WIDTH MUX 106. The priority encoder 176 generates a 5-bit binary encoded word to indicate the location of the highest-order ONE in the one- to four-byte width word received at its input. Only those S-operand bits which have not been masked at the M-operand input to ALU 130 by the mask generator/shifter 118 participate in the prioritization. The priority encoder 176 operates on any byte-aligned one- to four-byte width operand as specified by the byte-width selected by WIDTH MUX 106. For each such byte width, the priority encoder generates the appropriate binary weighted code in accordance with Table IV, below.

Note that if none of the inputs are a ONE, or if the most-significant bit of the input, for the particular byte-width selected, is a ONE, then the output of the priority encoder 176 is zero. The difference between these two cases is indicated by setting the Z status signal bit of the status register 112 to ONE in the former case and to ZERO in the latter.

TABLE IV

| Selected Byte-Width | Priority Encoding Highest-priority Active Bit | Encoder Output |
|---|---|---|
| 00 | NONE | 0 |
| (thirty-two bits) | 31 | 0 |
| | 30 | 1 |
| | 29 | 2 |
| | . | . |
| | . | . |
| | . | . |
| | 1 | 30 |
| | 0 | 31 |
| 01 | NONE | 0 |
| (eight bits) | 7 | 0 |
| | 6 | 1 |
| | 5 | 2 |
| | . | . |
| | . | . |
| | 1 | 6 |
| | 0 | 7 |
| 10 | NONE | 0 |
| (sixteen bits) | 15 | 0 |
| | 14 | 1 |
| | 13 | 2 |
| | . | . |
| | . | . |
| | 1 | 14 |
| | 0 | 15 |
| 11 | NONE | 0 |
| (twenty-four bits) | 23 | 0 |
| | 22 | 1 |
| | 21 | 2 |
| | . | . |
| | . | . |
| | 1 | 22 |
| | 0 | 23 |

The output of priority encoder 176 is conducted to the Y-MUX 159 via 5-bit signal line 180 which, in response to the signal on control bus 102, i.e. the processor instruction being executed, the Y-MUX can select. The five priority encoder bits are presented on the $Y_{0-4}$ output terminals of processor 24. The result of the prioritize operation can be used in the following clock cycle to, for example, normalize a floating point number or detect the edge of a polygon in a graph application. The output of the priority encoder 176 is accordingly also conducted via signal line 180 to the MUX 166, where in response to signals on the control bus 102, the priority encoder bits may be stored in the position portion 112b of the status register 112.

The data processor 24 provides parity error detection on the DATA—A and DATA—B inputs and parity generation on the Y output. Each eight-bit byte at the DATA—A input has an associated parity bit $PA_i$, i=0, 1, 2, 3 as does each eight-bit byte at the DATA—B input, $PB_i$, i=0, 1, 2, 3. A parity checker 182 receives the DATA—$A_{0-31}$ input word via the A-bus 132 and the associated four parity bits $PA_{0-3}$ applied at A-parity terminals A—$PAR_{0-3}$ and conducted therefrom on a 4-bit signal line 184. Parity checker 182 also receives the DATA—$B_{0-31}$ input word via the B-bus 134 and the associated four parity bits $PB_{0-3}$ applied at B-parity terminals B—$PAR_{0-3}$ and conducted therefrom on a 4-bit signal line 186. Parity checker 182 generates a HIGH parity error signal, which is conducted to a PARITY—ERROR output terminal of processor 24, if a parity error is detected on any input byte.

A parity generator 188 is provided for the ALU 130 32-bit output word which receives the ALU F output via signal lines 156. A set of four parity bits, $PY_i$, i=0, 1, 2, 3, is generated by parity generator 188, each bit associated with an eight-bit byte of the ALU output word, and the 4-bit parity word is conducted to a set of four output Y—$PAR_{0-3}$ terminals of processor 24. The parity generator 188 also receives on signal lines 180 the 5-bit output of the priority encoder 176 and, on the control bus 102, the control signals generated by instruction decoder 100, and in response thereto, can generate a low-order parity bit $PY_0$ associated with the five priority encoder bits generated by priority encoder 176.

The processor 24 has a comparator 190 which is connected to the input and output terminals of the buffer drivers 196, 195, 158, 161 and 199. The comparator 190 compares each pair of signals of each side of the buffer drivers. (In FIG. 2 the comparator 190 is symbolically drawn with paired sets of lines to indicate this relationship.) A Master/Slave Error is generated by the comparator 190 if any one of these signal pairs are not identical. In the Master mode, the comparator 190 merely decides whether each of the buffer drivers 196, 195, 158, 161 and 199 is operating properly. As in a Slave mode and coupled to a second processor, the comparator 190 performs a much more serious error checking function.

In the Slave mode, each of the output terminals $S_{0-4}$, Y—$PAR_{0-3}$, $Y_{5-31}$, $Y_{0-4}$ and PARITY ERROR, operate instead as input terminals. A HIGH signal on a Slave/Master (S/M) terminal selects the Slave mode. In combination with an Output Enable ($OE_y$) signal through an AND gate 197, the three-state buffer drivers 196, 195, 158, 161 and 199 are turned off into their high resistance state. The output terminals $S_{0-4}$, Y—$PAR_{0-3}$, $Y_{5-31}$, $Y_{0-4}$ and PARITY ERROR are decoupled from the STATUS MUX 168, parity generator 188, ALU 130, Y-MUX 159 and parity checker 182 respectively. The output terminals can now perform as input terminals.

The output and input terminals of a first processor 24 may now be connected to the output and input terminals of a second processor 24. One processor is the master and the second is the slave. Both processors, however, receive the same instructions and data to operate on simultaneously. The slave processor thus receives the same data as the master processor and also receives the output signals of the master processor through its output terminals.

Thus the comparator 190 of the slave processor checks whether the status signals on the output terminals $S_{0-4}$ of the master processor match the status signals generated by the slave processor. Similarly the data output signals at the $Y_{5-31}$ and $Y_{0-4}$ are matched, along with the parity signals Y—$PAR_{0-3}$ for the data output signals. The comparator 190 of the slave processor even checks whether the parity checker 182 output signal coincides for the parity signals (A-$PAR_{0-3}$ and B-$PAR_{0-3}$) the data input signals at the input terminals DATAA$_{0-31}$ and DATAB$_{0-31}$. In this manner the slave processor acts as a dual processor to decide the integrity of the data flowing through the coupled processor systems against hardware error. The master-slave arrangement can also be expanded beyond two processors in parallel.

The data processor 24 can be operated in either a borrow- or carry-mode and is provided with a BORROW input terminal which conducts the signal applied to it via signal line 190a to the instruction decoder 100. A HIGH signal applied to the BORROW terminal causes all control signals generated by instruction decoder 100 to ALU 130 on control bus 102 during subtraction operations to cause a borrow rather than a carry to be used and generated within the ALU 130.

C. Instruction Set

The data processor 24 of the present invention operates in response to processor instructions contained in the pipeline register 16 (FIG. 1) and conducted therefrom to the processor 24 at its INST, W and P input terminals. A total of 128 processor instructions are available within the processor's instruction set.

1. Byte-Boundary-Aligned Operand Instruction

The processor instruction set includes seven byte-boundary-aligned operand instruction groups:

1. Data Movement (double operand);
2. Logical (single and double operand);
3. Single Bit Shifts (up, down-single and double precision)
4. Prioritize
5. Arithmetic (binary, BCD)
6. Division Steps (single and multiple precision)
7. Multiply Steps The byte-boundary-aligned instructions are controlled by nine bits ($I_8I_7 \ldots I_1I_0$) applied to the INST input terminals of processor 24 via bus 50 (FIG. 1). FIG. 4A illustrates the byte-boundary-aligned instruction format and the instruction bit assignments, and FIG. 4-B illustrates the bit assignments for the byte-boundary-aligned operands to which the byte-boundary-aligned instructions apply. Byte-boundary-aligned instructions apply to the byte-boundary-aligned integer and binary-coded-decimal (BCD) data types. Table V, below, shows the attributes of the three data types on which processor 24 operates: integer, BCD and variable-length bit field. Table I, above, shows how the operand byte width is specified by the $I_8$ and $I_7$ bits of the byte-boundary-aligned instructions. (Byte-boundary-aligned instructions do not use width and position information.) Bits $I_6I_5 \ldots I_0$ contain the operation code (op code) portion of the instruction.

TABLE V

Processor Data Types

| Type | Operand Length | Range Signed (two's complement) | Unsigned |
|---|---|---|---|
| Integer | 1-Byte (8 bits) | $-2^7$ to $+2^7-1$ | 0 to $2^8-1$ |
| | 2-Byte (16 bits) | $-2^{15}$ to $+2^{15}-1$ | 0 to $2^{16}-1$ |
| | 3-Byte (24 bits) | $-2^{23}$ to $+2^{23}-1$ | 0 to $2^{24}-1$ |
| | 4-Byte (32 bits) | $-2^{31}$ to $+2^{31}-1$ | 0 to $2^{32}-1$ |
| BCD | 1 to 4 Bytes (2, 4, 6 or 8 digits) | Numeric, 2 digits per byte. Most-significant digit may be used for sign. | |
| Variable | 1 to 32 bits | Dependent on position and width inputs. | |

2. Variable-Length Bit Field Operand Instructions

The processor instruction set includes four variable-length bit field operend instruction groups:

8. N-bit Shifts, Rotates
9. Single-bit Operations
10. Field Logical Operations (aligned, non-aligned, extract)
11. Mash Generation The variable-length bit field instructions consist of nine bits ($I_8I_7 \ldots I_1I_0$) applied to the INST input terminals of processor 24 via bus 50. Accompanying the instruction are width and position information conducted from the pipeline register 16 to the processor 24 at its W and P input terminals, respectively, via 5-bit signal lines 52 and 6-bit signal lines 54, respectively. FIG. 5A illustrates the variable-length bit field instruction format and the instruction bit assignments, and FIG. 5B illustrates the bit assignments for the variable-length bit field operand to which the variable-length bit field instructions apply. Depending on bits $I_8$ and $I_7$ of the variable-length bit field instruction, accompanying the instruction and either the width and/or position information applied to the $W_4-W_0$ width inputs and to the $P_5P_0$ position iputs, respectively, of processor 24 or the width and/or position information stored in the width portion and position portion of the status register 28 (112a and 112b, respectively, of FIG. 2) will be used to determine the values of the position of the least-significant bit of the operand with respect to bit 0, i.e. the value P shown in FIG. 5B, and the width of the operand. Table VI, below, describes the manner in which instruction bits $I_8$ and $I_7$ determine the source of these operand width and position parameters. Bits $I_6I_5 \ldots I_0$ contain the operation code (op code) position of the instruction.

TABLE VI

Variable-Length Operand Parameter Source

| Inst Bits | | Width Source | | Position Source | |
|---|---|---|---|---|---|
| $I_8$ | $I_7$ | $W_4-W_0$ Term. | Status Reg. | $P_5-P_0$ Term. | Status Reg. |
| 0 | 0 | X | | X | |
| 0 | 1 | X | | | X |
| 1 | 0 | | X | X | |
| 1 | 1 | | X | | X |

For variable-length bit field instructions which allow a field to be shifted up or down, $P_5-P_0$ is interpreted as a two's complement number in the range $-32$ to $+31$ representing the magnitude and direction of the shift. For instructions which assume a fixed field position, $P_4-P_0$ represent the position of the least-significant bit of the field and $P_5$ is ignored.

3. Byte-Boundary-Aligned Operand Instruction Descriptions

Table VII, below, contains a desription of the twelve byte-boundary-aligned operand instructions comprising Group 1 (Data Movement).

TABLE VII

Group 1 - Data Movement Instructions

| A. | | | | Sources | |
|---|---|---|---|---|---|
| Op Code | Mnemonic | Dest | F(Op1, Op2) | Op1 | Op2 |
| 00 | ZERO-EXTA | Y | A | A | 0 |
| 01 | ZERO-EXTB | Y | B | B | 0 |
| 02 | SIGN-EXTA | Y | A | A | <sign bit (A, |

TABLE VII-continued

Group 1 - Data Movement Instructions

| Op Code | Mnemonic | | | | |
|---|---|---|---|---|---|
| 03 | SIGN-EXTB | Y | B | B | byte-width)*−1:0>[1] <sign bit (B, byte-width)*−1:0> |
| 04 | PASS-STAT | Y | ST-REG | ST-REG | B |
| 05 | PASS-Q | Y | Q-REG | Q-REG | B |
| 06 | LOADQ-A | Q-REG | Q-REG | Q-REG | A |
|    |         | Y     | Q-REG | Q-REG | A |
| 07 | LOADQ-B | Q-REG | Q-REG | Q-REG | B |
|    |         | Y     | Q-REG | Q-REG | B |
| 0E | MERGEA-B | Y | A | A | B |
| 0F | MERGEB-A | Y | B | B | A |
| 1C | LDSTAT-A[2] | ST-REG | A | A | ST-REG |
|    |             | Y      | A | A | ST-REG |
| 1D | LDSTAT-B[2] | ST-REG | B | B | ST-REG |
|    |             | Y      | B | B | ST-REG |

B.

| Op Code | Mnemonic | Status Flag(s) Set |
|---|---|---|
| 00 | ZERO-EXTA | $Z \leftarrow (Y=0)$, $N \leftarrow$ signbit(Y, byte-width) |
| 01 | ZERO-EXTB | $Z \leftarrow (Y=0)$, $N \leftarrow$ signbit(Y, byte-width) |
| 02 | SIGN-EXTA | $Z \leftarrow (Y=0)$, $N \leftarrow Y_{31}$ |
| 03 | SIGN-EXTB | $Z \leftarrow (Y=0)$, $N \leftarrow Y_{31}$ |
| 04 | PASS-STAT | none |
| 05 | PASS-Q | none |
| 06 | LOADQ-A | $Z \leftarrow ((Y \text{ AND bytemask(byte-width)})=0)$<br>$N \leftarrow$ signbit(Y, byte-width) |
| 07 | LOADQ-B | $Z \leftarrow ((Y \text{ and bytemask(byte-width)})=0)$<br>$N \leftarrow$ signbit(Y, byte-width) |
| 0E | MERGEA-B | $Z \leftarrow ((Y \text{ AND bytemask(byte-width)})=0)$<br>$N \leftarrow$ signbit(A, byte-width) |
| 0F | MERGEB-A | $Z \leftarrow ((Y \text{ AND bytemask(byte-width)})=0)$<br>$N \leftarrow$ signbit(B, byte-width) |
| 1C | LDSTAT-A | $Z \leftarrow A_{19}$, $N \leftarrow A_{17}$, $C \leftarrow A_{16}$<br>$L \leftarrow A_{20}$, $M \leftarrow A_{22}$, $S \leftarrow A_{21}$[3]<br>$OVR \leftarrow A_{18}$ |
| 1D | LDSTAT-B | $Z \leftarrow B_{19}$, $N \leftarrow B_{17}$, $C \leftarrow B_{16}$<br>$L \leftarrow B_{20}$, $M \leftarrow B_{22}$, $S \leftarrow B_{21}$[3]<br>$OVR \leftarrow B_{18}$ |

[1] This notation refers to an operand consisting of 32 bits, >bit (32-1):bit0>, each bit of which is the sign (upper-most) bit of that portion of A or B within the byte-width specified by the $I_8$ and $I_7$ bits of the instruction.

[2] Bits 13, 14, 15 and 23 of the status register 112 cannot be written.

[3] If byte-width = 00 or 11, else unchanged.

Table VIIA, as do Tables VIIIA through XVIIA below, (for Groups, 2 through 11) describes each instruction within Group 1 by indicating the instruction's op code in column one. The instruction's operation code (op code) is given in hexidecimal notation (A=10, B=11, C=12, D=13, E=14, F=15) corresponding to the seven instruction bits $I_6 I_5 \ldots I_0$. The instruction mnemonic follows in column two. The operation of the instruction is explained in column three through the use of the following notation (note that Table VIIA illustrates only that for the double-operand instructions):

For Byte-Boundary-Aligned-Single-Operand Instructions:
Dest is the destination for the result of the instruction;
Op$_1$ is the source of the single operand;
Op$_2$ is omitted; and
F(Op$_1$) is the function called for by the instruction on the operand Op$_1$.

For each function a bytemask is determined by the byte width specified by the $I_8$ and $I_7$ bits of the instruction and returns a mask consisting of ZEROs in the least-significant bytes selected by the $I_8$, $I_7$ bits according to Table I and ONEs in the remaining bytes, shown in FIG. 4B as the unshaded and shaded bytes, respectively.

The function will be determined by the bytemask so that the bit positions "selected" by the bytemask (ZEROs) are passed to the destination (Dest) from the corresponding bit positions of the result of the F(Op$_1$) and the "unselected" bits positions in the bytemask (ONEs) are passed to Dest from the corresponding bit positions of the operand Op$_1$.

For Byte-Boundary-Aligned Two-Operand Instructions:
Dest is as for single-operand instructions;
Op$_1$ is the first operand;
Op$_2$ is the second operand; and
F(Op$_1$, Op$_2$) is the function called for by the instruction on the operands Op$_1$ and Op$_2$.

The bytemask is determined as for the single operand instructions and the function F(Op$_1$, Op$_2$) is determined by the bytemask as for the single operand instructions, with the unselected bit positions of the Op$_2$ being passed to Dest.

For Byte-Boundary-Aligned Shift Instructions:
Dest is as for single-operand instructions;
Op$_1$ is the operand to be shifted;
Op$_2$ is the second operand;
Fill-bit is the bit to be used to fill during the shift; and
Shiftdir specifies either an up or down shift.

For each shift instruction, the byte-width specified by the $I_8$ and $I_7$ bits of the instruction is the number of bytes which take part in the shift and the bytemask is determined as for the single-operand instructions, with the unselected bit positions being passed to Dest from the corresponding bit positions of the operand Op$_2$.

As an example of the entries in Table VIIA, consider a ZERO-EXTA instruction (which has an op code of 00) with a byte-width of one specified. This instruction would have the nine-bit format /01/0000000/ and as shown on row one of Table VIIA is a two-operand instruction using a 32-bit word present on the DATA_A terminals of processor 24 and a 32-bit word consisting of all ZEROs as the sources, and the 32-bit output Y-terminals as the destination. The instruction bits $I_8I_7$ are 01, and thus the byte-width is 1 in accordance with Table I, above. Hence, the bytemask used in carrying out the instruction will consist of all ZEROs in the least-significant byte and all ONEs in the three most-significant bytes.

Since the specified function simply reproduces the first operand when applied to any operand pair, the "selected" least-significant byte at the destination Y-terminals will be the low-order byte of the operand word present on the DATA_A terminals, while the unselected upper three bytes will be the upper three bytes of the second operand word, being all ZEROs. Thus the ZERO-EXTA instruction specifying a byte-width of one causes the low-order byte of the 32-bit word present at the DATA_A terminals of the processor 24 to pass to its Y-terminals. In general, the ZERO-EXTA instruction selects the number of least-significant bytes at the DATA_A input terminals which pass to the Y output terminal; the unselected, most-significant output bytes contain ZEROs.

With reference to Table VIIB, the ZERO-EXTA instruction sets the zero detect (Z) flag of the status register 112, $STATUS_{19}$, HIGH if all 32 bits presented at the Y output terminals of processor 24 are ZERO: otherwise the Z flag is set LOW. Also the negative detect (N) flag of the status register, $STATUS_{17}$, is set HIGH if the sign bit of that portion of the bits presented at the Y output terminals within the byte width specified by the ZERO-EXTA instruction is a ONE, indicating a negative number within that portion (which is the byte width of that least-significant number of bytes passed to the Y-terminals from the DATA_A inputs).

As can be seen from Table VIIA, there are five possible sources of operands for the Group 1 Data Movement instructions; the DATA_A (A) and DATA_B (B) input terminals to processor 24, the "0" operand input, the Q-REGISTER (Q-REG) 154 and the status register (ST-REG) 112, and three possible destinations; the Y output terminals (Y) 160, the bbK-REG and the ST-REG.

The processor 24 accepts the op code of the particular Group 1 instruction to be executed at the $INST_{0-6}$ inputs to the instruction decoder 100 which, via the control signals generated on the control bus 102 as applied to the SOURCE-MUX 136 and the SWAP-MUX 138 assures that the inputs at the DATA_A, DATA_B, or the "0" operand, is conducted to the R- and S- operand inputs to the ALU 130. (Or, for those Group 1 instructions involving the Q-REG 154 or the ST-REG 112, the control signals are generated on the control bus 102 applied to the S-MUX 146 assuring that the contents of the Q-REG or the ST-REG is conducted to the S-operand input of ALU 130. In addition, the $INST_{7-8}$ inputs receive the byte-width portion of the instruction to be executed and the mask generator/shifter 118 receives width and position signals via the WIDTH-MUX 106 and the POS-MUX 108 in response to the control signals on bus 102 which cause the bytemask specified by the instruction to be conducted to the M-operand input of the ALU 130.

The ALU 130, in response to the control signals generated by the instruction decoder 100 as received via the control has 102 performs the function called for by the instruction in accordance with the $F(Op_1, Op_2)$ column of Table VIIA, above, and passes the "selected" bits, according to the function $F(Op_1, Op_2)$ and the bytemask generated by mask generator/shifter 118 of the M-Operand input of the ALU 130, to the F output of the ALU. "Unselected bits" are passed to the F output of the ALU 130 from either the R- or S-operand inputs, depending on the particular Group 1 instructions, in accordance with Table VIIA in response to the control signals on control bus 102. (Most two-operand instructions pass the unselected bits form the S-operand input.)

The resulting output at the F output of ALU 130, is placed on the bus 156 and in response to the control signals on the bus 102, is then conducted via either MUX 159 or 166, Q-SHIFTER 172 (or in conjunction with output-enable signal $OE_Y$) to either the destination ST-REG, Q-REG or the Y output terminals, respectively, in accordance with the Dest column of Table VIIA.

With respect to the SIGN-EXTA and SIGN-EXTB instructions of Group 1, the sign extension called for in the $Op_2$ source column of Table VIIA is performed by the 64-bit shifter 126 on either the word at the DATA_A or DATA_B input, respectively, as presented to the shifter 126 via SOURCE-MUX 136, in response to the control signals on bus 102 received by the SOURCE-MUX 136 and on shifter 126. The shifter 126 extends the sign bit of the DATA-A or DATA-B throughout the unselected bytes in response to the byte-width information received by POS-MUX 108 on signal lines 104 from the instruction bits $I_8$ and $I_7$, the POS-MUX 108, in turn, generates a 6-bit position signal on lines 124 which controls the shift produced by shifter 126.

Also with respect to the SIGN-EXTA and SIGN-EXTB instructions of Group 1, the sign extension called for in the $Op_2$ source column of Table VIIA is performed by the S_MUX 146 which passes the portion of the operand selected by the instruction bits $I_8$ and $I_7$ corresponding to the byte-width specified by the SIGN_EXTA or SIGN_EXTB instructions on the lower bytes and passes the extended sign bits of the A or B operand on the upper unselected bytes.

The Group 1 instructions affect the status signals generated by the ALU 130 in accordance with Table VIIB, above. Each instruction changes only the ALU status flag(s) shown; all other ALU status flags are unchanged. Unless otherwise specified a source or destination designation which is unsubscripted means that all specified bits are involved in the indicated test. For example, the LOADQ-A instruction sets the ALU Z status flag according to the test (Y AND bytemask (byte-width))=0. This means that all Y-bits at the output of the ALU 130 within the byte-width specified by bits $I_8$ and $I_7$ of the LOADQ-A instruction will be tested by the ALU 130 and, the Z flag will be set to ONE if all such bits are ZERO. Otherwise the ALU will set Z to ZERO.

The LDSTAT-A and LDSTAT-B instructions, as shown in Table VIIB, cause the ALU 130 to set the Z, N, C, L, M, S and OVR ALU status bits from the individual bits of the word at the DATA-A input or the DATA-B input, respectively, as this word is conducted to the ALU 130 R-operand input via the SOURCE-MUX 136. These ALU status bits are set only for byte-widths of 3 or 4 as specified by the instruction bits $I_8$ or $I_7$.

Table VIII, below, contains a description of the eight (single- and double-operend) byte-boundary-aligned operand logical instruction comprising Group 2.

TABLE VIII
Group 2 - Logical Instructions

A.

| Op Code | Mnemonic | Dest | $F(Op_1)$ or $F(Op_1, Op_2)$ | Source(s) $Op_1$ | $Op_2$ |
|---|---|---|---|---|---|
| 08 | NOT-A | Y | $\overline{A}$ | A | |
| 09 | NOT-B | Y | $\overline{B}$ | B | |
| 3E | OR | Y | A v B | A | B |
| 3F | XOR | Y | A ⊕ B | A | B |
| 40 | AND | Y | A · B | A | B |
| 41 | XNOR | Y | $\overline{A \oplus B}$ | A | B |
| 3C | ZERO | Y | "0" | B | |
| 3D | SIGN | Y | ST-REG$_{17}^*(-1)^{(1)}$ | ST-REG$_{17}^*(-1)^{(1)}$ | B |

B.

| Op Code | Mnemonic | ALU Status Flag(s) Set |
|---|---|---|
| 08 | NOT-A | Z ← (Y AND bytemask(byte-width)=0), N ← signbit(Y, byte-width) |
| 09 | NOT-B | (as for NOT-A) |
| 3E | OR | (as for NOT-A) |
| 3F | XOR | (as for NOT-A) |
| 40 | AND | (as for NOT-A) |
| 41 | XNOR | (as for NOT-A) |
| 3C | ZERO | (as for NOT-A) |
| 3D | SIGN | (as for NOT-A) |

(1)This notation refers to an operand consisting of 32 bits each bit of which is the content of the status register sign bit, 17, i.e., N.

The manner in which these Group 2 instructions are executed on the ALU 130 should be self-evident. It should be noted that the NOT-A, NOT-B, and ZERO are single-operand instructions and the "unselected" bit positions, as specified by the byte-width-generated bytemask, are passed to the destination, Y, in all cases, from the corresponding bit positions at the single-operand $Op_1$. For example, the ZERO instruction causes the ALU 130 to place ZEROs into the "selected" bytes of the processor output terminals Y; the "unselected" high-order bytes are taken from those bytes of the word on the DATA-B inputs to the processor 24.

Table IX, below, contains a description of the twenty-eight up, down, single- and double-precision single-bit shift byte-boundary-aligned instructions comprising Group 3.

TABLE IX
Group 3 Single Bit Shift Instructions

| Op Code | Mnemonic | Dest | Shiftdir | $Op_1$ | $Op_2$ | Fill-Bit |
|---|---|---|---|---|---|---|

A.1 Single Precision

| Op Code | Mnemonic | Dest | Shiftdir | $Op_1$ | $Op_2$ | Fill-Bit |
|---|---|---|---|---|---|---|
| 20 | DN1-0F-A | Y | Down | A | A | 0 |
| 21 | DN1-0F-B | Y | Down | B | B | 0 |
| 24 | DN1-1F-A | Y | Down | A | A | 1 |
| 25 | DN1-1F-B | Y | Down | B | B | 1 |
| 28 | DN1-LF-A | Y | Down | A | A | ST-REG$_{20}$ |
| 29 | DN1-LF-B | Y | Down | B | B | ST-REG$_{20}$ |
| 2C | DN1-AR-A | Y | Down | A | A | signbit (A, byte-width) |
| 2D | DN1-AR-B | Y | Down | B | B | signbit (B, byte-width) |
| 30 | UP1-0F-A | Y | Up | A | A | 0 |
| 31 | UP1-0F-B | Y | Up | B | B | 0 |
| 34 | UP1-1F-A | Y | Up | A | A | 1 |
| 35 | UP1-1F-B | Y | Up | B | B | 1 |
| 38 | UP1-LF-A | Y | Up | A | A | ST-REG$_{20}$ |
| 39 | UP1-LF-B | Y | Up | B | B | ST-REG$_{20}$ |

TABLE IX-continued
Group 3 Single Bit Shift Instructions

A.2 Double Precision

| Op Code | Mnemonic | Dest | Shiftdir | $Op_1$ | $Op_2$ | Fill-Bit |
|---|---|---|---|---|---|---|
| 22 | DN1-0F-AQ | Y | Down | A | A | 0 |
| | | Q | Down | Q | Q | $A_0$ |
| 23 | DN1-0F-BQ | Y | Down | B | B | 0 |
| | | Q | Down | Q | Q | $B_0$ |
| 26 | DN1-1F-AQ | Y | Down | A | A | 0 |
| | | Q | Down | Q | Q | $A_0$ |
| 27 | DN1-1F-BQ | Y | Down | B | B | 1 |
| | | Q | Down | Q | Q | $B_0$ |
| 2A | DN1-LF-AQ | Y | Down | A | A | ST-REG$_{20}$ |
| | | Q | Down | Q | Q | $A_0$ |
| 2B | DN1-LF-BQ | Y | Down | B | B | ST-REG$_{20}$ |
| | | Q | Down | Q | Q | $B_0$ |
| 2E | DN1-AR-AQ | Y | Down | A | A | signbit (A, byte-width) |
| | | Q | Down | Q | Q | $A_0$ |
| 2F | DN1-AR-BQ | Y | Down | B | B | signbit (B, byte-width) |
| | | Q | Down | Q | Q | $B_0$ |
| 32 | UP1-0F-AQ | Y | Up | A | A | signbit (Q, byte-width) |
| | | Q | Up | Q | Q | 0 |
| 33 | UP1-0F-BQ | Y | Up | B | B | signbit (Q, byte-width) |
| | | Q | Up | Q | Q | 0 |
| 36 | UP1-1F-AQ | Y | Up | A | A | signbit (Q, byte-width) |
| | | Q | Up | Q | Q | 1 |
| 37 | UP1-1F-BQ | Y | Up | B | B | signbit (Q, byte-width) |
| | | Q | Up | Q | Q | 1 |
| 3A | UP1-LF-AQ | Y | Up | A | A | signbit (Q, byte-width) |
| | | Q | Up | Q | Q | ST-REG$_{20}$ |
| 3B | UP1-LF-BQ | Y | Up | B | B | signbit (Q, byte-width) |
| | | Q | Up | Q | Q | ST-REG$_{20}$ |

| Op Code | Mnemonic | ALU Status Flags Set |
|---|---|---|

B.1 Single Precision

| Op Code | Mnemonic | ALU Status Flags Set |
|---|---|---|
| 20 | DN1-0F-A | Z ← (Y AND bytemask(byte-width) = 0), N ← signbit(Y, byte-width), L ← $A_0$ |
| 21 | DN1-0F-B | (as for DN1-0F-A) |
| 24 | DN1-1F-A | (as for DN1-0F-A) |
| 25 | DN1-1F-B | (as for DN1-0F-B) |
| 28 | DN1-LF-A | (as for DN1-0F-A) |
| 29 | DN1-LF-B | (as for DN1-0F-B) |
| 2C | DN1-AR-A | (as for DN1-0F-A) |
| 2D | DN1-AR-B | (as for DN1-0F-B) |
| 30 | UP1-0F-A | Z ← (Y AND bytemask(byte-width) = 0), N ← signbit(Y, byte-width), L ← $A_0$ OVR ← signbit(A, byte-width) ⊕ signbit (Y, byte-width), L ← signbit(Y, byte-width) |
| 31 | UP1-0F-B | (as for UP1-0F-A) |
| 34 | UP1-1F-A | (as for UP1-0F-A) |
| 35 | UP1-1F-B | (as for UP1-0F-B) |
| 38 | UP1-LF-A | (as for UP1-0F-A) |
| 39 | UP1-LF-B | (as for UP1-0F-B) |

B.2 Double Precision

| Op Code | Mnemonic | ALU Status Flags Set |
|---|---|---|
| 22 | DN1-0F-AQ | Z ← (Y AND bytemask(byte-width) = 0), N ← signbit(Y, byte-width), L ← $Q_0$ |
| 23 | DN1-0F-BQ | (as for DN1-0F-AQ) |
| 26 | DN1-1F-AQ | (as for DN1-0F-AQ) |
| 27 | DN1-1F-BQ | (as for DN1-0F-AQ) |
| 2A | DN1-LF-AQ | (as for DN1-0F-AQ) |
| 2B | DN1-LF-BQ | (as for DN1-0F-AQ) |
| 2E | DN1-AR-AQ | (as for DN1-0F-AQ) |
| 2F | DN1-AR-BQ | (as for DN1-0F-AQ) |
| 32 | UP1-0F-AQ | Z, N as for DN1-0F-AQ, OVR ← signbit (A, byte-width) ⊕ signbit(Y, byte-width), L ← signbit(Y, byte-width) |
| 33 | UP1-0F-BQ | Z, N, L as for UP1-0F-AQ, OVR ← signbit (B, byte-width) ⊕ signbit(Y, byte-width) |
| 36 | UP1-1F-AQ | (as for UP1-0F-AQ) |
| 37 | UP1-1F-BQ | (as for UP1-0F-BQ) |
| 3A | UP1-LF-AQ | (as for UP1-0F-AQ) |
| 3B | UP1-LF-BQ | (as for UP1-0F-BQ) |

Reference should be had to FIG. 6 where the operation of the single-precision and double-precision single-bit down-shift instructions is illustrated diagrammatically. FIG. 6A illustrates the operation of the single-precision single-bit down-shift instructions described in Table IX A.1. A multiplexer (MUX) 200 receives either a ZERO or a ONE signal implementing the down-shift instructions shown in Table IX A.1 as receiving either a 1 or 0 fill-bit, respectively. The MUX 200 also receives the contents the L status bit of the ST-REG$_{20}$, 202 on line 204. The MUX 200 further receives the contents of the signbit of the selected bytes of the operand on a line 208 from register 206. The output of MUX 200 is sent to the input of shift register 206 which contains selected bytes of operand Op, either the word at the DATA-A or the DATA-B input to the processor. The output of the shift register 208 is sent to the ST-REG$_{20}$, the L status bit, 202.

A single-bit down-shift proceeds by placing the selected low-order bytes of the operand within register 206. The single bit downshift of register 206 causes the contents of ST-REG$_{20}$, 202, to be replaced by the low-order bit of the operand. The former content of the ST-REG$_{20}$ 202 is placed onto line 204 and MUX 200 selects the appropriate fill-bit from the four inputs to the MUX in accordance with Table IX A.1. This fill-bit is communicated to the input of the shift-register 206 to supply the high-order bit of the contents thereof. The contents of the shift-register 206 is passed to the least-significant bytes of the word at the Y output terminals. The unselected high-order bytes of the word at the Y output terminal passes from the corresponding bytes of the operand.

FIG. 6B illustrates the operation of the double-precision single-bit down-shift instructions described in Table IX A.2. A multiplexer (MUX) 210 receives either a ZERO or a ONE signal corresponding to the down-shift instructions shown in Table IX A.2 as receiving either a 1 or 0 fill-bit, respectively. The MUX 210 also receives the contents the L status bit of the ST-REG$_{20}$, the 212 on line 214. The MUX 210 also receives the contents of the signbit of the selected bytes of the operand on line 218 from register 216. The output of MUX 210 is sent to the input of a shift-register 216 which contains in its most-significant portion the selected bytes of the operand Op, either the word at the DATA_A or the DATA_B input, to the processor. The least-significant portion of the shift register 216 contains the selected bytes of the Q-REG 154. The output of the shift-register 216 is sent to the ST-REG$_{20}$ 212.

A double-precision down-shift proceeds by placing the selected low-order bytes of the operand within the most-significant portion of register 216 and the selected low-order bytes of the Q-REG within the least-significant portion of the register. The single-bit down-shift of register 216 causes the contents of ST-REG$_{20}$ 212 to be replaced by the low-order bit of the register 216, i.e., Q$_0$. The former content of the ST-REG$_{20}$ 212 is placed onto line 214 and MUX 210 selects the appropriate fill-bit from the four inputs to the MUX in accordance with Table IX A.2. This fill-bit is communicated to the input of the shift-register 216 to supply the high-order bit of the contents thereof. The contents of the most-significant portion of the shift-register 216 is passed to the selected least-significant bytes of the word at the Y output terminals. The unselected high-order bytes of the word at the Y output terminal passes from the corresponding bytes of the operand. The contents of the least-significant portion of the shift-register 216 is passed to the selected least-significant bytes of the Q-REG 154 while the unselected high-order bytes of the Q-REG are unchanged.

As illustrated in FIG. 7, except for the point of application of the fill-bit, the single-bit upshift instructions perform in a manner substantially as described for the single-bit down-shift instructions, above.

Table X, below, contains a description of the two byte-boundary-aligned operand prioritize instructions comprising Group 4.

TABLE X

Group 4 - Prioritize Instructions

A.

| Op Code | Mnemonic | Dest[2] | F(Op$_1$) | Source(s) Op$_1$ | Op$_2$ |
|---|---|---|---|---|---|
| 0C | PRIOR-A | Y | priority(A)[1] | A | |
| | | ST-REG$_{0-7}$ | priority(A) | A | |
| 0D | PRIOR-B | Y | priority(B)[1] | A | |
| | | ST-REG$_{0-7}$ | priority(B) | B | |

B.

| Op Code | Mnemonic | ALU Status Flag Set[3] |
|---|---|---|
| 0C | PRIOR-A | Z←(A AND bytemask(byte-width)=0) |
| 0D | PRIOR-B | Z←(B AND bytemask(byte-width)=0) |

[1]The priority function is determined in accordance with Table IV, namely; above: on an operand of the byte-width specified by the instruction the priority is the number of bits that the operand must be shifted up to bring the most-significant ONE bit in the operand up to the sign position of the most-significant selected byte. Unselected bytes of the operand are ignored in the operation. In the case where no bits within the selected bytes are ONE, the priority function has the value zero, and the Z status, flag is set to ONE in this case, and otherwise to ZERO.
[2]The most-significant three bytes of the word on the Y-bus are set to ZEROs because the value of the priority function is always between 0 and 31, which can be stored in binary notation within the lowest byte of the word. The position register is five bits wide.
[3]See Note (1) to Table X A.

Table XI, below, contains a description of the twenty-eight byte-boundary-aligned operand arithmetic instructions comprising Group 5.

TABLE XI

Group 5 - Arithmetic Instructions

A.1 Integer (Binary)

| Op Code | Mnemonic | Dest | F(Op$_1$) or F(Op$_1$, Op$_2$) | Source(s) Op$_1$ | Op$_2$ |
|---|---|---|---|---|---|
| 0A | NEG-A | Y | −A[1] | A | |
| 0B | NEG-B | Y | −B[1] | B | |
| 10 | DECR1-A | Y | A−1 | A | |
| 11 | DECR1-B | Y | B−1 | B | |
| 14 | DECR2-A | Y | A−2 | A | |
| 15 | DECR2-B | Y | B−2 | B | |
| 18 | DECR4-A | Y | A−4 | A | |
| 19 | DECR4-B | Y | B−4 | B | |
| 12 | INCR1-A | Y | A+1 | A | |
| 13 | INCR1-B | Y | B+1 | B | |
| 16 | INCR2-A | Y | A+2 | A | |
| 17 | INCR2-B | Y | B+2 | B | |

TABLE XI-continued

Group 5 - Arithmetic Instructions

| 1A | INCR4-A | Y | A+4 | A | |
|---|---|---|---|---|---|
| 1B | INCR4-B | Y | B+4 | B | |
| 42 | ADD | Y | A+159 B | A | B |
| 43 | ADDC | Y | A+B + C$^{(2)}$ | A | B |
| 44 | SUB | Y | A−B | A | B |
| 45 | SUBC | Y | A−B−1+C$^{(2)}$ | A | B |
| 46 | SUBR | Y | B−A | A | B |
| 47 | SUBRC | Y | B−A−1+C$^{(2)}$ | A | B |

A.2 Binary Coded Decimal (BCD)

| Op Code | Mnemonic | Dest | F(Op$_1$) or F(Op$_1$, Op$_2$) | Source(s) Op$_1$ | Op$_2$ |
|---|---|---|---|---|---|
| 48 | SUMCORR-A | Y | sum-corr | (A, NC$_{0-7}$)$^{(3), (4)}$ | A |
| 49 | SUMCORR-B | Y | sum-corr | (B, NC$_{0-7}$)$^{(3), (4)}$ | B |
| 4A | DIFF-CORR-A | Y | diff-corr | (A, NC$_{0-7}$)$^{(3), (4)}$ | A |
| 4B | DIFF-CORR-B | Y | diff-corr | (B, NC$_{0-7}$)$^{(3), (4)}$ | B |

$^{(1)}$This notation refers to the two's complement of the operand Op$_1$.
$^{(2)}$C is the contents of the status register carry bit, ST-REG$_{16}$
$^{(3)}$NC$_i$ is the ith nibble-carry; a nibble-carry flip-flop stores the carry generated by the corresponding nibble for addition or the borrow generated by the corresponding nibble for subtraction. A full BCD carry propagation is performed in parallel with the ALU 130 with a carry-in of 0 for the BCD addition instructions and carry-in of 1 for the BCD subtraction instructions. All nibble carries or borrows are loaded into their corresponding flip-flops (irrespective of byte-width); however, unselected high-order bytes of the Op$_2$ pass to the Y bus unaltered.
$^{(4)}$The sum-corr or diff-corr functions correct each nibble of the operand (result of the binary instruction executed immediately before): a correct-word is formed as follows: if the contents of a carry/borrow flip-flop is "1," then a "6" is placed in the corresponding nibble position. If it is "0," then a "0" is placed in the corresponding nibble position. The resulting 32-bit word is added to the partial result in the case of SUMCORR or subtracted in the case of DIFFCORR.

As mentioned above, the BCD arithmetic instructions operate on packed BCD operands and require two processor clock cycles to produce a final result. During the first clock cycle, a partial result is placed on teh Y-bus 156 by the ALU 130 as a consequence of executing one a binary arithmetic instruction as described in Table XI, above. Each of these instructions sets the BCDC$_{1-8}$ bits (nibble carry flip-flops) which are conveyed from ALU 130 via signal lines 164d and MUX 166 to the nibble carry portion 112c and the status register 112, in response to control signals on control bus 102. During the next processor instruction cycle either the SUM-CORR-(A/B) or SUM-CORR-(A/B) instruction must be executed, and the partial result accordingly placed on the DATA-A or DATA-B input terminals, which carries out the correction described in Note (4) to Table XI A. The contents of the nibble carry portion 112c of the status register is made available to the ALU 130 via signal lines 162 so that the correction can be accomplished in accordance with Note (4).

TABLE XI

Group 5 - Arithmetic Instructions

B.1 Integer (Binary)

| Op Code | Mnemonic | ALU Status Flags Set |
|---|---|---|
| 0A | NEG-A | Z←(Y AND bytemask(byte-width)=0), N←signbit(Y, byte-width) C←carry-out(byte-width)⊕borrow-mode$^{(5)}$, OVR←overflow(byte-width) |
| 0B | NEG-B | (as for NEG-A) |
| 10 | DECR1-A | (as for NEG-A) |
| 11 | DECR1-B | (as for NEG-A) |
| 14 | DECR2-A | (as for NEG-A) |
| 15 | DECR2-B | (as for NEG-A) |
| 18 | DECR4-A | (as for NEG-A) |
| 19 | DECR4-B | (as for NEG-A) |
| 12 | INCR1-A | (as for NEG-A) |
| 13 | INCR1-B | (as for NEG-A) |
| 16 | INCR2-A | (as for NEG-A) |
| 17 | INCR2-B | (as for NEG-A) |
| 1A | INCR4-A | (as for NEG-A) |
| 1B | INCR4-B | (as for NEG-A) |

TABLE XI-continued

Group 5 - Arithmetic Instructions

| 42 | ADD | (as for NEG-A) |
|---|---|---|
| 43 | ADDC | (as for NEG-A) |
| 44 | SUB | (as for NEG-A) |
| 45 | SUBC | (as for NEG-A) |
| 46 | SUBR | (as for NEG-A) |
| 47 | SUBCR | (as for NEG-A) |

B.2 Binary Coded Decimal (BCD)

| Op Code | Mnemonic | ALU Status Flags Set |
|---|---|---|
| 48 | SUM-CORR-A | Z←(Y AND bytemask(byte-width) = 0), N←signbit(Y, byte-width) C$^{(7)}$←bcd carry(byte-width) ⊕ borrow-mode$^{(6)}$, OVR$^{(8)}$←bcd overflow(byte-width) |
| 49 | SUM-CORR-B | (as for SUM-CORR-A) |
| 4A | DIFF-CORR-A | (as for SUM-CORR-A) |
| 4B | DIFF-CORR-B | (as for SUM-CORR-A) |

$^{(5)}$Borrow-mode is established by the signal at the borrow input terminal to the processor 24, as described above. A HIGH signal at this terminal causes all control signals generated by the instruction decoder 100 onto the control bus 102 as applied to the ALU 130 to cause a borrow rather than a carry to be generated by the ALU during the execution at any of the instructions listed herein. A LOW signal at this terminal will result in the ALU generating a carry during the execution of these instructions. The borrow-mode does not take part in the execution of additive instructions listed; namely, the six INCRN-X instructions, and the ADD and ADDC instructions.
$^{(6)}$See Note $^{(5)}$ to Table XI, above. The BORROW-MODE does not take part in the execution of any additive instruction listed; namely, ADDBCD and ADDBCDC.
$^{(7)}$The carry-out of the ALU 130, as specified by the byte-width of the instruction being executed, is communicated to the status register 112 via signal lines 164a and the MUX 166, where it can be stored in the C status flag bit of the status signal register portion 112d of the status register 112.
$^{(8)}$The overflow (OVR) flag assumes that one leading sign digit is appended to any operand having an odd bit-length to form an even length. Hence, the definition of overflow is not useful for odd bit-length operands. Overflow is defined as the exclusive-or of the carry-in and the carry-out of the most-significant nibble among the nibbles within the selected byte-width.
$^{(9)}$The sign (N) flag assumes that one leading sign digit is appended to any operand having an odd bit-length, to form an even length. A BCD digit of 9 represents a positive sign and a digit of 9 represents a negative sign in ten's complement. The N flag is set if the most-significant bit of the operand's selected byte-width is 1. The sign nibble of the result is always either 0 or 9 except when an overflow occurs, when it becomes either 1 or 8, respectively.

Table XII, below, contains a decription of the thirteen byte-boundary-aligned operand division step instructions comprising Group 6.

TABLE XII

Group 6 - Division Step Instructions

A.1 Signed Single Precision

| Op Code | Mnemonic | Dest | F(Op2, Op2) or Shiftdir | Sources Op1 | Op2 | Fill-Bit |
|---|---|---|---|---|---|---|
| 4E | SDIVFIRST | Y | Up | B | B | signbit(Q, byte-width) |
|  |  | Q | Up | Q | Q | signbit(A, byte-width) XNOR signbit(Y, bytewidth) |
| 50 | SDIVSTEP | F | B ∓ A$^{(1)}$ | A | B |  |
|  |  | Y | Up | F | B | signbit(Q, byte-width) |
|  |  | Q | Up | Q | Q | signbit(F, byte-width) XNOR signbit(A, byte-width) |
| 51 | SDIVLAST1 | F | B ∓ A$^{(1)}$ | A | B |  |
|  |  | Y | F | F | B |  |
|  |  | Q | Up | Q | Q | 1 |
| 5A | SDIVLAST2 | F | AND (B ∓ A)$^{(1)}$ | <signbit(Q, byte-width ⊕ S)*-1:0>$^{(2)}$ A | B |  |
|  |  | Y | F | F | B |  |

A.2 Unsigned Single Precision

| Op Code | Mnemonic | Dest | F(Op1, Op2) or Shiftdir | Sources Op1 | Op2 | Fill-Bit |
|---|---|---|---|---|---|---|
| 4F | UDIVFIRST | Y | Up | B | B | signbit(Q, byte-width) |
|  |  | Q | Up | Q | Q | 0 |
| 54 | UDIVSTEP | F | B ∓ A$^{(1)}$ | A | B |  |
|  |  | Y | Up | F | B | signbit(Q, byte-width) |
|  |  | Q | Up | Q | Q | $\overline{M}$ ⊕ S ⊕ carryout(byte-width) |
| 55 | UDIVLAST | F | B ∓ A$^{(1)}$ | A | B |  |
|  |  | Y | F | F | B |  |
|  |  | Q | Up | Q | Q | $\overline{M}$ ⊕ S ⊕ carryout(byte-width) |

A.3 Signed or Unsigned Single Precision Correction

| Op Code | Mnemonic | Dest | F(Op1) or F(Op1, Op2) | Sources Op1 | Op2 |
|---|---|---|---|---|---|
| 58 | REMCORR | F | B ∓ A$^{(1)}$ if Z ⊕ N ⊕ S = 1 | A | B |
|  |  |  | B if Z ⊕ N ⊕ S = 0 | A | B |
|  |  | Y | F |  | F | B |
| 59 | QUOCORR | F | B ∓ 1$^{(3)}$ if Z ⊕ N ⊕ S = 1 | B |  |
|  |  |  | B if Z ⊕ N ⊕ S = 0 | B |  |
|  |  | Y | F | F | B |

A.4 Multiprecision

| Op Code | Mnemonic | Dest | F(Op1, Op2) or Shiftdir | Sources Op1 | Op2 | Fill-Bit |
|---|---|---|---|---|---|---|
| 52 | MPDIVSTEP1 | F | B ∓ A$^{(1)}$ | A | B |  |
|  |  | Y | Up | F | B | signbit(Q, byte-width) |
|  |  | Q | Up | Q | Q | 0 |
| 56 | MPDIVSTEP2 | F | B ∓ A$^{(4)}$ | A | B |  |
|  |  | Y | Up | F | F | L |
| 53 | MPDIVSTEP3$^{(6)}$ | F | B ∓ A$^{(5)}$ | A | B |  |
|  |  | Y | Up | F | B | L |
| 57 | MPUDIVSTEP3$^{(8)}$ | F | B ∓ A$^{(7)}$ | A | B |  |
|  |  | Y | Up | F | B | L |

| Op Code | Mnemonic | ALU Status Flags Set |
|---|---|---|
|  |  | B.1 Signed Single Precision |
| 4E | SDIVFIRST | Z ← (Y and bytemask(byte-width) = 0), N ← signbit (Y, byte-width), L ← signbit(B, byte-width), S ← signbit(B, byte-width), M ← signbit (A, byte-width) XNOR signbit(B, byte-width) |
| 50 | SDIVSTEP | Z, N as for SDIVFIRST L ← signbit(F, byte-width), C ← carryout (byte-width), M ← signbit(F, byte-width) XNOR signbit(A, byte-width) |
| 51 | SDIVLAST1 | Z, N, C, M as for SDIVSTEP |
| 5A | SDIVLAST2 | Z ← (Y AND bytemask(byte-width) = 0) AND (S = 1) |
|  |  | B.2 Unsigned Single Precision |
| 4F | UDIVFIRST | Z, N, L as for SDIVFIRST, M ← 1, S ← 0 |
| 54 | UDIVSTEP | Z, C, L as for SDIVSTEP, S ← signbit(F, byte-width) M ← $\overline{M}$ ⊕ S ⊕ carryout(byte-width) |
| 55 | UDIVLAST | Z, C, M as for UDIVSTEP, S ← 0 N ← M ⊕ S ⊕ carryout(byte-width) |
|  |  | B.3 Signed or Unsigned Single Precision Correction |
| 58 | REMCORR | C ← carryout(byte-width), OVR ← overflow(byte-width) |
| 59 | QUOCORR | (as for REMCORR) |

TABLE XII-continued

B.4 Multiprecision

| 52 | MPDIVSTEP1 | $Z \leftarrow (Y = 0)$, $C \leftarrow$ carryout(00), $L \leftarrow F_{32}$ |
|----|------------|---|
| 56 | MPDIVSTEP2 | (as for MPDIVSTEP1) |
| 53 | MPDIVSTEP3 | (as for SDIVSTEP) |
| 57 | MPUDIVSTEP3 | (as for UDIVSTEP) |

[1] The function $B \mp + A$ depends on the contents of the M status flag, status register bit 21: if $M = 1$ the function is $B - A$; if $M = 0$ the function is $B + A$.

[2] See Note (2) to Table VIIA, above.

[3] The function $B \mp 1$ depends on the contents of the M status flag, status register bit 21: if $M = 0$ the function is $B - 1$; if $M = 0$ the function is $B + 1$.

[4] The function $B \mp A$ is calculated as follows, depending on the contents of the M status flag, status register bit 21: if $M = 1$ the fullword A is subtracted with carry from the fullword B; if $M = 0$ the fullword A is added with carry to the fullword B. The byte-width specified by the instruction is ignored, and all operations are full-word.

[5] In accordance with the byte-width specified by the instruction, the function $B \mp A$ is calculated as follows, depending on the contents of the M status flag, status register bit 21: if $M = 1$ the number of selected bytes of A are subtracted with carry from the same number of selected bytes of B; if $M = 0$ the number of selected bytes of A are added with carry to the same number of selected bytes of B.

[6] The MPPIVSTEP3 instruction sets the least-significant bit of the Q-register 154,$Q_o$, according to the equation: $Q_o \leftarrow$ signbit(F, byte-width) XNOR signbit(A, byte-width) because upshifting of the Q-register during execution of the MPDIVSTEP1 step left $Q_o$ vacant; however, it is not until the MPSDIVSTEP3 step that this quotient bit is available to load into $Q_o$.

[7] In accordance with the byte-width specified by the instruction, the function $B \mp A$ is calculated as follows, depending on the contents of the M status flag, status register bit 21: if $M = 1$ the number of selected bytes of A, zero-extended by one bit, are subtracted with carry from the same number of selected bytes of B, extended by the S status flag, status register bit 21; if $M = 0$ the number of selected bytes of A, zero-extended by one bit, are added with carry to the same number of selected bytes of B, extended by the S flag bit.

[8] The MPUDIVSTEP3 instruction sets the least-significant bit of the Q-register 154,$Q_o$, according to the equation: $Q_o \leftarrow M \oplus S \oplus$ carryout(byte-width) because upshifting of the Q-register during execution of the MPDIVSTEP1 step left $Q_o$ vacant; however, it is not until the MPSDIVSTEP3 step that this quotient bit is available to load into $Q_o$.

The ALU 130 of the processor 24 provides for three types of byte-boundary-aligned division operations on integers: signed single-precision, unsigned single-precision and signed or unsigned multi-precision. Divisors and dividends of any of the byte-widths one, two, three, or four, can be accommodated by the ALU 130. The processor 24 is designed to operate with a relatively simple mircroprogram sequence controller 12, since most of the decision-requirements are handled internally by the processor 24. The only requirements of the sequence controller 12 are that it be capable of looping and conditional branching. Each of the three types of byte-boundary-aligned division operations will be described in reference to a flowcharted algorithm, comprising FIG. 8.

FIG. 8A is a flowchart describing the algorithm to be used for single precision signed division which can be directly implemented by the processor instructions described in Table XIIA.1 and A.3, above, and accordingly executed by the ALU 130 of the present invention. The single-precision signed division algorithm is a four-quadrant non-restoring divide algorithm which yields one quotient bit per instruction cycle. It is understood that all quantities appearing in the flowchart are all of the same byte-width to be used throughout the division.

In general, the division algorithm reduces the partial remainder toward zero at each step. Since the algorithm is nonrestoring, at each step a new quotient bit and partial remainder is generated and the previous partial remainder is corrected if wrong. Since correction lags the calculation of the quotient bit by one step, a correction step may be required upon exit from the loop implementing the successive reduction of the remainder. If the resulting remainder is not exactly zero, it should be the same sign as the dividend. When the signs of the remainder and the initial dividend differ, then correction is required. For positive quotients, the correction is performed by subtracting one from the quotient and adding the divisor back into the remainder. For negative quotients, the correction is performed by adding one to the quotient, and subtracting the divisor from the remainder.

A block 302 is entered from a start block 300 of the flowchart of FIG. 8A, in which the Q-register 154 is loaded with a dividend to be used during the division. This dividend is presumably at the DATA—A or DATA—B terminals of the processor 24 and can be loaded through the use of the LOADQ-A or LOADQ-B processor instruction, respectively, with a byte-width specifying the number of bytes to be used in the division. These instructions were described in the discussion of the Group 1 instructions (Table VII), above. The status register sign flag N, bit 17 of status signal portion 112d, is set by the loading of the Q-register 154. Also shown in block 302 is the extension of this sign bit throughout a remainder storage area; an operation which can be performed by the SIGN instruction (Group 2, Table VII) with a byte-width of zero specified. This presents a 32-bit word at the Y output terminals of processor 24, each bit of which is the N status flag set by the instruction loading the Q-register 154. This word at the Y terminals is presumably transferred to a remainder storage location with the working registers 22 (FIG. 1), via bus 46.

Block 302 of FIG. 8A also calls for a single-bit upshift of the word formed from the selected bits of the remainder followed by the selected bits in the Q-register 154. This is a required preliminary to every division operation and can be performed by the SDIVFIRST instruction (Table XII), above. The purpose of this instruction is to set the M and S status flag bits of the status signal portion 112d of the status register, in preparation for the division, which is shown in block 304 of FIG. 8A. The SDIVFIRST instruction operates on the dividend which is in the Q-REG, the divisor which is to be placed at the DATA—A inputs and the remainder which is to be placed at the DATA—B inputs. The remainder result is placed onto the Y output terminals of the processor 24 and is to be transferred to the remainder storage location in the working registers 22. The least-significant bit of the Q-register is the exclusive NOR of the signs of the divisor and the resulting remainder.

As shown in FIG. 8A, a loop block 304 is then entered, which call for the execution of the single-precision signed divide step a total of one less than 8 times the number of byte-widths selected, i.e., once for each remaining bit of the parameters—dividend, divisor remainder—taking part in the division. Each step of this signed division loop produces one quotient bit and is implemented by the SDIVSTEP instruction (Table XII) as follows: the Q-register contains the dividend, the DATA—A input has the divisor, the DATA—B input the partial remainder, and the result, at the Y output of the processor, replaces the partial remainder in the working registers.

The selected byte-width determines the number of least-significant bytes of the word at the A input that are added (if the M status flag is ZERO) or subtracted (if the M status key is ONE) from a like number of least-significant bytes of the word at the B input. The single-bit upshift called for in loop 302 is performed on the word formed from the selected bits of the remainder and the Q-register, as described above for the SDIVFIRST instruction; the signbit of the Q-register being shifted into the least-significant bit position of the remainder and the result presented at the Y output of the processor 24. The unselected high-order bytes at the B input (i.e., the partial remainder) pass unaltered into the high-order bytes of the result at the Y output. The result is transferred to the working registers 22 to replace the old remainder. The exclusive NOR of the signbit at the A input and the signbit of the result before the upshift, i.e. the new quotient bit, is shifted into the least-significant bit of the Q-register, $Q_o$. The S status flag bit which contains the sign of the dividend, is not changed by the execution of the SDIVSTEP instruction.

Following the loop 304, a block 306 is entered which calls for the N status flag to be set based on the sign of the final remainder produced by the division algorithm of FIG. 8A. A ONE bit is also placed into the least-significant bit of the quotient value in the Q-register, $Q_o$. These operations are performed by the execution of the SDIVLAST1 instruction (Table XII) and results in algebraically-correct values for the quotient, divisor, and remainder, if the dividend is positive and the remainder did not become zero during execution of the loop 304. In order to test for this possibility arising from negative dividends when the remainder is zero at the exit from loop 304, the Z status flag is reset accordingly by executing the SDIVLAST2 instruction, as will be described.

Upon exit from block 306, a decision block 307 is entered which determines whether the contents of the Z flag is a ONE, based on the execution of the SDIVLAST1 within block 306. A "true" exit from the decision block 307 leads to a block 310 which calls for corrections to be performed on the quotient and remainder. The contents of the Q-register, the quotient, must be moved to the Y output terminals of the processor 24 so that it can be subsequently corrected. This can be done by executing the PASS-Q instruction (Group 1, Table VII).

A "false" exit from the decision block 307 leads to a decision block 308 which tests for the presence of a negative dividend when the remainder and divisor are of the same magnitude, as mentioned. In this case, the Z status flag is reset within a block 309.

As shown in block 310, correction of the quotient and remainder takes place, if necessary, based on the status flags Z, N, S, and M which have been set earlier, due to the two's complement form of negative numbers used by the processor 24.

Algebraically-correct values for quotient, divisor and remainder result, so that quotient * divisor+remainder=dividend when a STOP block 312 is entered, either directly from a "false" exit from the decision block 308 or after the correction steps of block 310.

The correction steps called for in block 310 are implemented by executing the QUOCORR instruction which calls for the uncorrected quotient (read out of the processor by the PASS-Q instruction) to be applied at the DATA—B input terminals and will cause the corrected quotient to be present at the Y output terminals in accordance with the entry in rows three and four of Table XII A.3. Similarly, the REMCORR instruction calls for the divisor to be applied to the DATA—A terminals and the uncorrected remainder to be applied to the DATA—B input terminals and will cause the corrected remainder to be present at the Y output terminals in accordance with the entry in rows one and two of TABLE XII A.3.

An unsigned single-precision division algorithm which can be directly implemented by the processor instructions described in Table XII A.2 and A.3, above, and accordingly executed by the ALU 130 of the present invention, is shown in flowchart form as FIG. 8B. The algorithm is quite similar to the signed single precision division algorithm of FIG. 8A and only the differences will be described in detail.

A block 322 is entered from a start block 320 which performs the same preliminary operations shown in the block 302 of FIG. 8A, with the exception that the UDIVFIRST instruction (Table XII) is used to implement the single-bit upshift of the word formed of the selected bits of the remainder and the Q-register 154 called for therein. This instruction provides a ZERO fill-bit for the least-significant bit of the Q-register, $Q_o$ as shown in row two of Table XII A.2, as called for in block 322.

A loop block 324 is entered from block 322, and performs the same operations shown within the loop block 304 of FIG. 8A with the exception that during the upshift called for therein the Q-register is filled with a bit having the value $\overline{M} \oplus S \oplus \text{carryout(byte-width)}$. (The S status flag contains the sign of the partial remainder after each step). The block 324 is implemented by the UDIVSTEP instruction (Table XIIA.2), which is identical to the SDIVSTEP instruction, except in this choice for a fill-bit of $Q_o$, as shown in row five of Table XIIA.2.

Following the loop 324, a block 326 is entered which calls for setting of the N status flag to the value $\overline{M} + S \oplus$ carryout (byte-width) and for a $Q_o$ fill-bit to be calculated as called for during the loop 324. These operations are performed by the execution of the UDIVLAST instruction (Table XII) and results in numerically-correct values for the quotient, divisor and remainder, unless the N status flag has been set to a ONE. In order to test for this possibility, upon exit from block 326, a decision block 328 is entered which tests the contents of the N status flag. A "true" exit from the decision block 328 leads to a block 330 which calls for the same correction steps to be performed as was to the case for the signed division algorithm of FIG. 8A, block 310.

Numerically-correct values for the quotient, divisor and remainder result, so that quotient * divisor + remainder = dividend when a STOP block 332 is entered, either directly from a "false" exit from the decision block 328 or after the correction steps of block 330. The block 330 is implemented by execution of the PASS-Q, REMCORR instructions described in connection with the signed single-precision division algorithm, above.

The inner loop of a signed or unsigned multiprecision division algorithm, similar to that shown in flowchart form as FIGS. 8A and 8B for signed and unsigned single precision division, can be implemented by the processor instructions described in Table XII A.4, above, and accordingly executed by the ALU 130. The inner loop block is similar to loops 304 and 324 and is implemented using the MPDIVSTEP1 instruction followed by the MPDIVSTEP2 instruction wherein one MPDIVSTEP2 cycle is performed for triple precision, two MPDIVSTEP2 cycles are performed for quadruple precision, and so on. And then a MPSDIVSTEP3 (for signed multiprecision division) or a MPUDIVSTEP3 (for unsigned multiprecision division) is executed in which the new quotient bit is calculated. For double precision, i.e. 64-bit operands, the inner loop consists only of the MPDIVSTEP1 and MPDIVSTEP3 or MPUDIVSTEP3 instructions.

Table XIII, below, contains a description of the five byte-boundary-aligned operand integer multiplication step instructions comprising Group 7.

TABLE XIII

Group 7 - Multiplication Step Instructions

| Op Code | Mnemonic | Dest | F(Op1) or F(Op1, Op2) or Shiftdir | Source(s) Op1 | Op2 | Fill-Bit |
|---|---|---|---|---|---|---|
| | | | A.1 Unsigned | | | |
| 5B | UMULFIRST | $A^{(1)}$ | zeroextend($A^{(1)}$) | A | | |
| | | $F^{(1)}$ | $\mp$shift$^{(2)}$ | $A^{(1)}$ | | — |
| | | Y | Down2$^{(3)}$ | $F^{(1)}$ | B | — |
| | | Q | Down2$^{(3)}$ | Q | Q | $F_1F_0$ |
| 5C | UMULSTEP | $A^{(1)}$ | zeroextend($A^{(1)}$) | A | | |
| | | $B^{(1)}$ | signextend($B^{(1)}$) | B | | |
| | | $F^{(1)}$ | $B^{(1)} \mp f(A^{(1)})^{(4)}$ | A | B | — |
| | | Y | Down2$^{(3)}$ | $F^{(1)}$ | B | — |
| | | Q | Down2$^{(3)}$ | Q | Q | $F_1F_0$ |
| 5D | UMULLAST | F | $B \mp A^{(5)}$ | A | B | |
| | | Y | F | | F | B |
| | | | A.2 Signed | | | |
| 5E | SMULFIRST | $A^{(1)}$ | signextend($A^{(1)}$) | A | | |
| | | $F^{(1)}$ | $\mp$shift$^{(2)}$ | $A^{(1)}$ | | — |
| | | Y | Down2$^{(3)}$ | $F^{(1)}$ | B | — |
| | | Q | Down2$^{(3)}$ | Q | Q | $F_1F_0$ |
| 5F | SMULSTEP | $A^{(1)}$ | signextend($A^{(1)}$) | A | | |
| | | $B^{(1)}$ | signextend($B^{(1)}$) | B | | |
| | | $F^{(1)}$ | $B \mp f(A^{(1)})^{(4)}$ | A | B | — |
| | | Y | Down2$^{(3)}$ | $F^{(1)}$ | B | |
| | | Q | Down2$^{(3)}$ | Q | Q | $F_1F_0$ |

| Op Code | Mnemonic | ALU Status Flag Set |
|---|---|---|
| | | B.1 Unsigned |
| 5B | UMULFIRST | $M \leftarrow Q_1$ |
| 5C | UMULSTEP | (as for UMULFIRST) |
| 5D | UMULLAST | $Z \leftarrow$ (Y AND bytemask(byte-width)) |
| | | B.2 Signed |
| 5E | SMULFIRST | (as for UMULFIRST) |
| 5F | SMULSTEP | (as for UMULFIRST) |

$^{(1)}$The operand is of bit-length equal to eight times the byte-width specified by the instruction plus two. The ALU 130 is extended internally by two bits at the appropriate byte boundary, the operand as applied to ALU 130 is not affected.
$^{(2)}$The function $\mp$ shift depends on the contents of the two least-significant bits of the Q-register, $Q_1$, $Q_0$: if $Q_1Q_0 = 10$ then $A^{(1)}$ is upshifted by one bit; then if $Q_1 = 0$ the function has the value $A^{(1)}$ (upshifted if called for); or if $Q_1 = 1$ the function has the value equal to the two's complement of $A^{(1)}$; if $Q_1Q_0 = 00$ the function has the value all ZEROs.
$^{(3)}$The function Down2 is a downshift of two bits of the selected bytes of the Op1 with unselected bytes passed unaltered to Dest.
$^{(4)}$The function $B^{(1)} \mp f(A^{(1)})$ is calculated as follows depending on the contents of the two least-significant bits of the Q-register, $Q_1$, $Q_0$, and the contents of the M status flag, status register bit 21: if $Q_1Q_0 M = 100$ or $011$, then $f(A^{(1)})$ is $A^{(1)}$ upshifted by one bit; then if $Q_1 = 0$ the function has the value equal to the sum of $B^{(1)}$ and $A^{(1)}$; or if $Q_1 = 1$ the function has the value equal to the difference $B^{(1)}$ minus $A^{(1)}$.
$^{(5)}$See Note (5) to Table XII A, above.

The ALU 130 of the processor 24 provides for two types of byte-boundary-aligned multiplication operations on integers: unsigned single precision and signed single precision. Multiplicands and multipliers of any of the byte-widths one, two, three or four can be accommodated by the ALU 130. As for the division algorithms, above, the multiplication algorithms require only a relatively simple microprogram sequence controller that is capable of looping and conditional branching. The algorithm used for both unsigned and signed multiplication is a modified Booth algorithm which yields two product bits per instruction cycle. As with the division algorithms described above, it is understood that the byte-width specified by the multiplication instruction is to be used throughout the multiplication. The algorithms are designed to function on an ALU, such as the one provided by the present invention, which appends two extra bits of precision onto the most-significant byte as selected by the byte-width used throughout the multiplication. Furthermore, the algorithm operates under control of the M status flag, bit 21 of the status register 112 and the two least-significant bits of the Q-register 154, $Q_1$ and $Q_0$. The ALU 130 utilizes a two-bit "moving cell" to implement the algorithms.

In general, the multiplication algorithm searches for strings of ONEs in the multiplier and at the start of each such string, the multiplicand is subtracted from the multiplier and at the end of each string the multiplicand is added back in with the correct significance. For signed multiplication the sign bit of the two's complement number represents the start of an infinitely-long string of ONEs. The algorithm recognizes the start of such a string and subtracts the multiplicand whereupon the algorithm terminates without adding back the multiplicand, which is in fact the correct result for signed multiplication. For unsigned multiplication all that need be changed is to concatenate two high-order ZERO bits to the multiplier and then have the algorithm recognize the end of the string of ONEs and compensate accordingly.

FIG. 8C is a flowchart illustrating the algorithm to be used for unsigned single precision multiplication which can be directly implemented by the processor instructions described in Table XIII A.1, and accordingly executed by the ALU 130 of the present invention. A block 342 is entered from a start block 340 of the flowchart of FIG. 8C in which the Q-register is loaded with a multiplier to be used during the multiplication. This multiplier is presumably at the DATA_A or DATA_B terminals of the processor 24 and can be loaded through one use of the LOADQ-A or LOADQ-B processor instruction, respectively, with a byte-width specifying the number of bytes to be used throughout the multiplication. The status register sign flag N, bit 17 of the status signal portion of the status register 112 is set by the loading of the Q-register 154.

The UMULFIRST instruction (Table XIII) implements the operations called for in block 342. The UMULFIRST instruction (Table XIII) implements the other preliminary operations called for in block 342 as follows: the selected byte-width multiplicand is extended by two bits with ZEROs placed in these upper two bits and then upshifted by one bit if the two low order bits of the multiplier in the Q-register 154 are $Q_1Q_0=10$ thereby performing a first preliminary multiplication step, as the start of a string of ONEs in the multiplier has been found. If $Q_1Q_0=00$, a two-bit downshift of the word formed from the selected bits in the Q-register 154 followed by a word of like length of all ZEROs is performed and the result is placed onto the Y output terminals of the processor 24 where it is to be transferred to the partial product location in the working registers 22. For the other remaining cases of $Q_1Q_0$ not equal to 00, the two-bit downshift of the word formed from the selected bits in the Q-register followed by the selected bits of the multiplicand (upshifted if called for) is performed and the result placed onto the Y output of the processor to replace the partial product. The next-to-least-significant bit of the Q-register; $Q_1$, is stored in the M status flag.

For operations performed by the UMULFIRST instruction, as well as for the other multiplication instructions of Table XIII, the high-order unselected bytes are passed unchanged to the Y output from the appropriate operand notwithstanding the presence of the two additional bits of precision present within the ALU 130 during the execution of the multiplication steps.

A loop block 344 is entered from block 342 which calls for the execution of the single precision unsigned multiplication step a total of one less than four times the number of byte-widths selected, i.e., once for each pair of bits in the multiplier and multiplicand taking part in the multiplication. Each loop step in the algorithm of FIG. 8C produces two product bits and is implemented by the UMULSTEP instruction (Table XIII) as follows: the Q-register contains the multiplier and some partial product bits, the DATA_A input has the multiplicand, the DATA_B input has the partial product, and the result, at the Y output of the processor 24, replaces the partial product stored in the working registers. The steps performed within loop block 344 are essentially the same operations as called for in the block 342: one-bit upshift of the multiplicand if $Q_1Q_0M=100$ or 011, indicating a start or stop of a ONEs string, or a two-bit downshift of the word formed from the selected bits in the Q-register followed by the partial product applied to the DATA_B input if $Q_1=Q_0=M$. For the other remaining $Q_1$, $Q_0$ and M, the selected byte-width determines the number of least-significant bytes of the multiplier, in the Q-register, that are added (if the M status flag is ZERO) or subtracted (if the M status flag is ONE) from a like number of least-significant bytes of the multiplicand, at the A input to processor 24. The result, preceded by the selected bits in the Q-register, is then downshifted by two bits. In either of the last two cases, the result is placed onto the Y output terminals of the processor 24 along with the unselected bytes of the partial product and is transferred to the partial product location in the working registers. Status flag M is set with the contents of the $Q_1$ bit of the Q-register. The loop block 344 is implemented by the UMULSTEP processor instruction (Table XIII).

Upon exit from loop 346, the partial product consists of a high-order portion in the working register location and a low-order portion being the contents of the Q-register 154. A correction block 348 is entered via a decision block 346 from loop 344 if correction is required because the leading bit of the partial product, in the case of unsigned integer multiplication, may be incorrectly interpreted as a sign bit, if the most-significant bit of the multiplier is a ONE. By concatenating two high-order ZERO bits to the multiplier at each loop step, to form multiplier1 the loop 344 has already recognized the end of a ONEs string in that $Q_1Q_0M=001$ or 010 and thus the statement partial product ←two-bit downshift of Q_REG_(multiplier1-multiplicand1) during the last iteration of the loop block 344 would have been executed if $Q_1=1$. Since the M status flag is subsequently set to the contents of $Q_1$ before exit from the loop block 344, the correction block 348 is entered from the "true" exit of decision block 346 based on M being a ONE, and adds back the low-order selected bytes of the multiplicand to the most-significant portion of the partial product. The UMULLAST instruction (Table XIII) implements this correction block and requires that the multiplicand be present at the DATA_A inputs and the most-significant portion of the partial product be present at the DATA_B inputs. The result is output on the Y terminals and is to be transferred to the working registers to replace the most-significant portion of the partial product.

Correct values for the high-order bits of the partial product and the low-order bits of the partial product exist in the working register and the Q-register, respectively, when a STOP block 350 is entered, either directly from a "false" exit from the decision block 346 or after the correction step of block 348.

A signed single precision multiplication algorithm which can be directly implemented by the processor instructions described in Table XIII A.2, above, and accordingly executed by the ALU 130 of the present invention, is similar to that shown in flowchart form in FIG. 8C and will not be described in any detail. The only significant change in the algorithm from that shown in FIG. 8C results from the fact that for signed multiplication, the partial product resulting upon exit from loop 344 is correct in all cases, and thus a correction block 348 is not required to implement the signed multiplication algorithm.

4. Variable-Length Bit Field Operand Instruction Description

As mentioned above, the instruction set of the data processor 24 includes four variable-length bit field operand instruction groups. Each group, Group 8 through Group 11, will be described through the use of a table having the same notation as those tables used for the description of the byte-boundary-aligned operand instructions, above, except that instead of using a byte-mask of byte-width specified by the $I_8$ and $I_7$ bits of the instruction to "select" certain bytes, an operand bitmask for field operations is specified with a width of 1 to 32 bits, as indicated by the width inputs $W_4$–$W_0$ to "select" certain bits. In the case of field-aligned and single-bit operands, the low-order four position inputs $P_4$–$P_0$ determine the least-significant bit of the operand, while in the case of n-bit shifts and field non-aligned operands all the position inputs $P_5$–$P_0$ are used to supply a six-bit two's complement signed integer specifying the magnitude and direction of the shift. The source of the operand width and position parameters, is selected by instruction bits $I_8$ and $I_7$ in accordance with Table VI, above.

Table XIV, below, contains a description of the six variable-length bit field instructions comprising Group 8 (N-bit Shifts, Rotates).

TABLE XIV

Group 8 - N-bit Shift and Rotate Instructions

| Op Code | Mnemonic | Dest | Shiftdir[1] | Source(s) Op$_1$ | Op$_2$ | Fill-Bit(s) |
|---|---|---|---|---|---|---|
| A.1 Shift | | | | | | |
| 60 | NB-SN-SHA | Y | Up | A | A | 0 |
|  |  | Y | Down | A | A | $A_{31}$[2] |
| 61 | NB-SN-SHB | Y | Up | B | B | 0 |
|  |  | Y | Down | B | B | $B_{31}$[2] |
| 62 | NB-OF-SHA | Y | Up | A | A | 0 |
|  |  | Y | Down | A | A | 0 |
| 63 | NB-OF-SHB | Y | Up | B | B | 0 |
|  |  | Y | Down | B | B | 0 |

| Op Code | Mnemonic | Dest | Shiftdir[3] | Op$_1$ | Op$_2$ | Fill-Bit[4] |
|---|---|---|---|---|---|---|
| A.2 Rotate | | | | | | |
| 64 | NBROT-A | Y | Up | A | A | $A_{31}$ |
| 65 | NBROT-B | Y | Up | B | B | $B_{31}$ |

| Op Code | Mnemonic | ALU Status Flags Set |
|---|---|---|
| B.1 Shift | | |
| 60 | NB-SN-SHA | $Z \leftarrow (Y = 0), N \leftarrow Y_{31}$ |
| 61 | NB-SN-SHB | (same as NB-SN-SHA) |
| 62 | NB-OF-SHA | (same as NB-SN-SHA) |
| 63 | NB-OF-SHB | (same as NB-SN-SHA) |
| B.2 Rotate | | |
| 64 | NBROT-A | (same as NB-SN-SHA) |
| 65 | NBROT-B | (same as NB-SN-SHA) |

[1]Shift direction is up for non-negative values of the six-bit signed position value specified by the instruction and down otherwise.
[2]Refers to the contents of the high-order (sign) bit of the operand.
[3]Shift direction is always up, and shift magnitude is determined by the least-significant five position bits $P_4$–$P_0$.
[4]Refers to the current contents of the high-order bit of the operand at each point within the shift; hence a circular upshift of the operand is presented at the Y output.

Table XV, below, contains a description of the nine variable-length bit field instructions comprising Group 9 (Single-Bit Operations).

TABLE XV

Group 9 - Single-Bit Operations Instructions

| Op Code | Mnemonic | Dest | F(Op$_1$) | Op$_1$ |
|---|---|---|---|---|
| A. | | | | |
| 68 | SETBIT-A | Y | 1 | A |
| 69 | SETBIT-B | Y | 1 | B |
| 6A | RSTBIT-A | Y | 0 | A |
| 6B | RSTBIT-B | Y | 0 | B |
| 66 | EXTBIT-A | Y[1] | $A_{P_4-P_0} \oplus P$[2] | A |
| 67 | EXTBIT-B | Y[1] | $B_{P_4-P_0} \oplus P$[2] | B |
| 6C | SETBIT-STAT | $Y_{P_4-P_0}$[3] | 1 | ST-REG |
|  |  | ST-REG$_{P_4-P_0}$[3] | 1 | ST-REG |
| 6D | RSTBIT-STAT | $Y_{P_4-P_0}$[3] | 0 | ST-REG |
|  |  | ST-REG$_{P_4-P_0}$[3] | 0 | ST-REG |
| 7E | EXTBIT-STAT | Y[1] | ST-REG$_{P_4-P_0} \oplus P_5$[2] | ST-REG |

| Op Code | Mnemonic | ALU Status Flags Set |
|---|---|---|
| B. | | |
| 68 | SETBIT-A | $Z \leftarrow 0, N \leftarrow Y_{31}$ |
| 69 | SETBIT-B | (same as SETBIT-A) |
| 6A | RSTBIT-A | $Z \leftarrow 1, N \leftarrow Y_{31}$ |
| 6B | RSTBIT-B | (same as RSTBIT-A) |
| 66 | EXTBIT-A | $Z \leftarrow (Y = 0), L \leftarrow A_{P_4-P_0}$[4] |
| 67 | EXTBIT-B | $Z \leftarrow (Y = 0), L \leftarrow B_{P_4-P_0}$[4] |
| 6C | SETBIT-STAT | none |
| 6D | RSTBIT-STAT | none |

TABLE XV-continued

Group 9 - Single-Bit Operations Instructions

| | | |
|---|---|---|
| 7E | EXTBIT-STAT | L ← ST-REG$_{P4-P0}$ ⊕ $P_5^{(2)}$ |

[1]The extracted bit appears at the low-order bit of the Y output, i.e., $Y_0$; the high-order bits $Y_{31-1}$ being set to ZEROs.

[2]The function extracts the bit of the operand at the position determined by the least-significant five position bits $P_4$-$P_0$; complemented if the most-significant position bit $P_5$ is a ONE.

[3]Refers to the bit of the destination at the position determined by the least-significant five position bits $P_4$-$P_0$; the other destination bits passing unaffected from the operand $Op_1$.

[4]See first part of Note (2) pertaining to position bits $P_4$-$P_0$.

Table XVI, below, contains a description of the sixteen variable-length bit field instructions comprising Group 10 (Field Logical Operations; Aligned, Non-Aligned, Extract).

TABLE XVI

Group 10 - Field Logical Operation Instructions

| Op Code | Mnemonic | Dest | F(Op$_1$)[1] or F(Op$_1$, Op$_2$)[1] | Source(s) Op$_1$ | Op$_2$ |
|---|---|---|---|---|---|
| | | | A.1 Aligned | | |
| 73 | PASSF-AL-A | Y | A | — | |
| 6E | PASS-AL-B | Y | B | — | |
| 71 | NOTF-AL-A | Y | A̅ | A | |
| 6F | NOTF-AL-B | Y | B̅ | B | |
| 75 | ORF-AL-A | Y | A + B | A | B |
| 77 | XORF-AL-A | Y | A ⊕ B | A | B |
| 79 | ANDF-AL-A | Y | A · B | A | B |

| Op Code | Mnemonic | Dest | F(Op$_1$, Op$_2$) | Source(s) Op$_1$ | Op$_2$ |
|---|---|---|---|---|---|
| | | | A.2 Non-Aligned | | |
| 70 | NOTF-A | Y[2] | Translate (A̅)[2] | A | B |
| 72 | PASSF-A | Y[2] | Translate (A)[2] | A | B |
| 74 | ORF-A | Y[2] | Translate (A + B)[2] | A | B |
| 76 | XORF-A | Y[2] | Translate (A ⊕ B)[2] | A | B |
| 78 | ANDF-A | Y[2] | Translate (A · B)[2] | A | B |

| Op Code | Mnemonic | Dest | Shiftdir | Sources Op$_1$ | Op$_2$ | Fill-Bit(s) |
|---|---|---|---|---|---|---|
| | | | A.3 Aligned | | | |
| 7A | EXTF-A | Y | Up[3] | A | "0" | 0 |
| | | Y | Down[3] | A | "0" | 0 |
| 7B | EXTF-B | Y | Up[3] | B | "0" | 0 |
| | | Y | Down[3] | B | "0" | 0 |
| 7C | EXTF-AB | Y[5] | Up[4] | A | B | $A_{31}^{(5)}$ |
| | | Y[5] | Down[4] | A | B | $B_0^{(5)}$ |
| 7D | EXTF-BA | Y[5] | Up[4] | B | A | $A_{31}^{(5)}$ |
| | | Y[5] | Down[4] | B | A | $B_0^{(5)}$ |

| Op Code | Mnemonic | ALU Status Flags Set |
|---|---|---|
| | | A.1 Aligned |
| 73 | PASSF-AL-A | Z ← (Y AND bitmask(position, width))[7] = 0), N ← $Y_{31}$ |
| 6E | PASSF-AL-B | (same as PASSF-AL-A) |
| 71 | NOTF-AL-A | (same as PASSF-AL-A) |
| 6F | NOTF-AL-B | (same as PASSF-AL-A) |
| 75 | ORF-AL-A | (same as PASSF-AL-A) |
| 77 | XORF-AL-A | (same as PASSF-AL-A) |
| 79 | ANDF-AL-A | (same as PASSF-AL-A) |
| | | A.2 Non-Aligned |
| 70 | NOTF-A | Z ← (Y AND bitmask(position, width) = 0) if position ≧ 0; Z ← (Y AND bitmask(0, width) = 0) if position ≦ 0; N ← $Y_{31}$ |
| 72 | PASSF-A | (same as NOTF-A) |
| 74 | ORF-A | (same as NOTF-A) |
| 76 | XORF-A | (same as NOTF-A) |
| 78 | ANDF-A | (same as NOTF-A) |
| | | A.3 Extract |
| 7A | EXTF-A | Z ← (Y = 0), N ← $Y_{31}$ |
| 7B | EXTF-B | (same as EXTF-A) |
| 7C | EXTF-AB | (same as EXTF-A) |

TABLE XVI-continued

Group 10 - Field Logical Operation Instructions

| | | |
|---|---|---|
| 7D | EXTF-BA | (same as EXTF-A) |

[1]The bits selected are determined by the least-significant five position inputs $P_4$-$P_0$, treated as an unsigned integer, and the width inputs $W_4$-$W_0$.

[2]The function Translate(result) is defined as follows: if the six-bit position parameter specified by the instruction is positive, first the result is formed from the least-significant bits of a word within $Op_1$ of width specified by the instruction width parameter and from the bits of a word within $Op_2$ starting at the position, and having the width, specified by the instruction position and width parameters. Second, the result appears on the Y output terminals in the bit positions specified by the instruction position and width parameters. If the six-bit position parameter specified by the instruction is negative, first the result is formed from the bits of a word within $Op_1$ starting at the position, and having the width, specified by the instruction position and width parameters and from the least-significant bits of a word within $Op_2$ of width specified by the instruction width parameter. Second, the result appears on the Y output terminals in the least-significant bits of width specified by the instruction width parameter.

[3]For non-negative values of the six-bit signed position value specified by the instruction the least-significant bits of a word within $Op_1$ of width specified by the instruction width parameter are upshifted to the bit position specified by the instruction. For negative position values, the bits of a word within $Op_1$ of width specified by the instruction starting at the two's complement of the position value are down-shifted to the least-significant bit positions.

[4]A sixty-four bit word formed from $Op_1$ followed by $Op_2$ is rotated an amount specified by the instruction; up if the six-bit position value is non-negative, and down otherwise.

[5]Refers to the current contents of the bit at each point in the rotate; hence a circular shift is performed.

[6]Refers to the least-significant word of width specified by the instruction; the high-order bit being set to ZEROs.

[7]See Note (1).

Table XVII, below, continues a description of the variable-length bit field instruction comprising Group 11 (Mask Generation).

TABLE XVII

| Op Code | Mnemonic | Dest | F(Op$_1$) | Op$_1$ |
|---|---|---|---|---|
| | | | A. | |
| 7F | PASS-MASK | Y | bitmask(position, width)[1] | "0" |

| Op Code | Mnemonic | ALU Status Flags Set |
|---|---|---|
| | | B. |
| 7F | PASS-MASK | none |

[1]Refers to a bitmask of ONEs starting at the position specified by least-significant five position bits $P_4$-$P_0$ of width specified by the width parameter.

D. Detailed Description:

Having described generally the data processor unit 24 with respect to FIG. 2, and the instruction set, a detailed description of certain of the elements of the invention can now be described and understood.

Control Bus: As mentioned above, each instruction cycle provides the instruction decoder 100 with the 7-bit processor instruction word. In turn, the instruction decoder 100 decodes the instruction and issues a plurality of control signals on the control bus 102 that manipulate the data paths necessary to execute the instructions. Portions of the control bus 102 are communicated to all elements of the processor unit 24 (FIG. 2). The control bus 102 is a unidirectional conducting bus because information is transferred only from the instruction decoder 100 and to the respective elements of the processor unit 24.

As shown more specifically in FIG. 9, the control bus 102 comprises a plurality of connections each reserved for specific control signals that emanate from the instruction decoder 100. The control signals are conducted by the control bus 102 to destinations where they are used to control the data paths through various elements of the processor unit 24 to achieve the results directed by the particular decoded instruction.

FIG. 9 is presented primarily to illustrate the source of some of the more important control signals that are conducted on the control bus 102, their function being described with respect to the ultimate destination of the signals when discussing various detailed descriptions of certain of the circuit elements of the processor 24. For example, three signal lines conduct the control signal SEL_BYTE_W, EN_FULL_WD, and BIT_INSTS that, as will be seen, are applied to the ALU 130 to select the bytes of bits that take part in the particular arithmetic or logical operation specified by an instruction. One or more of these control signals would be active depending upon the instruction decoded by the instruction decoder 100.

Referring now to FIGS. 10, and following the mask generator/shifter 118, the ALU 130 and the SWAP-MUX 138 are illustrated in greater detail. It will be remembered that the data processor 24 is intended to be a high performance, high speed unit. Accordingly, it is preferably fabricated as a bipolar integrated circuit, using emitter coupled logic (ECL). It is well known that ECL technology permits the emitter leads of the output transistor stages of a number of gates to be connected together, performing the wired-OR function.

Turning first to FIG. 10, the mask generator/shifter 118 is shown as including four mask generation circuits 400, 401, 402, and 403, and a shifter 404. The circuitry of a representative one of the four mask generation circuits, the low-order-byte circuit 400, is illustrated in detail, as comprising eight stages, one for each low-order mask bit $MB_7$, $MB_6$, ..., $MB_0$. (High-order mask bits $MB_{31}$ to $MB_8$ are generated by the high-order byte circuits 403, 402 and 401.) During the processing of a single-byte-boundary-aligned operand instruction, for example, an enable byte zero (ENBYTE0) signal is generated on a signal line 406 by a field width control circuit 408 and is conducted thereby to the inputs to a set of eight OR gates, 410, 412, 414, 416, 410, 420, 422 and 424, which enables all eight low-order mask bits within the low-order byte used during execution of the byte-boundary-aligned operand instructions, described above. (Enable byte (ENALL, ENBYTE, ENBYTE1) signals generated by the field width control circuit 408 on signal lines 426, 427 and 428, respectively, similarly enable all four, the least-significant-three, and -two bytes, respectively.)

In order to process the variable-length bit-field operand instructions, above, width signals are generated by the field width control circuit 408 and applied to the inputs of the eight OR gates 410, 412, 414, 416, 418, 420, 422 and 424 and to the second set of eight OR gates 411, 413, 415, 417, 419, 421, 423 and 425. These width signals represent the five width bits $WIDTH_4$, $WIDTH_3$, $WIDTH_2$, $WIDTH_1$ and $WIDTH_0$ selected by the WIDTH-MUX 106 from either the input terminals $W_4$-$W_0$ of processor 24 or the width portion 112a of the status register 112, depending on the width source selected by the instruction bits $INST_{7-8}$ in accordance with Table VI, above, as applied to the WIDTH-MUX 106 via signal lines 104.

Outputs of adjacently-numbered pairs of the sixteen OR gates numbered 410 through 425, pair 410-411, 412-413, ..., 424-425, are connected to a set of eight NOR gates 430, 431, ..., 437, respectively, and their outputs are the mask bits $MB_7$, $MB_6$, ..., $MB_0$, respectively. And collectively these twenty-four gates constitute a five-bit-input, eight-bit-output binary decoder which can enable any contiguous group of the mask bits $MB_7$, $MB_6$, ..., $MB_0$. Similarly, circuits 400, 401, 402 and 403 collectively constitute a five-bit-input, thirty-two-bit-output binary decoder which can enable any contiguous group of the mask bits $MB_{31}$, $MB_{30}$, ..., $MB_0$, for use as a selectable width bit-mask during the processing of variable-length bit field operand instructions. The enabled bits are encoded as ZEROs and the remaining bits are encoded as ONEs, so that the mask generated is bounded by a fence of ONEs at the most-significant end.

Depending on the processor instruction being executed by processor 24, either a byte-boundary-aligned or a variable-length-bit-field operand instruction, the instruction decoder 100 generates control signals, select byte width (SEL_BYTE_W), enable full word (EN_FULL_WD), or bit instruction select (BIT_INST_S), which are conducted to the field width control circuit 408 via the control bus 102. For byte-boundary-aligned-operand instructions the BIT_INST_S signal is a LOW and either the EN_FULL_WD or SEL_BYTE_W signal is a HIGH and the other signal is a LOW, depending on whether the processor instruction specifies a byte-width of four, or a byte-width of less than four, respectively. For variable-length-bit-field instructions, the BIT_INST_S signal is a HIGH and the EN_FULL_WD and SEL_BYTE_W signals are LOW.

In the former case, bit-set portions of the field width control circuit 408, circuits 403a and 408b, are deactivated by the LOW BIT_INST_S signal communicated to all three AND gates 440, 441 and 442 constituting bit-set circuit 408a and all four AND gates 443, 444, 445 and 446 constituting bit-set circuit 408b, thereby inactivating these circuits; while a byte-set portion 408c of the field width control circuit 408 is activated by the LOW BIT_INST_S signal communicated to a set of AND gates 448, 449, 450 and 451 at their inverter inputs. Byte-width signals $WIDTH_4$, $WIDTH_3$, $WIDTH_2$, $WIDTH_1$ and $WIDTH_0$ generated by the WIDTH-MUX 106 in accordance with Table I, are conducted via signal lines 116 and a set of five inverters 452 to the inputs of the set of AND gates 448, 449, 450 and 451 and to an OR gate 454 and an AND gate 456 which in conjunction with either the HIGH signal SEL_BYTE_W applied to gate 448 at an inverter input or to gate 456, or the HIGH signal EN_FULL_WD applied to an OR gate 458, causes the proper HIGH enable byte (ENBYTE2, ENBYTE1, ENBYTE0) signal to be generated at the output of gate 449, 450 and/or 451, respectively, or the HIGH enable all bytes (ENALL) signal to be generated at the output of an OR gate 460, respectively. The output of the gate 451 is conducted via signal line 406 to the inputs of the eight OR gates 410, 412, 414, 416, 418, 420, 422 and 424 of mask generator circuit 400 (and 401), the output of the gate 450 is conducted via signal line 428 to the inputs of eight similar gates of mask generation circuit 401 (and 402), the output of the gate 445 is conducted via signal line 427 to the inputs of eight similar gates of mask generation circuits 402 and 403, and the output of the gate 460 is conducted via signal line 426 to all such gates of mask generation circuits 400, 401, 402 and 403.

In the latter case (of a variable-length-bit-field instruction), the bit-set portions 408a and 408b of the field width control circuit 408 are activated by the HIGH BIT_INST_S signal and the byte-set portion 408c of the field width control circuit is deactivated by the LOW SEL_BYTE_W and EN_FULL_WD signals generated by the instruction decoder 100. In this case, the width signals $WIDTH_4, \ldots, WIDTH_0$ selected by the WIDTH-MUX 106 are applied to the gates comprising bit-set circuits 408a and 408b which performs a binary decoding of these five width signals, and the resulting decoded signals at the outputs of gates 440, 441, 442, 443, 444, 445 and 446 are conducted via signal lines 461, 462 463, 464, 465, 466 and 467, respectively, to the inputs of the OR gates comparing the mask generation circuits 400, 401, and 402 and 403 so that the lowest-order n bits beginning at the bit position specified by the width signals $WIDTH_4, \ldots, WIDTH_0$ considered as a five-bit binary number (n) will be set to ZEROs by the NOR gates comprising the mask generation circuits 400, 401, 402 and 403 while the remaining highest-order (32−n) bits are set to ONEs.

A detailed view of the mask shifter 404 comprising programmed read only memorys (PROM) and associated shift registers is illustrated in FIG. 11 and constitutes PROMs 470 and 472 and shift registers 474 and 476. The thirty-two outputs of the mask byte circuits 400, 402, 402 and 403 mask bits $MB_{31}, MB_{30}, \ldots, MB_0$, are applied to the PROM 470 and the PROM 470 conducts the thirty-two signals to the shift register 474 in an n-of-eight code; shift register 474 consisting of thirty-two stages each stage receiving a weighted one of the n-of-eight codes.

Position information signals $POS_5$–$POS_0$ from the POS-MUX 108 are supplied to the logic circuit 474 via signal lines 124. These position signals represent the six position bits selected by the POS-MUX 108 from either the position information accompanying the processor instruction and applied to the input terminals $P_5$–$P_0$ of the processor 24 or the position portion 112b of the status register 112, depending on the position source selected by the instruction bits $INST_{7-8}$ in accordance with Table VI, above, as applied to the POS-MUX 108 via signal lines 104. In conjunction with an enable mask shift (EN_MASK_SH) control signal generated by the instruction decoder 100, in response to the application of a signed or unsigned shift processor instruction operation code, and communicated to the inputs of a set of AND gates 480, 481, 482, 483 and 484 via the control bus 102, and the position signals $POS_4$ through $POS_0$, interpreted as an unsigned five-bit integer in the range 0 to 31; the three high-order signals $POS_4$, $POS_3$ and $POS_2$ of which are conducted to gates 484, 483 and 482, respectively, and the two low-order signals $POS_1$ and $POS_0$ of which are conducted to gates 481 and 480, respectively. A three-to-eight decoder 486 receives the outputs of gates 484, 483 and 482 and generates a signal on lines 490 which is conducted to shift register 474 and produces a partial upshift, of magnitude corresponding to the three high-order position bits, of the mask signal bits $MB_{31}$–$MB_0$ applied to the mask-shifter 408 by the mask byte generation circuits 400, 401, 402 and 403. Fill bits of ZERO or ONE are internally-generated by the shift register 474 during upshifts, to effect a rotation of the mask.

The outputs of the thirty-two stages comprising shift register 474 are applied to the thirty-two stages of shift register 476 via PROM 472 in an n-of-eight code, where the final upshift called for by the processor instruction is executed in response to the low-order position information received via AND gates 480 and 481 and a two-to-four decoder 488 and conducted therefrom on signal lines 492 and applied to the shift register 476.

Again, ZERO or ONE fill-bits are supplied by circuit 476. Each module of circuit 446 produces a shifted-mask bit $M_i$, $0 \leq i \leq 31$ on the set of thirty-two signal lines 128 (FIG. 2), which is applied to the M operand input of the ALU 130 (FIG. 2).

Utilizing the byte-width, or bit-position and width, information accompanying the processor instruction or stored within the status register 112, the ALU 130 can perform operations on only those bit positions of the R- and S-operands corresponding to positions in which the M-operand is a ZERO. The positions of either the R-, in the case of two-operand instructions, or in the case of three-operand instructions, the S-operand corresponding to a ONE in the M-operand pass unaffected to the F outputs of the ALU 130 as will now be described, with reference to FIG. 12.

Illustrating a typical two-operand instruction in FIG. 12, the ALU 130 of FIG. 2 receives as inputs the R- and S-operands on signal lines 127 and 148, respectively, and the mask as generated and upshifted by the mask generator/upshifter 118 at its M-operand input on signal lines 128. Each R-, S- and M-input is a 32-bit word, on which the ALU is to perform an operation on only those bit positions of the R- and S-operand "selected" by the byte-width in the case of the byte-boundary-aligned operand instructions, or by the bit-mask in the case of the variable-length-bit-field operand instructions, and presents the result in the corresponding bit positions on the 32-bit F-bus at the output of the ALU 130. The "unselected" bit positions of the S-operand are passed unchanged to the corresponding bit positions of the 32-bit F-bus.

The mask presented to the ALU 130 on signal lines 128 is communicated to a 2:1 multiplexer (MUX) 494 as is the result of the ALU operation performed within an ALU operation block 496 on all 32 bits of the R- and S-operands communicated thereto via signal lines 127 and 148, respectively. Each mask bit causes the 2:1 MUX 494 to select between the corresponding bit position of the two sources; the result of the ALU operation or the S-operand, depending on the mask bit being a ZERO or a ONE, respectively.

The signals formed on the signal lines 127 and 148 are conducted to the R- and S- operand inputs of the ALU 130, as directed by the particular processor instruction being executed, and used to perform the arithmetic and/or logic operations directed by the decoded control signals that are communicated to the ALU 130 by the control portion of the bus 102. The portion of ALU 130 that performs these operations, the ALU operation block 496 of FIG. 12, is shown in greater detail in FIG. 13.

As illustrated in FIG. 13, the ALU operation block 496 (FIG. 12) includes a set of sixteen normal logic cells (NLC) 500a–500p, a set of four byte-boundary logic cells (BLC) 502a–d, a moving logic cell 504, and a look-ahead logic circuit 506. (The 2:1 MUX 494 shown in FIG. 12 as exterior to the ALU operation block 496 is incorporated within each of the NLC 500a–500p). Each of the NLC 500a–500p are identical, and constitute a two-bit-slice arithmetic-logic circuit, as will be described with reference to FIG. 14 in greater detail below. Similarly, each of the BLC 502a–502d are identical, and constitute a one-bit-slice arithmetic-logic circuit, as will be described with reference to FIG. 15 in greater detail below.

The modified Booth algorithm, described above in connection with the Group 7 byte-boundary-aligned operand multiplication step instructions, Table XIII, requires (n+2) bits of precision to perform an (n×n) bit multiplication. Since the processor 24 according to the present invention can accommodate data of one-, two-, three-, or four-byte widths, i.e., of 8, 16, 24, or 32 bits, the extra two bits or precision must be appended to the most-significant byte of the data in order to implement the algorithm. This requires the two-bit "moving" logic cell (MLC) 504 which, as illustrated in FIG. 13, is connected to each of the four BLC 502a–502d, via signal lines 508, thereby supplying the BLC 502a–502d with the two most-significant product bits which are down-shifted by two bits at each multiply step of the modified Booth algorithm. (Refer to the UMULFIRST, UMULSTEP, SMULFIRST and SMULSTEP instructions described with reference to Table XIII A, above).

The MLC 504 receives at a pair of inputs the sign bits of the selected bytes of the R- and S- operands via signal lines 510 and 512 as selected from the four byte-boundary sign bits by a pair of multiplexers (MUX) 514 and 516 according to the byte-width information accompanying the multiplication instruction or as stored in the width portion of the status register, supplied to the MUXs 514 and 516 on signal lines 518 (116 on FIG. 2). Each BLC 502a–502d includes a multiplexer to select either the two-bit output of the moving cell or its own internally-generated two-bit output, depending on this byte-width information, as will be described below.

Each NLC 500a–500p includes R-, S-, and M-operand inputs for receiving the corresponding two-bits of the 32-bit ALU inputs on signal lines 127, 148, and 128, from the 64-bit shifter 126, the S-MUX 146, and the mask generator/shifter 118, respectively. In addition, each NLC 500a–500p has a control (CB) input that receives control signals communicated on control bus 102. Finally, each NLC 500a–500p also receives as input a CN signal generated by the look-ahead logic circuit 506 and communicated on signal lines 520.

The ALU operation block 496 includes an internal signal bus 524 which interconnects all the NLC 500a–500p and the BLC 502a–502d, as well as the look-ahead logic circuit 506.

Each NLC 500a–500p generates at a pair of outputs $F_n$, $F_{n+1}$ a corresponding two-bit pair of the 32-bit outputs $F_0$–$F_{31}$ representing the result of the operation called for by the processor instruction as applied to the selected byte(s) or bit(s) of the R- and S- operand presented to the ALU operation block 496 via signal lines 127 and 148, respectively, according to the mask M generated by the mask generator/shifter 118 and presented to the ALU operation block 496 on signal lines 128. The unselected byte(s) or bit(s) are passed to the corresponding outputs $F_0$–$F_{31}$ from either the R-or S- operand in accordance with the instruction as described in Tables VII through XVII, above.

Each NLC 500a–500p generates a pair of propagate and generate signals which are communicated to the look-ahead logic circuit 506 via 32 individual signal lines within the internal signal bus 524. The generate ($GEN_n$) and propagate ($PROP_n$) signals are determined by each pair of R- and S- inputs to the n-th state NLC according to the Boolean equations:

$$GEN_n = (R_{n+1} \cdot S_{n+1}) + (R_{n+1} + S_{n+1}) \cdot R_n \cdot S_n$$

$$PROP_n = (S_n + R_n) \cdot (S_{n+1}) + (R_{n+1})$$

This scheme reduces the complexity and time-consumption usally associated with carry look-ahead logic circuits by processing the input operands two bits-at-a-time, thereby halving the number of generate and propagate signals from 32 to 16. Hence only a 16-bit carry look-ahead scheme need be employed within look-ahead logic circuit 206.

As will be described with reference to FIG. 14, below, the individual NLC circuits employ an internal multiplexer which implements a conditional sum selection scheme, providing additional improvement in operational speed. Look-ahead logic circuit 506 receives decoded instruction signals at a CB input via control bus 102 and during arithmetic operations one of two signals is received by the circuit 506 which enables either an integer carry look-ahead portion of the circuit 506 (the EN_INT_CARRY signal) or a binary-coded-decimal (BCD) carry portion of the circuit (the EN_BCD_CARRY signal). Since the latter circuit portion is conventional it will not be described in detail. The active state of the EN_INT_CARRY signal enables the look-ahead logic circuit 506 to receive the propagate and generate signals issued by each individual NLC 500a–500p on the signal bus 524, determine whether a carry is generated by one NLC stage that is to be applied to the next succeeding NLC stage, and, if so, produce the appropriate signal at the CN outputs, which is conducted to the NLC 500a–500p via the signal lines 520 and 522, respectively.

Each BLC 502a–502d also receives at a control bus (CB) input the control signals communicated via the control bus 102 and the CN and BYTEN signals generated by the carry look-ahead logic circuit 506, via signal lines 520 and 522, respectively. Each BLC 502a–502d can generate byte-boundary information; a linkout signal (LINKOUT), an overflow signal ($OVR_{n+2}$), and a carry out signal ($CONT_{n+2}$), as required by the byte-width of the arithmetic or logical operation performed by the ALU operation block 496.

Turning now to FIG. 14, there is illustrated the circuitry of a representative one of the sixteen normal logic cells (NLC) 500a–500p of the ALU operation block 496. (The 2:1 MUX 494 shown in FIG. 12 as exterior to the ALU operation block 496 is not shown in FIG. 14 in the interests of clarity, but would be incorporated within each NLC circuit.) As shown, the n-th and (n+1)-st bits (n=0, 2, 4, ..., 30) of the R- ($R_n$, $R_{n+1}$) and S- ($S_n$, $S_{n+1}$) operands are respectively connected to the inputs to a set of exclusive -OR (XOR) gates 520 and 532 and to a generate/propagate logic circuit 534. The n-th bits, $R_n$ and $S_n$, of the operands are also connected to the inputs of an AND gate 536 and an OR gate 538. The outputs of the AND gate 536 and the XOR gate 532 are connected to the inputs of an XOR gate 540 and the outputs of the OR gate 538 and the XOR gate 532 are connected to the inputs of an XOR gate 542.

The circuitry consisting of gates 530, 432, 536, 538, 540 and 542 forms four conditional sums; one at the output of XOR gate 530 on a signal line 544 ($SUM0_n$), one at the complemented output of XOR gate 530 on a signal line 546 (SUM0$_n$), one at the output of XOR gate 540 on a signal line 548 (SUM0$_{n+1}$), and one at the output of XOR gate 542 on a signal line 550 (SUM1$_{n+1}$); each conditional sum is formed assuming either a ZERO or a ONE carry-in C$_n$ as generated by the carry look-ahead logic circuit 506 and communicated to the NLC via one of the set of signal lines 520 to the NLC illustrated. The signal C$_n$ is communicated to the select inputs of a set of three multiplexers 552, 554, and 556 where the signal is used by the MUX 552 and 554 to pass either the signal on line 544 or the signal on line 546 to the outputs of the MUX 552 and 554 and is used by the MUX 556 to pass either the signal on line 548 or 550 to the output of the MUX 556. The output of the MUX 552, under normal conditions, as reflected by the presence of the normal (NORM) MUX enable signal generated by the decoder 100 and communicated to the MUX 552 and 556 via the control bus 102, is the output F$_n$ of the NLC illustrated, and the output of the MUX 556, under normal conditions, is the output F$_{n+1}$ of the NLC illustrated. Thus, the operation of forming the conditional sums of the operands R$_n$, S$_n$, R$_{n+1}$, and S$_{n+1}$ in the half-adders found by the gates 530, 532, 536, 538, 540 and 542 can occur concurrently with the operation of generating the carry by the look-ahead logic circuit 506, effecting an improvement in the speed of operation of the ALU 130, mentioned above.

The three remaining multiplexers shown in FIG. 14, 558, 560, and 562 provide single-bit upshifts of the sums formed as well as two-bit downshifts of the sums formed, as required by the division-step and multiply-step processor instructions (described in Tables XII and XIII), respectively. The carry signal from the preceding cell NLC$_{n-1}$ (C$_{n-2}$) of the ALU operation block 496 is communicated via the internal signal bus 524 to the MUX 558 where it is used by the MUX 558 to pass either of the conditional sum signals SUM1$_{A-1}$ or SUM0$_{n-1}$ generated by the preceding cell NLC$_{n-1}$ from its high-order operands R$_{n-1}$ and S$_{n-1}$ and in response to the UP_ONE multiplexer enable signal generated by the decoder 100 and communicated to the MUX 558 and the MUX 554 when processing division-step instructions. The MUX 558 thus implements the single-bit upshift mentioned above, as it relates to the F$_n$ output of the NLC illustrated. The MUX 554 described earlier, implements the single-bit upshift as it relates to the F$_{n+1}$ output of the NLC illustrated.

In a similar fashion the multiplexers 560 and 562, in conjunction with a DOWN_TWO enable signal generated by the decoder 100 and the carry signal C$_{n+2}$ generated by the succeeding cell NLC$_{n+1}$ and communicated via the internal signal bus 524 to the MUX 560 and the MUX 562, implements the two-bit downshifts mentioned above.

The outputs of the MUX 552, the MUX 558 and the MUX 560 are connected together in a wired-OR configuration 564 to form the NLC output F$_n$. The outputs of the MUX 554, the MUX 556 and the MUX 562 are connected together in a wired-OR configuration 566 to form the NLC output F$_{n+1}$. This configuration affords the single-bit upshifts or two-bit downshifts with no time penalty.

The generate/propagate logic circuit 534 generates a generate (GEN$_n$) and a propagate (PROP$_n$) signal in accordance with the two Boolean equations, above, as functions of the signals R$_n$, R$_{n+1}$, S$_n$, S$_{n+1}$ applied at its inputs. The GEN$_n$ and PROP$_n$ signals are communicated to the carry look-ahead logic circuit 506 via internal signal bus 524.

It is recognized that the above description of a representative one of the NLC as shown in FIG. 14 must be modified in the instance of the low-order and high-order cells within each byte. These modifications would be evident to those skilled in the art and will not be described in detail.

The circuitry of a representative one of the four byte-boundary logic cells (BLC 502$a$–502$d$) (FIG. 13), is shown in FIG. 15A and the moving logic cell (MLC) 504 (FIG. 13) which can be appended to any of the four BLC 502$a$–502$d$, is shown in FIG. 15B. As shown in FIG. 15A, the n-th bit of the R-(R$_n$) and S-(S$_n$) operand are received from the next-lower NLC 500$d$, 500$h$, 500$l$ or 500$p$ by the BCC 502$a$, 502$b$, 502$c$ or 502$d$, respectively, via the internal bus 524. The "n" value used within FIG. 15A, and its description herein, refers to the value n=6 for Byte 0, n=14 for Byte 1, n=22 for Byte 2 and n=30 for Byte 3. Also received via the internal bus 524 from the next-lower NLC are the conditional sum signals SUM1$_{n-1}$ and SUM0$_{n-1}$ generated by the next-lower NLC from its high-order R- and S-operands, as well as the carry signal C$_{n-2}$ generated by the next-lower NLC. A byte-carry signal (BYTE_C$_n$) generated by the carry look-ahead logic circuit 506 via signal lines 522 is also received by the BBC 502$a$–502$d$.

The R$_n$ and S$_n$ signals are connected to the inputs of an AND gate 570. The output of the AND gate 570 is connected to the input of an XOR gate 572 which also receives at an input the byte carry$_{n+2}$ (BYTE_C$_{n+2}$) signal generated by the carry look-ahead logic circuit 506. The propagate carry signal (PROP$_n$) is connected to the input of an XOR gate 514 as is the BYTE_C$_{n+2}$ signal and the circuitry consisting of gates 570 and 574 forms the conditional sums, as described above in connection with the description of the NLC 500$a$–500$p$, and the outputs of the XOR gates 572 and 574 are connected to a multiplexer (MUX) 576 which selects which of these outputs is to be presented at the OVR$_{n+2}$ output of the BBC in response to the C$_{n-2}$ signal applied to the MUX 576 used as a select signal as described above in connection with the NLC.

An NAND gate 578 receives at its inputs the BYTE_C$_n$ signal and a most-significant byte-select (MS_BYTE_SEL) signal generated by the instruction decoder 100 in accordance with Table I, above, and the instruction bits INST$_8$ and INST$_7$ accompanying a byte-boundary-aligned-operand instruction. The NAND gate 578 generates the COUT$_{n+2}$ signal. The OVR$_{n+2}$ and COUT$_{n+2}$ signals are conducted from the most-significant BBC via the signal lines 164$a$ (FIG. 2) to the STATUS MUX 168 and the status register 112 via the MUX 166 (FIG. 7) where they can be presented on the S-bus 62 (FIG. 1) for use by the microprogram sequencer 12 (FIG. 1) or stored within the status register 112. The negative and zero status signals, N and Z, described above in connection with FIG. 2, are generated by one-detect and zero-detect circuits, not shown, within the ALU 130, based on the presence of a ONE at the F$_{31}$ outputs (the NLC 500$p$, or the presence of all ZEROs at the F$_n$ (n=31, . . . 0) outputs of the NLC 500$a$–$p$, respectively. A linkout signal (L$_{n+2}$) is also generated by the most-significant BLC by a multiplexer (MUX) 580 also controlled by the C$_{n-2}$ signal. The MUX 580 selects from the conditional sum signals SUM1$_{n-1}$ and SUM0$_{n-1}$ generated by the preceding cell $NLC_{n-1}$. The N, C, and L status signals are also conducted from the most-significant BLC to the status register 112 and the S-bus 62.

Each BLC 502a–502d includes a set of gates which permit the MLC 504 to be connected to the most-significant NLC of the most-significant byte to implement the modified Booth algorithm, described above in connection with FIG. 8C, used for the byte-boundary-aligned operand multiply instructions. The MLC 504 is connected to each of the BLC 502a–502d via the 4-conductor signal lines 508, as shown in FIG. 13. With reference to FIG. 15A, the signal lines 508 conduct the four additional conditional sum bits MSUM00, MSUM01, MSUM10, MSUM11 generated by the MLC 504 in response to the two high-order bits of the R- and S- operands presented to the MLC 504 via the MUX 516 and 518. The high-order conditional moving cell sums, MSUM10 and MSUM11, are conducted to a multiplexer (MUX) 582 which, in response to the signal $BYTE_{13} C_{n+2}$ applied to the MUX 582, selects one of those conditional sums to be communicated via the internal bus 524 to the most-significant NLC and the most-significant byte used for the multiplication, where it is wired-OR to the high-order gate shown in FIG. 14 corresponding to the wired-OR gate 566. As such, this modification of the high-order NLC within each byte is one of the modifications mentioned above.

Similarly, the low-order conditional moving cell sums, MSUM00 and MSUM01, are conducted to a multiplexer (MUX) 584 which, in response to the signal $BYTE\_C_{n+2}$ applied to the MUX 584, selects one of the conditional sums to be communicated via the internal bus 524 to the least-significant wired-OR gate corresponding to the gate 564 shown in FIG. 14.

Illustrated in FIG. 15B is the moving logic cell (MLC) 504 which can be appended to the high-order byte selected for a byte-boundary-aligned multiplication via the BLC 502a–502d, described above. The modified Booth algorithm implementing the multiplication step requires two extra high-order bits of precision and the MLC 504 supplies these bits via 4-conductor signal lines 508, as described in connection with the representative BLC, above.

The selected high-order bits of the R- and S-operand used in the multiplication, which represent either the operand signs or the high-order operand bits, depending on whether a signed or unsigned multiplication is to take place, respectively, are communicated via the signal lines 510 and 516, respectively, to the MLC 504. A pair of NAND gates 590 and 592 receive at their inputs the selected high-order bit signal of the R-operand and a NAND gate 594 receives at its input the selected high-order bit signal of the S- operand. A signed multiply (S_MUL) signal generated by the construction decoder 100 and conducted to the MLC 504 via control bus 102 is applied to the input of the NAND gate 590 and to an input of an OR gate 596. A select-two-A-A-multiplexer (SEL_2A_AMUX) signal generated by the instruction decoder 100 is applied to a second input at the OR gate 596. A multiply first step (MULFIRST) signal generated by the instruction decoder 100 is applied to a second input of the NAND gate 594. A set of three XOR gates 598, 600, and 602 receive at their inputs the outputs from the NAND gates 590, 592 and 594, respectively. XOR gate 602 also receives the output of the XOR gate 600 at a second input. Gates 598 and 600 receive at a second input an R-polarity (R_POL) signal generated by the instruction decoder 100. The output of XOR gate 598 is connected to an input of an XOR gate 604, which also receives at an input the output of the NAND gate 594.

The output of XOR gate 604 is connected to the inputs of a pair of XOR gates 606 and 608 and the output of the output of gates 594 and 600 are connected to the inputs of a NAND gate 610 and to the inputs of an OR gate 612. The output of AND gate 610 is connected to the input of the XOR gate 601 and the output of OR gate 612 is connected to the input of XOR gate 606.

The output of XOR gate 606 (the half-adder comprising gates 612 and 606) and the output of XOR gate 608 forms the most-significant extra-bit sum signals NSUM11 and NSUM10, respectively. The output of the XOR 602 and the complement of this output forms the least-significant extra-bit signals MSUM01 and MSUM00, respectively, which are communicated to the selected high-order NLC via signal lines.

The ALU operation block 496 is capable of performing a variety of logical and arithmetic shift operations as directed by control signals generated by the instruction decoder 100 and communicated via the control bus 102. A detailed description of the ALU 130 circuitry and control signals utilized in the execution of the shift instructions can be had by reference to U.S. patent application Ser. No. 174,490, entitled "PROCESSOR UNIT FOR MICROCOMPUTER SYSTEMS," filed Aug. 1, 1980, assigned to the common assignee herein.

It should now be evident that the data processor 24 of the present invention, structured as described above, is capable of executing complex byte-boundary-aligned and variable-length-bit field instructions in essentially the time period used for all instructions. The remaining logic elements utilized by the processor 24, and shown in FIG. 2, are of conventional design and can easily be constructed in accordance with the above description of FIG. 2 and the processor instructions described above. The priority encoder 176, for example, is a combinatorial logic circuit that accepts a one-, two-, three-, or four-byte word and produces therefrom a 5-bit code indicative of the highest-order ONE, in accordance with Table IV, above, in conjunction with the byte-width selected by the prioritize processor instruction (Group 4) being executed.

The 64-bit shifter 126 on the R- operand input to the ALU 130 is also a combinatorial logic circuit that accepts a pair of 32-bit data words and performs an n-bit barrel shift, up or down, of either input; an n-bit up or down shift of either input or a concatenation of the inputs, in accordance with Table II, above, as determined by control signals communicated to the 64-bit shifter 126 on the control bus 102 and by position signals communicated to the 64-bit shifter 126 via signal lines 124 from the POS-MUX 108, specifying the value n. The output of the 64bit shifter is the most-significant 32 bits of the resulting bit pattern.

The Q-shifter 172 is a conventional combinatorial logic circuit that accepts a 32-bit word and performs a logical shift of the word 0 to 31 bits as required by the shift division and multiplication step instructions (Groups 3, 6, and 7), as determined by control signals communicated to the Q-shifter 172 on the control bus 102.

Finally, the parity checker 182 and the parity generator 188 are simply combinatorial logic circuits which accept as input 32-bit data words, in the case of the parity checker 182 to such words, and combine the inputs for a given word in a cascade of XOR gates, which produce a ONE (for an ECL-compatible version) or a ZERO (for a TTL-compatible version) depending on whether an odd number of the 32 bits input are ONES.

We claim:

1. In a microprocessor, including memory means for storing a plurality of multi-bit data words arranged into 8 bit "bytes" and sequencer means connected to said memory means for cyclically generating data word memory addresses and generating data processor instructions from a set each instruction of which comprises a word having a plurality of bits arranged into fields, containing at least an operation code field defining the instruction and a data specification field defining the portion of the data words to be processed during the execution of the said instruction, a data processor device connected to said memory means and responsive to said instruction words for receiving said multi-bit-data words located at said generated addresses and processing selectable portions of said multi-bit data words, said data processor device comprising:

decoder means for receiving said instruction words and for generating therefrom a plurality of control signals;

mask generation and shifting means connected to said decoder means and responsive to said decoder control signals for selectively generating and selectively upshifting a multi-bit word generating thereby a multi-bit mask word comprising a selectable portion of ZERO bits and a remaining portion of ONE bits; and arithmetic-logic means connected to said decoder means and responsive to said decoder control signals having first and second operand inputs connected to said storage means for receiving said multi-bit data words at said first and second operand inputs and having a third operand input connected to said mask generation means for receiving said multi-bit mask word at said third operand input and executing in a single processor clock cycle selectable arithmetic and logic operations on said selected portions of said data words at said first and second operand inputs specified in said operation code field of said processor instruction and generating at an output of said arithmetic-logic means a multi-bit word comprising within the portion corresponding to said ZERO bits within said mask word, the result of said operation on said selected portions of said data words at said first and second operand inputs corresponding to those bit positions in which said mask bits are ZEROs and, within the remaining portion corresponding to said ONE bits within said mask word, that portion of either said data word at said first or second operand input corresponding to said ONE bits within said mask word, depending on said operation code field of said processor instruction.

2. The data processor device of claim 1, wherein:
(a) said data processor instruction set includes a set of byte-boundary-aligned-operand instructions, each instruction of which having a plurality of bits within said data specification field indicative of the number of least-significant 8-bit bytes of said data word (the "selected byte(s)") of a byte-boundary-aligned-operand which is to be processed, during the execution of said byte-boundary-aligned-operand instruction; and (b) in response to a said byte-boundary-aligned-operand-instruction, said mask generation means generates said mask word having ZERO bits within said least-significant 8-bit bytes indicated by said byte-boundary-aligned-operand-instruction and ONE bits within the remaining most-significant 8-bit bytes so that said output of said arithmetic-logic means is said multi-bit word comprising, within said "selected bytes," the result of said operation on said "selected bytes" of said data words at said first and second operand inputs and within the remaining ("unselected") byte(s) that most-significant portion of either of said data words at said first or second operand inputs, depending on said operation code field of said byte-boundary-aligned-operand-instruction.

3. The data processor device of claim 1, wherein:
(a) said data processor instruction set includes a set of variable-length-bit-field-operand instructions, each instruction of which having a width portion and a position portion within said data specification field, said width portion having a plurality of bits indicative of the number of bits of said data word (the "length" of the variable-length operand) which is to be processed during the execution of said variable-length-bit-field instruction, and said position portion having a plurality of bits indicative of the bit position within said data word of the least-significant bit of said variable-length operand which is to be processed during the execution of said variable-length-bit-field instruction; and (b) in response to a said variable-length-bit-field-operand processor instruction, said mask generation means generates said mask word having ZERO bits over the length, and beginning at said bit position, indicated by said variable-length-bit-field-operand instruction so that said output of said arithmetic-logic means is said multi-bit word comprising, within said length and beginning at said bit position, the result of said operation on the corresponding bit positions of said data words at said first and second operand inputs and within the remaining bit positions the corresponding bit positions of either of said data words of said first or second operand inputs, depending on said operation code field of said variable-length-bit-field-operand instruction.

4. The data processor device of claim 1, wherein said mask generation means comprises combinatorial logic means connected to said decoder means and responsive to said decoder control signals for generating a multi-bit word having a selectable contiguous plurality of ZERO bits within a least-significant portion thereof and a plurality of ONE bits within a most-significant remaining portion thereof, said combinatorial logic means further including means for selectively shifting said generated multi-bit word thereby forming said multi-bit mask word, said generation and shifting occurring within said single processor clock cycle.

5. The data processor device of claim 1, further including two-operand combinatorial logic means interconnecting said memory means and said first operand input of said arithmetic-logic means receiving at a first and second input said multi-bit data words located at said addresses generated by said sequencer means and connected to said decoder means and responsive to said decoder control signals for selectively forming and communicating a multi-bit word having a combinatorial function of said multi-bit data words applied to said first and second inputs to said first operand input of said arithmetic-logic means, said formation and communication occurring within said single processor clock cycle.

6. The data processor device of claim 5, wherein said multi-bit word formed and communicated to said first operand input of said arithmetic-logic means by said two-operand combinatorial logic means is selectively a multi-bit word formed from the downshift by a selectable number of bits of said multi-bit word at said first operand input of said two-operand combinatorial logic means, a upshift by a selectable number of bits of said multi-bit word at said first operand input, a downshift by a selectable number of bits of said multi-bit word at said second operand input of said two-operand combinatorial logic means, an upshift by a selectable number of bits of said multi-bit word at said second operand input, a circular shift by a selectable number of bits of said multi-bit word at said first operand input, the circular shift by a selectable number of bits of said multi-bit word at said second operand input or, the most-significant multi-bit word consisting of a circular shift by a selectable number of bits of a word formed from the concatenation of the multi-bit words at said first and second operand inputs of said two-operand combinatorial logic means.

7. The data processor device of claim 2, wherein said data processor byte-boundary-aligned-operand instruction set includes multiplication-step and division-step instructions, further including two-down, one-up multiplex means connected to said arithmetic-logic means and to said decoder means and responsive to said decoder control signals for selectively communicating the bits of said multi-bit word generated by said arithmetic-logic means to said output of said arithmetic logic means unshifted, down-shifted two-bit positions in response to the reception by said decoder means of the operation code of said multiplication-step instruction, or up-shifted one bit position in response to the reception by said decoder means of the operation code of said division-step instruction, said shifting occurring within said single processor clock cycle.

8. The data processor device of claim 2, wherein said arithmetic-logic means includes:
(a) a plurality of fixed combinatorial logic means each connected to said decoder means and responsive to said decoder control signals and receiving two adjacent bits of said multi-bit data words at said first and second operand inputs to said arithmetic-logic means and two adjacent bits of said multi-bit mask word at said third operand input to said arithmetic-logic means for generating two adjacent bits of said output of said arithmetic-logic means and carry/propagate signals; and
(b) moving combinatorial logic means connected to said decoder means and responsive to said decoder control signals and receiving the most-significant bits of the most-significant selected bytes of the data words at said first and second operand inputs to said arithmetic-logic means, said moving combinatorial logic means selectively connectable to the said one of said plurality of fixed combinatorial logic means receiving the said selected most-significant bits of said data words, for generating two additional most-significant bits of output of said arithmetic-logic means comprising the result of said operation on said "selected bytes" of said data words, in response to the reception by said decoder means of the operation code field and data specification field of said multiplication step instruction.

9. The data processor device of claim 8, said arithmetic-logic means further including two-bit carry-look-ahead means connected to each said fixed combinatorial logic means and responsive to said carry/propagate signals generated therefrom, and each said fixed combinatorial logic means including means for generating four conditional output bits and further including multiplex means having a first set of inputs connected to the most-significant conditional output bits of the next-higher-order fixed combinatorial logic means, a second set of inputs connected to the least-significant conditional output bits of said next-higher-order fixed combinatorial logic means, a third set of inputs connected to the most-significant conditional output bits of said fixed combinatorial logic means, a fourth set of inputs connected to the least-significant conditional output bits of said fixed combinatorial logic means, and a fifth set of inputs connected to the most-significant conditional output bits of the next-lower-order fixed combinatorial logic means, responsive to said decoder control signals and to said carry/propagate signals, for selectively forming said two adjacent bits of said output of said arithmetic-logic unit from two of said conditional output bits, wherein said arithmetic-logic means causes said multiplex means inputs to be generated simultaneously with said multiplex control signals whereupon said multiplex means forms said two adjacent output bits and said shifting occurring, in response to the reception by said decoder means of said multiplication-step instruction, within said single processor clock cycle.

10. The data processor device of claim 2, including priority encoding means connected to said decoder means and responsive to said decoder control signals and receiving said selected bytes of said output word of said arithmetic-logic means and issuing a prioritization word indicative of the bit position of the most-significant ONE contained in said selected bytes of said output word.

11. In a microprocessor, including memory means for storing a plurality of words having a plurality of bits arranged into fields, containing at least a data field portion and a parity field portion, a data processor device connected to said memory means for receiving said words and processing said data field portion thereof and generating an output word having a plurality of bits arranged into fields, containing at least a data field portion and a parity field portion, the data processor device including;
parity validation means deployed on each path connecting said memory means and said data processor for generating a parity error signal whenever the number of ONE bits within said parity field portion of said word communicated on said path differs from a predetermined value; and
parity generation means for generating said parity field portion of said output word wherein said number of ONE bits within said parity field portion bears a predetermined relationship to said plurality of bits within said data field portion,
further including comparator means receiving at a first plurality of inputs said plural-bit processor output word, containing said data field and parity field portions, and said parity error signal generated by said (first) processor device and receiving at a second plurality of inputs a second plural-bit output word generate by a second said processor device, operating in parallel with said first processor device, containing a second data field and parity field portions, and a second parity error signal, for issuing a signal indicating the outcome of testing for equality the respective bit positions of said first and second processor output words and said first and second parity error signals.

12. The data processor device of claim 10, further including comparator means receiving at a first plurality of inputs said selected bytes of said output word and said prioritization word generated by said (first) proocessor device and receiving at a second plurality of inputs said selected bytes of a second output word and second prioritization word generated by a second said processor device, operating in parallel with said first processor device, for issuing a signal indicating the outcome of testing for equality the respective bit positions of said selected bytes of said first and second processor output words and said first and second prioritization words.

13. The data processor device of claim 10, wherein said output word generated further includes a plurality of bits constituting a data field portion and a parity field portion, the data processor device further including:
  parity validation means deployed on each path connecting said memory means and said data processor for generating a parity error signal whenever the number of ONE bits within said parity field portion of said word communicated in said path differs from a predetermined value;
  parity generation means for generating said parity field portion of said output word wherein said number of ONE bits within said parity field portion bears a predetermined relationship to said plurality of bits within said data field portion; and
  comparator means receiving at a first plurality of inputs said plural-bit processor output word containing said data and parity fields and said prioritization word generated by said (first) processor device and receiving at a second plurality of inputs a second plural-bit processor output word containing second data and parity fields and said prioritization word generated by a second said processor device, operating in parallel with said first processor device, for issuing a signal indicating the outcome of testing for equality the respective bit positons of said selected bytes of said first and second processor word selected data and parity fields and said first and second prioritization words.

14. The data processor device of claim 11 further including a plurality of output driver means, deployed on each path connecting said processor device outputs, said parity validation means output, and said parity generation means outputs, with said second plurality of said comparator means inputs, responsive to a master/slave control signal, for selectively connecting said second plurality of comparator inputs to either said processor device, said parity validation, and said parity generation outputs of said first data processor device, or to said processor device, said parity validation and said parity generation outputs of said second data processor device; whereby said first data processor device can be selectively operated, in parallel with said second data processor device, in either a master or a slave mode.

15. The data processor device of claim 12 further including a plurality of output driver means, deployed on each path connecting said processor device outputs, and said priority encoding means outputs, with said second plurality of said comparator means inputs, responsive to a master/slave control signal, for selectively connecting said second plurality of comparator inputs to either said processor device, and said priority encoding outputs of said first data processor device, or to said processor device, and said priority encoding outputs of said second data processor device; whereby said first data processor device can be selectively operated, in parallel with said second data processor device, in either a master or a slave mode.

16. The data processor device of claim 13 further including a plurality of output driver means, deployed on each path connecting said processor device outputs, said parity validation means output, said parity generation means outputs, and said priority encoding means outputs, with said second plurality of said comparator means inputs, responsive to a master/slave control signal, for selectively connecting said second plurality of comparator inputs to either said processor device, said parity validation, said parity generation, and said priority encoding outputs of said first data processor device, or to said processor device, said parity validation, said parity generation, and said priority encoding outputs of said second data processor device; whereby said first data processor device can be selectively operated, in parallel with said second data processor device, in either a master or a slave mode.

* * * * *